United States Patent
Vaganov

(10) Patent No.: US 10,922,870 B2
(45) Date of Patent: Feb. 16, 2021

(54) 3D DIGITAL PAINTING

(71) Applicant: Vladimir Vaganov, Los Gatos, CA (US)

(72) Inventor: Vladimir Vaganov, Los Gatos, CA (US)

(*) Notice: Subject to any disclaimer, the term of this patent is extended or adjusted under 35 U.S.C. 154(b) by 0 days.

(21) Appl. No.: 16/730,720

(22) Filed: Dec. 30, 2019

(65) Prior Publication Data

US 2020/0193677 A1     Jun. 18, 2020

Related U.S. Application Data

(63) Continuation-in-part of application No. 16/265,767, filed on Feb. 1, 2019, now Pat. No. 10,521,951, which
(Continued)

(51) Int. Cl.
*G06T 15/02*     (2011.01)
*A63F 13/65*     (2014.01)
(Continued)

(52) U.S. Cl.
CPC .............. *G06T 15/02* (2013.01); *A63F 13/65* (2014.09); *B44D 2/002* (2013.01); *B44F 7/00* (2013.01);
(Continued)

(58) Field of Classification Search
CPC ........ A63F 13/65; H04N 13/30; B44D 2/002; B44N 7/00; G06F 3/017; G06F 3/03545; G06T 3/04815; G06T 19/20
See application file for complete search history.

(56) References Cited

U.S. PATENT DOCUMENTS 3,737,567 A    6/1973   Kratomi
4,021,846 A    5/1977   Roese
(Continued)

FOREIGN PATENT DOCUMENTS

WO     2008003331     1/2008

OTHER PUBLICATIONS

Adams, Bart, et al.; "Interactive 3D Painting on Point-Sampled Objects"; Proceedings of the First Eurographics Conference on Point-Based Graphics; Eurographics Association, 2004.
(Continued)

*Primary Examiner* — David L Lewis
*Assistant Examiner* — Matthew D Hoel
(74) *Attorney, Agent, or Firm* — Fitch, Even, Tabin & Flannery LLP

(57) ABSTRACT

A method of digital continuous and simultaneous three-dimensional painting, drawing and three-dimensional object navigating with steps of providing a digital electronic display capable of presenting two pictures for a right eye and a left eye; providing means for creating a continuous 3D virtual canvas by digitally changing a value and sign of horizontal disparity between two images for the right eye and the left eye and their scaling on the digital electronic display corresponding to instant virtual distance between the user and an instant image within the virtual 3D canvas; providing at least one multi-axis input control device allowing digital painting or object navigating within virtual 3D canvas by providing simultaneous appearance of a similar objects on the images for the right eye and the left eye on the digital electronic display.

20 Claims, 23 Drawing Sheets

Related U.S. Application Data is a continuation of application No. 15/647,161, filed on Jul. 11, 2017, now Pat. No. 10,217,264, which is a continuation-in-part of application No. 15/229,269, filed on Aug. 5, 2016, now Pat. No. 9,734,622, which is a continuation-in-part of application No. 14/306,090, filed on Jun. 16, 2014, now Pat. No. 9,440,484, which is a continuation-in-part of application No. 13/116,015, filed on May 26, 2011, now Pat. No. 8,817,017.

(60) Provisional application No. 61/396,649, filed on Jun. 1, 2010.

(51) Int. Cl.

| | | |
|---|---|---|
| *B44D 2/00* | (2006.01) | |
| *B44F 7/00* | (2006.01) | |
| *G06F 3/01* | (2006.01) | |
| *G06F 3/0354* | (2013.01) | |
| *G06F 3/0481* | (2013.01) | |
| *G06T 19/20* | (2011.01) | |
| *H04N 13/20* | (2018.01) | |
| *H04N 13/30* | (2018.01) | |
| *H04N 13/239* | (2018.01) | |
| *H04N 13/296* | (2018.01) | |
| *H04N 13/31* | (2018.01) | |
| *H04N 13/305* | (2018.01) | |
| *H04N 13/398* | (2018.01) | |
| *H04N 13/344* | (2018.01) | |
| *H04N 13/341* | (2018.01) | |
| *H04N 13/337* | (2018.01) | |
| *H04N 13/128* | (2018.01) | |

(52) U.S. Cl.
CPC .......... *G06F 3/017* (2013.01); *G06F 3/03545* (2013.01); *G06F 3/04815* (2013.01); *G06T 19/20* (2013.01); *H04N 13/20* (2018.05); *H04N 13/30* (2018.05); *G06F 3/04817* (2013.01); *G06F 2203/04806* (2013.01); *G06T 2219/2016* (2013.01); *H04N 13/128* (2018.05); *H04N 13/239* (2018.05); *H04N 13/296* (2018.05); *H04N 13/305* (2018.05); *H04N 13/31* (2018.05); *H04N 13/337* (2018.05); *H04N 13/341* (2018.05); *H04N 13/344* (2018.05); *H04N 13/398* (2018.05); *H04N 2213/008* (2013.01)

(56) References Cited

U.S. PATENT DOCUMENTS

| | | | | |
|---|---|---|---|---|
| 5,379,369 | A * | 1/1995 | Komma | H04N 13/341 345/419 |
| 5,613,048 | A * | 3/1997 | Chen | G06T 15/205 345/419 |
| 5,913,820 | A * | 6/1999 | Bladen | A61B 5/06 128/899 |
| 5,953,014 | A | 9/1999 | Wood | |
| 6,374,134 | B1 * | 4/2002 | Bladen | A61B 5/06 324/207.13 |
| 6,445,387 | B1 * | 9/2002 | Choi | G06T 19/00 345/419 |
| 6,516,212 | B1 * | 2/2003 | Bladen | A61B 5/06 128/899 |
| 6,522,907 | B1 * | 2/2003 | Bladen | A61B 5/06 128/899 |
| 6,720,949 | B1 * | 4/2004 | Pryor | G06F 3/017 345/158 |
| 6,850,210 | B1 | 2/2005 | Lipton | |
| 6,943,852 | B2 | 9/2005 | Divelbiss | |
| 7,126,598 | B2 * | 10/2006 | Oh | G06T 15/10 345/419 |
| 7,174,202 | B2 * | 2/2007 | Bladen | A61B 5/06 324/207.17 |
| 8,817,017 | B2 | 8/2014 | Vaganov | |
| 9,440,484 | B2 | 9/2016 | Vaganov | |
| 9,734,622 | B2 | 8/2017 | Vaganov | |
| 9,898,865 | B2 * | 2/2018 | Thompson | G02B 27/017 |
| 1,021,726 | A1 | 2/2019 | Vaganov | |
| 1,052,195 | A1 | 12/2019 | Vaganov | |
| 2002/0024517 | A1 * | 2/2002 | Yamaguchi | H04N 13/239 345/424 |
| 2002/0036617 | A1 * | 3/2002 | Pryor | G06F 3/011 345/156 |
| 2003/0142068 | A1 | 7/2003 | DeLuca | |
| 2004/0046736 | A1 * | 3/2004 | Pryor | A63F 13/06 345/156 |
| 2006/0061545 | A1 | 3/2006 | Hughes | |
| 2006/0252474 | A1 * | 11/2006 | Zalewski | A63F 13/10 463/1 |
| 2006/0252477 | A1 * | 11/2006 | Zalewski | A63F 13/428 463/7 |
| 2008/0129899 | A1 | 6/2008 | Sharp | |
| 2009/0183193 | A1 * | 7/2009 | Miller, IV | G06K 9/00355 725/10 |
| 2010/0127970 | A1 * | 5/2010 | Oba | G06F 3/0488 345/156 |
| 2010/0156783 | A1 * | 6/2010 | Bajramovic | G06F 3/014 345/156 |
| 2010/0160041 | A1 * | 6/2010 | Grant | G06F 3/03545 463/31 |
| 2010/0261526 | A1 * | 10/2010 | Anderson | G06F 3/017 463/31 |
| 2011/0157155 | A1 | 6/2011 | Turner | |
| 2011/0227913 | A1 * | 9/2011 | Hyndman | A63F 13/211 345/419 |
| 2011/0254765 | A1 * | 10/2011 | Brand | G06F 3/017 345/158 |
| 2011/0292042 | A1 | 12/2011 | Vaganov | |
| 2013/0278631 | A1 | 10/2013 | Border | |
| 2013/0283208 | A1 | 10/2013 | Bychkov | |
| 2014/0292749 | A1 | 10/2014 | Vaganov | |
| 2017/0018112 | A1 | 1/2017 | Vaganov | |
| 2017/0309057 | A1 | 10/2017 | Vaganov | |
| 2019/0206112 | A1 | 7/2019 | Vaganov | |

OTHER PUBLICATIONS

Dorsey, Julie, et al.; "The Mental Canvas: A Tool for Conceptual Architectural Design and Analysis"; Computer Graphics and Applications, 2007, PG'07; 15th Pacific Conference on IEEE, 2007.

Gregory, Arthur D., Stephen A Ehmann, and Ming C. Lin; "InTouch: Interactive Multiresolution Modeling and 3D Painting with a Haptic Interface"; Virtual Reality, 2000; IEEE, 2000.

Keefe et al; "Drawing on Air: Input Techniques for Controlled 3D Line Illustration"; IEEE Transactions on Visualization and Computer Graphics; vol. 13, No. 5; Sep./Oct. 2007; pp. 1067-1081.

Non-final office action from U.S. Appl. No. 13/116,015 dated Nov. 5, 2013.

Non-final office action from U.S. Appl. No. 15/647,161 dated Apr. 4, 2018.

Notice of Allowance from U.S. Appl. No. 13/116,015 dated Mar. 14, 2014.

Notice of Allowance from U.S. Appl. No. 14/306,090 dated May 19, 2016.

Notice of Allowance from U.S. Appl. No. 15/229,269 dated Apr. 10, 2017.

Olsen, Luke, et al.; "Sketch-based modeling: A Survery"; Computers & Graphics 33.1; 2009; 85-103.

PCT; International Search Report and Written Opinion of the International Searching Authority correspodning to International Patent Application No. PCT/US2015/035811 dated Sep. 3, 2015; 13 pages.

Ryan, Michael; "3D Scuplting Using Voxels with an exploration into interfaces"; 2005.

(56) References Cited

OTHER PUBLICATIONS

USPTO; Non-Final Office Action for U.S. Appl. No. 16/265,767 dated Apr. 16, 2019.
USPTO; Notice of Allowance for U.S. Appl. No. 15/647,161 dated Oct. 11, 2018.
USPTO; Notice of Allowance for U.S. Appl. No. 16/265,767 dated Aug. 22, 2019.
Vaganov; U.S. Appl. No. 13/116,015, filed May 26, 2011.
Vaganov; U.S. Appl. No. 14/306,090, filed Jun. 16, 2014.
Vaganov; U.S. Appl. No. 15/229,269, filed Aug. 5, 2016.
Vaganov; U.S. Appl. No. 15/647,161, filed Jul. 11, 2017.
Vaganov; U.S. Appl. No. 16/265,767, filed Feb. 1, 2019.
Xin, Min, Ehud Sharlin, and Mario Costa Sousa; "Napkin Sketch: Handheld Mixed Reality 3D Sketching"; Proceedings of the 2008 ACM Symposium on Virtual Reality Software and Technology; ACM, 2008.

* cited by examiner

3D DIGITAL PAINTING

CROSS-REFERENCE TO RELATED APPLICATIONS

This application is a continuation-in-part of U.S. application Ser. No. 16/265,767 filed Feb. 1, 2019, for 3D DIGITAL PAINTING, which is a continuation of U.S. application Ser. No. 15/647,161 filed Jul. 11, 2017, for 3D DIGITAL PAINTING, now U.S. Pat. No. 10,217,264, issued Feb. 26, 2019, which is a continuation-in-part of U.S. application Ser. No. 15/229,269 filed Aug. 5, 2016, for 3D DIGITAL PAINTING, now U.S. Pat. No. 9,734,622, issued Aug. 15, 2017, which is a continuation-in-part of U.S. application Ser. No. 14/306,090, filed Jun. 16, 2014, for 3D DIGITAL PAINTING, now U.S. Pat. No. 9,440,484, issued Sep. 13, 2016, which is a continuation-in-part of U.S. application Ser. No. 13/116,015, filed May 26, 2011, for 3D DIGITAL PAINTING, now U.S. Pat. No. 8,817,017, issued Aug. 26, 2014, which claims the benefit of U.S. Provisional Application No. 61/396,649, filed Jun. 1, 2010, for 3D DIGITAL PAINTING, which are incorporated in their entirety herein by reference.

FIELD OF THE INVENTION

This invention relates to digital painting and drawing of three-dimensional images, that can be viewed and presented with different types of stereo vision. The present invention in various embodiments creates a new art of three-dimensional painting, provides a powerful tool in education from childhood education to university graduate education and further, provides a tool for science and engineering, in design of mechanical, architectural and fashion models and in chemical and biological research and the like. Generally, this invention can be used for objects navigating within a 3D virtual space and specifically is applicable but not limited to: 3D digital painting, 3D digital drawing, 3D digital design, 3D digital gaming, 3D digital augmented reality (AR), 3D virtual reality (VR), or 3D mixed reality (MR). In general, the technology of the present invention, in various embodiments, can be used for consumer, communication, educational, professional, environmental, military and other applications.

BACKGROUND

There is a need for improved mechanisms for digital drawing, painting and writing technologies. The information contained in a graphical or painted image (color or monochromatic) cannot be explained, interpreted or communicated by other means, for example by voice, for inputting digital information into a computer nearly as effectively as with the graphical or painted image.

However, until now all painting art is two-dimensional due to the two-dimensional nature of all known canvases (more precisely, drawing surface, even if it is not a plane but, for example, a cylindrical, spherical or other curved surface). One of the challenges of painting always was how to create an image of the third dimension, the illusion of depth of a picture. Although a number of great painters achieved fantastic results in this endeavor, nevertheless the interest in three-dimensional visual images resulted in art forms such as sculpture and architecture. However, painted sculptures didn't receive wide acceptance. Then, realization of three-dimensional or stereo vision, with the advent of photography, when two photo-cameras, spaced at a distance of about the distance between the human eyes, made two pictures. These pictures are viewed through the stereoscope, which was invented in 1838.

Progress in stereo photography (both stereo photographs and stereo motion pictures) has been made over the last 170 years. The most recent improvements in three-dimensional movies and three-dimensional TV are making an interest in these technologies even greater, as they become available in consumer products.

However, there remains a need for improvements in three-dimensional painting mostly because nothing changed in dimensionality of the two-dimensional canvas for painting.

There are several challenges to solving the problem of three-dimensional free-hand painting and drawing. The first challenge is a three-dimensional canvas for a free-hand painting and drawing on or within this canvas.

It is hard to imagine, from an existing technology viewpoint, a kind of media suitable for a true three-dimensional (cube) canvas, transparent and allowing for penetration into the cube with a brush, making a stroke of paint, and removing the brush without disturbing the rest of the media (i.e., drawing or painting). It sounds like science fiction, at least from the viewpoint of existing technology and known materials other than painted sculptures, requiring making of a sculpture, and then painting of such sculpture.

As known, depth perception, as visual ability to perceive the world in three dimensions arises from a variety of depth cues. From all the depth cues both monocular and binocular stereopsis found the most practical applications. Stereopsis is the process in visual perception leading to the sensation of depth from the two slightly different projections of the world onto the retinas of the two eyes. The differences in the two retinal images are called horizontal disparity, retinal disparity, or binocular disparity. The differences arise from the eyes' different positions in the head.

These two images corresponding to different visions of the right and left eyes are relatively easy to create by stereo-photography or stereo-movie by taking two pictures simultaneously with two cameras separated horizontally similar to two separated eyes. However, it is hard to imagine how an artist can paint two paintings of the same image on two different canvases for two eyes such that they later could be viewed with one of the stereoscopic viewing systems.

As long as art of painting exists, almost all artists have been trying to perfect techniques for a three-dimensional illusion on a two-dimensional canvas, demonstrating the long-felt need for a three-dimensional painting technique. Therefore, there is a need for creating a method and system for three-dimensional painting and drawing.

SUMMARY

A method of digital recording of three-dimensional painted and three-dimensional drawn images is presented. The method comprises the steps of: providing an electronic canvas (computer monitor, TV screen, projection screen, display of the mobile device, etc.); providing means for three-dimensional digital vision (shutter glasses, switching canvas between left and right eye, polaroid glasses, vertical cylinder lenses raster screens, etc.); providing at least one at least two-axis input control devices allowing digital painting or drawing on the canvas; providing additional at least one at least one-axis input control device for virtual changing the position of the canvas along the axis between the painter and the canvas; painting or drawing on the electronic canvas for each of the virtual positions of the canvas in the third dimension by changing this position with the at least one at least one-axis input control device and verifying this position with the means for three-dimensional digital vision; providing a description in digital format of images for right and left eyes on each virtual position of the canvas and of corresponding positions of the canvas; providing complete two-dimensional images of the painting for the right and the left eyes; using left and right images for presentation of three-dimensional painting by available means for three-dimensional vision.

A corresponding system for digital recording of three-dimensional painted and three-dimensional drawn images is also presented. The system comprises: an electronic canvas (computer monitor, TV screen, projection screen, display of the mobile device, etc.); means for three-dimensional digital vision (shutter glasses, switching canvas between left and right eye, etc.); at least one at least two-axis input control device allowing digital painting or drawing on the canvas; at least one at least one-axis input control device for virtual changing the position of the canvas along the axis between the painter and the canvas; means for three-dimensional image presentation; wherein the system provides painting or drawing on the electronic canvas for each of the virtual positions of the canvas in the third dimension by changing this position with the at least one-axis input control device and verifying this position with the means for three-dimensional digital vision; the system also provides a description in digital format of images for right and left eyes on each virtual position of the canvas and of corresponding positions of the canvas; the system also provides complete two-dimensional images of the painting for the right and the left eyes; the system provides using left and right images for presentation of three-dimensional painting by available means for three-dimensional vision.

In accordance with a further embodiment, the present invention can be characterized as a method of digital continuous and simultaneous three-dimensional painting and three-dimensional drawing, including the steps of providing a digital electronic canvas having a screen and capable of presenting two pictures for a right eye and a left eye; providing means for three-dimensional digital vision; providing means for three-dimensional image presentation comprising a processor; providing means for continuous changing of a virtual distance between the digital electronic canvas and a painter by digitally changing a horizontal shifting (disparity) between images for the right eye and the left eye on the digital electronic canvas corresponding to instant virtual canvas position; wherein a resolution $\Delta$ of continuity of changing of the virtual distance Z between the digital electronic canvas and the painter is defined by a size p of a pixel on the digital electronic canvas in horizontal direction and by a distance d between pupils of a painter's eyes according to an expression: $\Delta \approx 2p \ Z/d$; providing at least one three-axis input control device allowing digital painting or drawing on the digital electronic canvas; painting on the digital electronic canvas for any instant virtual positions of the digital electronic canvas providing simultaneous appearance of a similar stroke on the images for the right and the left eye, wherein a simultaneousness of appearance of the similar stroke on the images for the right and the left eye is limited by a smallest time interval equal to an inverted frequency of refreshment of frames on the digital electronic canvas and wherein a motion for making simultaneous and continuous strokes or lines in all three dimensions is provided simultaneously and continuously by free moving at least one part of a painter body.

In accordance with yet another embodiment, the present invention can be characterized as a system for digital continuous and simultaneous three-dimensional painting and three-dimensional drawing and digital recording of three-dimensional painted and three-dimensional drawn images including a digital electronic canvas having a screen and capable to presenting two pictures for a right eye and a left eye; means for three-dimensional digital vision (shutter glasses, polaroid glasses, splitting canvas on two canvases for the right eye and the left eye and switching the two canvases between the right eye and the left eye, or projecting both pictures for the right eye and the left eye on the digital electronic canvas, or projecting pictures for the right eye and the left eye directly into retinas of corresponding eyes, etc.) wherein instant positions of virtual canvas in three-dimensional virtual space are displayed; at least one three-axis input control device allowing digital painting or drawing on the digital electronic canvas; means for three-dimensional image presentation; wherein two inputs of at least one three-axis input control device are used for painting of lines or strokes along two orthogonal axes X and Y in a plane of the digital electronic canvas and a third input is used for painting or drawing the lines or strokes along Z axis between a painter and the digital electronic canvas by changing a distance between the painter and a virtual position of the digital electronic canvas along the Z axis allowing making three-dimensional paintings (drawings) equally continuous in (XY) plane and (XZ) and (YZ) virtual planes; and wherein a motion captured by the at least one three-axis input control device for making lines or strokes is provided simultaneously and continuously in all three dimensions by movements of at least one part of a painter body; and wherein the system also provides a description in digital format of images for the right eye and the left eye for every and all instant virtual positions of the digital electronic canvas and of corresponding positions of the digital electronic canvas; and the system also provides complete two-dimensional images of a painting for the right eye and the left eye at any stage of painting as accumulation of all lines and strokes made up to that stage; and the system also provides complete three-dimensional images of the painting by superposition of all layers corresponding to all virtual positions of the digital electronic canvas and the system provides, using two-dimensional left and right images, ability for presentation of three-dimensional painting by available means for three-dimensional vision.

In accordance with a further embodiment, the present invention can be characterized as a method of digital continuous and simultaneous three-dimensional painting, three-dimensional drawing, and three-dimensional cursor (object, image) navigating, including the steps of providing a digital electronic canvas having a screen or display, as a physical surface, configured for presenting two images: one for a right eye and the other for a left eye of a painter in front of the canvas; providing means for three-dimensional digital vision; providing means for three-dimensional image presentation comprising a processor; providing means for creating a continuous 3D virtual canvas comprising the display's surface of the digital electronic canvas and a volume that includes the display's surface by digitally changing a value and a sign of horizontal disparity between two images for the right eye and the left eye and their scaling on the digital electronic canvas corresponding to instant virtual distance between the painter's eyes and an instant image within the virtual 3D canvas; wherein a resolution $\Delta$ of continuity of changing of the virtual distance Z between the painter and virtual images within 3D virtual canvas is defined by a size p of a pixel on the digital electronic canvas in horizontal direction and by a distance d between pupils of the painter's eyes according to an expression: $\Delta \approx 2p\ Z/d$; providing at least one input control device comprising: a system of sensors that provide an input information about free 3D motion of at least one part of the painter's body into the at least one input control device for digital painting or drawing within 3D virtual canvas; providing at least one kind of a coupling between at least part of the at least one input control device and the at least one part of the painter's body, said coupling chosen from a group consisting of: mechanical coupling, optical coupling, electromagnetic coupling, sound coupling, ultrasound coupling, and a combination of two or more thereof, moving the at least one part of the painter's body while the system of sensors within the at least one input control device is providing information for recording change of vectors of mechanical motion parameters of the at least one part of the painter's body, said system of sensors provide simultaneous appearance of similar strokes or lines on the images for the right and the left eye for any instant position within 3D virtual canvas; wherein a simultaneousness of appearance of said similar strokes or lines on the images for the right and the left eye is limited by a smallest time interval equal to an inverted frequency of refreshment of frames on the digital electronic canvas and wherein a motion for making strokes or lines in all three dimensions is provided simultaneously and continuously in all directions of a 3D virtual canvas by free moving the at least one part of the painter's body.

In accordance with yet another embodiment, the present invention can be characterized as a system for digital continuous and simultaneous three-dimensional painting, three-dimensional drawing, three-dimensional cursor (object, image) navigating, and digital recording of three-dimensional painted and three-dimensional drawn images including,
a digital electronic canvas having a screen or display with a physical surface and configured for presenting two pictures: one for a right eye and the other for a left eye; means for three-dimensional digital vision, through which a painter sees 3D images; at least one multi-axis input control device comprising: a system of sensors, which provide an input information about free 3D motion of at least one part of the painter's body into the at least one multi-axis input control device for digital painting or drawing 3D images: means for at least one kind of a coupling between at least part of the at least one multi-axis input control device and at least one part of the painter's body, said coupling chosen from a group consisting of: mechanical coupling, optical coupling, electromagnetic coupling, sound coupling, ultrasound coupling, and a combination of two or more thereof; means for three-dimensional image presentation comprising a processor;
wherein inputs of the at least one multi-axis input control device are used by the means for three-dimensional image presentation for painting of lines or strokes along and around three axes X, Y and Z within XYZ virtual space; means for creating a continuous 3D virtual canvas comprising the display's surface of the digital electronic canvas and a volume that includes the surface by digitally changing a value and sign of horizontal disparity between two images for the right eye and the left eye and their scaling on the digital electronic canvas corresponding to instant virtual distance between the painter's eyes and an instant image within the virtual 3D canvas; wherein a resolution $\Delta$ of continuity of changing of the virtual distance Z between the painter and the virtual images within 3D virtual canvas is defined by a size p of a pixel on the digital electronic canvas in horizontal direction and by a distance d between pupils of the painter's eyes according to an expression: $\Delta \approx 2p\ Z/d$; wherein a motion captured by the at least one multi-axis input control device is used by the means for three-dimensional image presentation for making lines or strokes, and the motion is provided simultaneously and continuously in all three dimensions by movements of the at least one part of the painter's body; wherein a simultaneousness of appearance of said similar strokes or lines on the images for the right and the left eye is limited by a smallest time interval equal to an inverted frequency of refreshment of frames on the digital electronic canvas and wherein a motion for making strokes or lines in all three dimensions is provided simultaneously and continuously in all directions within 3D virtual canvas by free moving the at least one part of the painter's body; wherein the means for three-dimensional image presentation provides a description in digital format of images for the right eye and the left eye on the digital electronic canvas for every and all instant images made within 3D virtual canvas; wherein the means for three-dimensional image presentation provides complete two-dimensional images of a painting for the right eye and the left eye at any stage of painting as accumulation of all lines and strokes made up to that stage; and wherein the means for three-dimensional image presentation provides complete three-dimensional images of a painting including linear and angular position within 3D virtual canvas as accumulation of all lines and strokes made to the stage of completion and the means for three-dimensional image presentation provides two-dimensional left and right images to the means for three-dimensional digital vision for presentation of three-dimensional painting.

In accordance with a further embodiment, the present invention can be generalized and characterized as a method of digital continuous and simultaneous three-dimensional objects navigating, wherein objects within 3D virtual space can be one-dimensional, two-dimensional or three-dimensional and have permanent or variable size, shape, dimensions, combinations of colors, transparency, opacity and other visual properties and wherein navigating has a broader meaning of not only changing position and orientation within 3D virtual space but also other visual properties of the objects like shape and combination of colors, and the method including the steps of providing a digital electronic display, as a physical surface and configured for presenting two images: one for a right eye and the other for a left eye of a user in front of the digital electronic display; providing means for three-dimensional digital vision; providing means for three-dimensional image presentation comprising a processor; providing means for creating a continuous 3D virtual canvas comprising the display's surface of the digital electronic canvas and a volume that includes the display's surface by digitally changing a value and a sign of horizontal disparity between two images for the right eye and the left eye and their scaling on the digital electronic canvas corresponding to instant virtual distance between the user's eyes and an instant (3D) image of the object within the virtual 3D canvas; wherein a resolution $\Delta$ of continuity of changing of the virtual distance Z between the user and virtual images within 3D virtual canvas is defined by a size p of a pixel on the digital electronic canvas in horizontal direction and by a distance d between pupils of the painter's eyes according to an expression: $\Delta \approx 2p\ Z/d$; providing at least one input control device (tool) comprising: a system of sensors that provide an input information about free 3D motion of at least one part of the user's body into the at least one input control device (tool) for digital objects navigating within 3D virtual canvas; providing at least one kind of a coupling between at least part of the at least one input control device (tool) and the at least one part of the user's body, said coupling chosen from a group consisting of: mechanical coupling, optical coupling, electromagnetic coupling, sound coupling, ultrasound coupling, and a combination of two or more thereof, moving the at least one part of the user's body while the system of sensors within the at least one input control device (tool) is providing information for recording change of vectors of mechanical motion parameters of the at least one part of the user's body, said system of sensors provide simultaneous appearance of similar images of the objects for the right and the left eye for any instant position within 3D virtual canvas; wherein a simultaneousness of appearance of said similar images of the objects for the right and the left eye is limited by a smallest time interval equal to an inverted frequency of refreshment of frames on the digital electronic canvas and wherein a motion of the objects in all three dimensions is provided simultaneously and continuously in all directions of a 3D virtual space by free moving the at least one part of the user's body.

In accordance with yet another embodiment, the present invention can be characterized as a system for digital continuous and simultaneous three-dimensional object navigating, and digital recording of three-dimensional objects images and including: a digital electronic display with a physical surface and configured for presenting two pictures: one for a right eye and the other for a left eye of a user; means for three-dimensional digital vision, through which a user sees 3D images; at least one multi-axis input control device (tool) comprising: a system of sensors, which provide an input information about free 3D motion of at least one part of the user's body into the at least one multi-axis input control device (tool) for digital objects navigating; means for at least one kind of a coupling between at least part of the at least one multi-axis input control device (tool) and the at least one part of the user's body, said coupling chosen from a group consisting of: mechanical coupling, optical coupling, electromagnetic coupling, sound coupling, ultrasound coupling, and a combination of two or more thereof; means for three-dimensional image presentation comprising a processor, wherein inputs of the at least one multi-axis input control device (tool) are used by the means for three-dimensional image presentation for objects navigating along and around three axes X, Y and Z within XYZ virtual space; means for creating a continuous 3D virtual canvas comprising the geometrical surface of the digital electronic display and a virtual volume that includes the geometrical surface of the digital electronic display within said 3D virtual canvas by digitally changing a value and sign of horizontal disparity between two images for the right eye and the left eye and their scaling on the digital electronic display corresponding to instant virtual distance between the user's eyes and an instant (3D) image within the virtual 3D canvas; wherein a resolution $\Delta$ of continuity of changing of the virtual distance Z between the user and the virtual images within 3D virtual canvas is defined by a size p of a pixel on the digital electronic display in horizontal direction and by a distance d between pupils of the user's eyes according to an expression: $\Delta \approx 2p\ Z/d$; wherein a motion captured by the at least one multi-axis input control device (tool) is used by the means for three-dimensional image presentation for making objects navigating, and the motion is provided simultaneously and continuously in all three dimensions by movements of the at least one part of the user's body; wherein a simultaneousness of appearance of similar scaled images of the objects for the right and the left eye is limited by a smallest time interval equal to an inverted frequency of refreshment of frames on the digital electronic display and wherein a motion of the objects in all three dimensions is provided simultaneously and continuously in all directions within 3D virtual canvas by free moving the at least one part of the user's body; wherein the means for three-dimensional image presentation provides a description in digital format of images for the right eye and the left eye on the digital electronic display for every and all instant images made within 3D virtual canvas; wherein the means for three-dimensional image presentation provides complete two-dimensional images of the object for the right eye and the left eye at any stage of image navigating as accumulation of all objects made up to that stage; and wherein the means for three-dimensional image presentation provides complete three-dimensional images of the object including linear and angular position within 3D virtual canvas as accumulation of all objects made to the stage of completion and the means for three-dimensional image presentation provides two-dimensional left and right images to the means for three-dimensional digital vision for presentation of three-dimensional objects.

DETAILED DESCRIPTION

Figure 1:
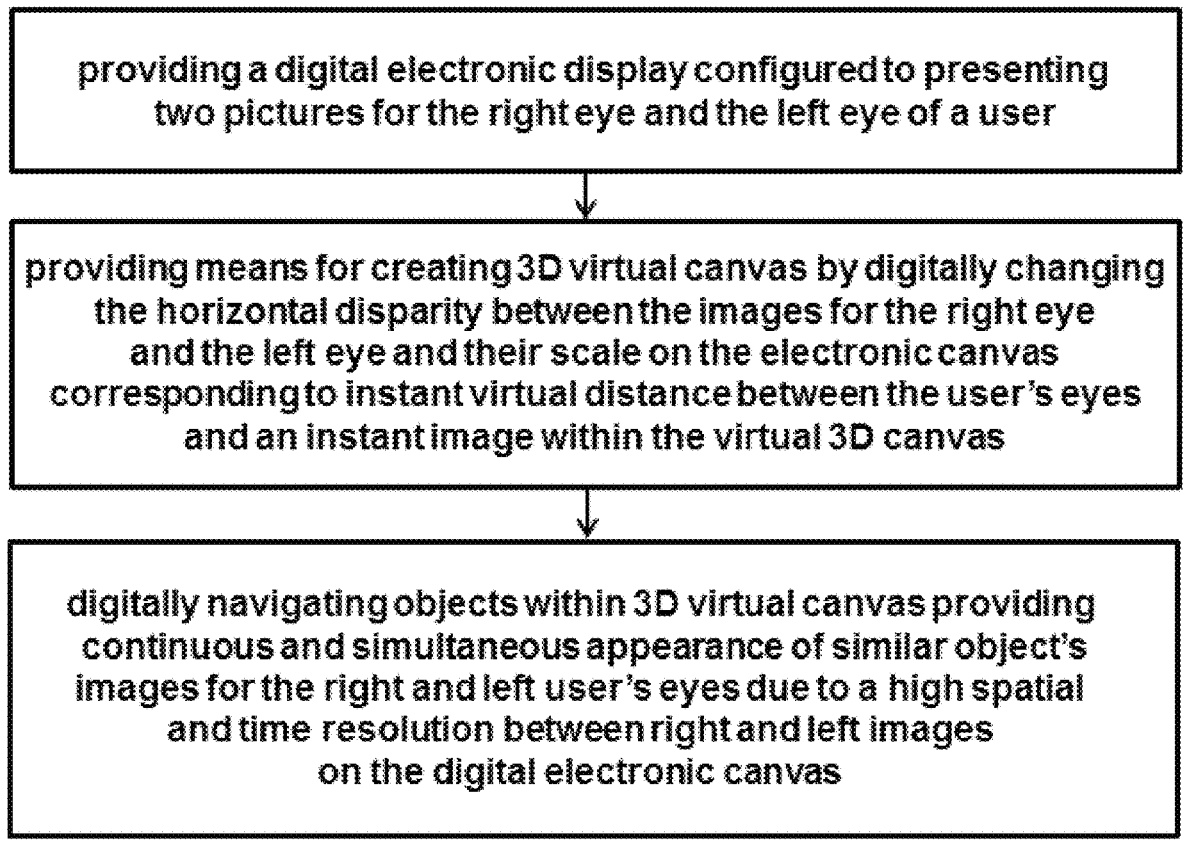
FIG. 1 shows a core principle of the generalized method of three-dimensional digital object navigating in accordance with one embodiment.

Specific embodiments of the invention will now be described in detail with reference to the accompanying figures.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Objects and Advantages

A feature of the present invention in accordance with some embodiments is to provide a method of 3-dimensional digital painting, drawing, writing or designing and cursor or object (image) navigating within virtual or augmented 3-dimensional space.

Another feature of the present invention in accordance with some embodiments is to provide a method of 3-dimensional digital painting, drawing, writing or designing and cursor or object navigating accomplished by motion of at least one part of the painter's body.

Another feature of the present invention in accordance with some embodiments is to provide a method of 3-dimensional digital painting, drawing, writing or designing and cursor or object navigating accomplished by simultaneous motion of several parts of the painter's body.

Another feature of the present invention in accordance with some embodiments is to provide a method of handless 3-dimensional digital painting, drawing, writing or designing and navigating of the cursor or object on the monitor accomplished by motion of at least one part of the painter's body other than arms, hands or fingers, for example, by motion of eye-balls of the user.

Another feature of the present invention in accordance with some embodiments is to provide the means for three-dimensional image presentation comprising a processor.

Another feature of the present invention in accordance with some embodiments is to provide a method of visualizing initially empty 3-dimensional virtual or augmented space for digital painting by presenting of temporary 3D virtual grid created by a system of lines related to a chosen system of coordinates within said space, wherein this grid helps to see where the instant 3D image is located within 3D canvas and how it is scaled depending on the virtual distance between the painter's eyes and location of instant image Another feature of the present invention in accordance with some embodiments is to provide a capability to select, rotate, shift and zoom a certain volume of temporary 3D virtual grid created by a system of lines related to a chosen system of coordinates within virtual space of painting.

Another feature of the present invention in accordance with some embodiments is to provide a method of 3-dimensional digital painting, drawing, writing or designing and cursor or object or image navigating within virtual or augmented 3-dimensional space in the "walking" mode, when a painter is moving around the created 3D objects within virtual or augmented 3-dimensional space.

Another feature of the present invention in accordance with some embodiments is to provide a method of 3-dimensional digital painting, drawing, writing or designing and cursor or image navigating within virtual or augmented 3-dimensional space in the ("turn-table") mode, when a painter works in the comfort of his/her chair while the objects of a project are selected, shifted, rotated, zoomed relative to the painter's field of view.

Another feature of the present invention in accordance with some embodiments is to provide a method of 3-dimensional digital navigating of the objects within the virtual or augmented three-dimensional space of a computer monitor, mobile gaming device or devices comprising glasses or headsets for three-dimensional vision.

Another feature of the present invention in accordance with some embodiments is to provide a method of 3-dimensional digital editing of the three-dimensional pictures, drawings or photos (three-dimensional photoshop).

Another feature of the present invention in accordance with some embodiments is to provide a method of converting 2-dimensional images into 3-dimensional images.

Another feature of the present invention in accordance with some embodiments is to provide a method of digital recording of three-dimensional painted and three-dimensional drawn images.

Another feature of the present invention in accordance with some embodiments is to provide a method of 3-dimensional digital painting, drawing, writing or designing and navigating simultaneously by multiple participants, which creates a new platform for virtual three-dimensional communication, education, gaming, design, research and development and entertainment.

Another feature of the present invention in accordance with some embodiments is to provide a system for 3-dimensional digital painting, drawing, writing or designing and cursor or object navigating within virtual or augmented 3-dimensional space.

Another feature of the present invention in accordance with some embodiments is to provide a system of 3-dimensional digital painting, drawing, writing or designing and cursor navigating accomplished by motion of at least one part of the painter's body.

Another feature of the present invention in accordance with some embodiments is to provide a system of 3-dimensional digital painting, drawing, writing or designing and cursor navigating accomplished by simultaneous motion of several parts of the painter's body.

Another feature of the present invention in accordance with some embodiments is to provide a method of handless 3-dimensional digital painting, drawing, writing or designing and navigating of the cursor or object on the monitor accomplished by motion of at least one part of the painter's body other than arms, hands or fingers, for example, by motion of eye-balls of the user.

Another feature of the present invention in accordance with some embodiments is to provide a method of 3-dimensional digital navigating of the objects within the virtual or augmented three-dimensional space of a computer monitor, mobile gaming device or devices, which comprise glasses or headsets for three-dimensional vision.

Another feature of the present invention in accordance with some embodiments is to provide a system for handless 3-dimensional painting, drawing, writing or designing and digital navigating of the features in three-dimensional computers and mobile devices which is accomplished by motion of at least one part of the painter's body other than arms, hands or fingers, for example, by motion of eye-balls of the user.

Another feature of the present invention in accordance with some embodiments is to provide a system for converting 2-dimensional images into 3-dimensional images.

Another feature of the present invention in accordance with some embodiments is to provide a system for digital recording of three-dimensional painted and three-dimensional drawn or designed images.

Another feature of the present invention in accordance with some embodiments is to provide a system for 3-dimensional digital painting, drawing, writing or designing and navigating simultaneously by multiple participants, that creates a new platform for three-dimensional communication, education, gaming, design, research and development and entertainment.

Another feature of the present invention in accordance with some embodiments is to provide input control devices for digital three-dimensional painting, three-dimensional drawing, writing or designing and navigating objects within virtual or augmented 3-dimensional space created by digital electronic canvas and by means for three-dimensional vision.

Another feature of the present invention in accordance with some embodiments is to provide such input control devices that provide required number of controlled dimensions, required dynamic range of strokes or lines and required accuracy of strokes or lines.

Another feature of the present invention in accordance with some embodiments is to provide input control device controlled by fingers and hand that provides multiple controlled parameters, wide dynamic range of strokes or lines and highest accuracy of strokes or lines.

Another feature of the present invention in accordance with some embodiments is to provide voice-controlled input control devices for digital three-dimensional painting, drawing, writing or designing and navigating objects within virtual or augmented 3-dimensional space created by digital electronic display and by means for three-dimensional vision.

Another feature of the present invention in accordance with some embodiments is to provide a system, which is capable to make 3D stereo photo-picture or 3D video, then editing, enhancing, filtering and modifying three-dimensional photo images (three-dimensional photoshop), and to provide transmitting the edited 3D images via standard channel by the smart phone.

Another feature of the present invention in accordance with some embodiments is to provide a universal tool, which can be used for multiple applications. It can be used as a painting or drawing or designing tool, as a pen or pencil for writing, as a mouse or joystick for navigation on the screen of computer or mobile gaming, it can have a wireless capability and can be used as a universal remote control of different electronically controlled equipment and utilities in the household, smart home or business environment, it can be combined with cell-phone capabilities with all the attributes, which a smart phone has: display including touch-sensitivity, multiple photo-cameras including 3D capabilities, microphone, speakerphone, voice recognition with AI features, control buttons, etc.

Another feature of the present invention in accordance with some embodiments is to provide a system, which can be configured from available electronic equipment, as a building blocks, depending on a specific application, specific tasks, specific characteristics and user's preferences.

Another feature of the present invention in accordance with some embodiments is to provide a system, which has a portable, collapsible, low cost headset capable to accept a smart phone with ability to make 3D pictures and display both pictures for the right and for the left eyes on the common phone's display and then editing, enhancing, filtering and modifying three-dimensional photo images (three-dimensional photoshop), and to provide transmitting the edited 3D images via standard transmitting channel to any other phone including those which don't have a 3D photo-camera, but received 3D pictures can be viewed with the low cost headset.

Another feature of the present invention in accordance with some embodiments is to provide a system of possible future of the wearable smart phones—smart glasses, that comprises among others at least two photo-cameras for measuring the position of the eye balls and calculating the point of eyes focus; then two external cameras each embedded into micro-suspensions and micro actuators allowing rotating these cameras similar to the eye balls and in control mode repeating the point of focus of the eyes although the depth of the focal plane can be variable.

Another feature of the present invention in accordance with some embodiments is to provide a system of smart glasses, wherein besides visual, voice, 6D motion inputs, etc. it has a wireless graphics input control devise that provides inputing graphical or color painted images, which impossible to introduce to the system by any other means.

Another feature of the present invention in accordance with some embodiments is to provide a system of smart glasses, wherein a remote graphics input control device comprises in addition to tactile force sensor an additional optical sensor tracking the position and movements of the control device.

Another feature of the present invention in accordance with some embodiments is to provide a system of smart glasses, that provides tactile capability, as additional input control device for the user, which can additionally provide a number of input controls, like remote touch-pad, typing and texting, control of the display functions and processes needed for enhancing smart glasses.

Another feature of the present invention in accordance with some embodiments is to provide a system of smart glasses, wherein tactile capability comprises tactile sensor arrays, Another feature of the present invention in accordance with some embodiments is to provide a system of smart glasses, wherein remote input control tools have tactile sensing capability combined with haptics capabilities.

Another feature of the present invention in accordance with some embodiments is to provide a system of smart glasses, wherein remote input control tools have tactile capability, combined with haptics capabilities are also combined with harvesting energy ability.

PREFERRED EMBODIMENTS

Principles of the method of digital three-dimensional painting and three-dimensional drawing illustrated in FIG. 1 and can be described as follows:
  providing a digital electronic canvas configured to presenting two pictures for the right and left eye;
  providing means for creating a continuous 3D virtual canvas by digitally changing a value and sign of horizontal disparity between two images for the right eye and the left eye and scaling the images on the digital electronic canvas corresponding to instant virtual distance between the painter and an instant image within the virtual 3D canvas;
  digitally painting within 3D virtual canvas for each virtual position of the canvas providing continuous and simultaneous appearance of a similar strokes on the right and left images due to a high spatial and time resolution between right and left image on the digital electronic canvas.

Figure 2:
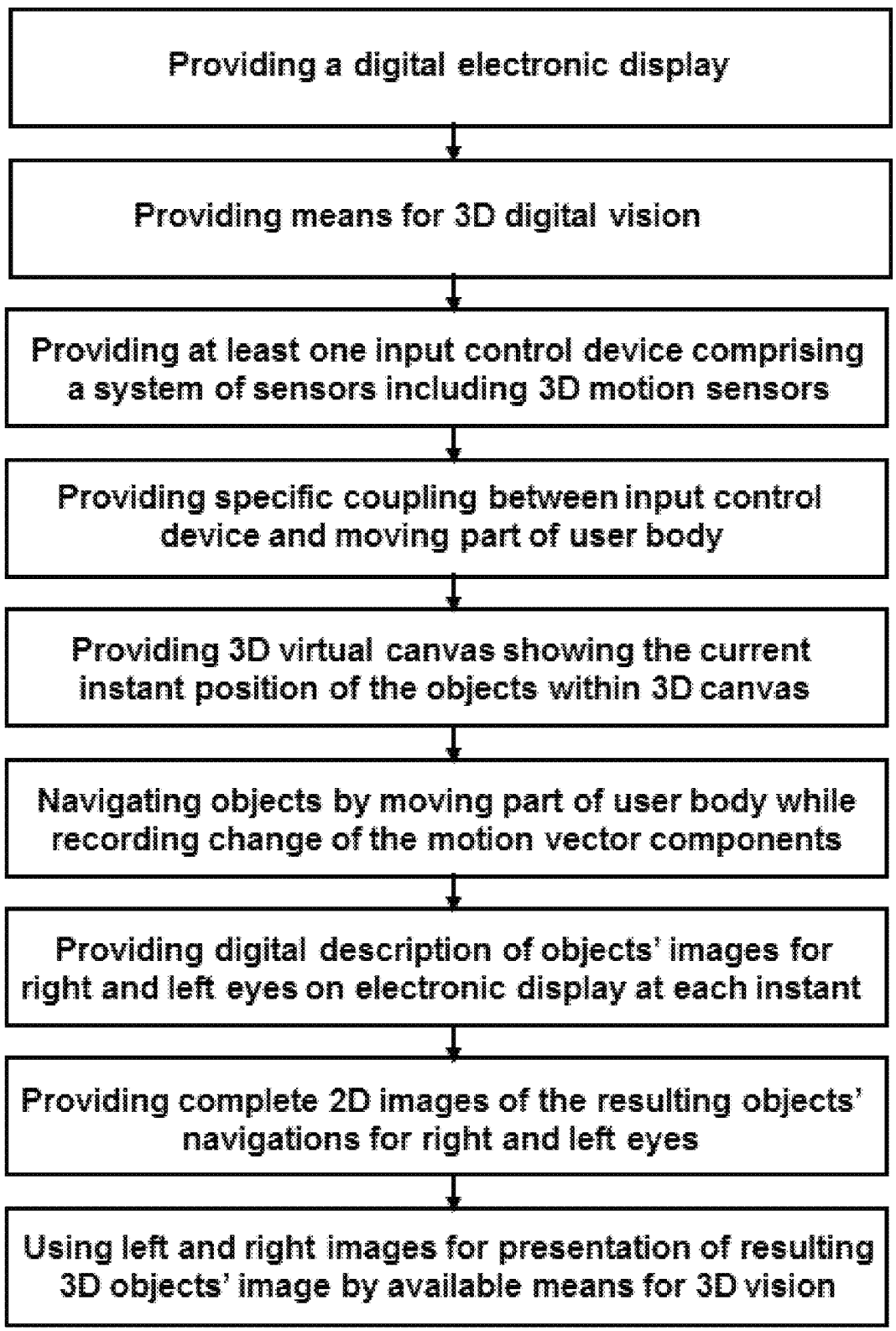
FIG. 2 shows an algorithm of the method for digital recording of three-dimensional object navigating in accordance with a further embodiment.

Based on these principles a method of digital recording of three-dimensional painted and three-dimensional drawn images is illustrated in FIG. 2 and is represented by the following sequence of steps:
providing an electronic canvas (computer monitor, TV screen, projection screen, display of the mobile device, 3D digital personal viewer, etc.);
providing means for three-dimensional digital vision (shutter glasses, splitting canvas on two canvases and switching these canvases between left and right eye, 3D digital personal viewer, etc.);
providing means for three-dimensional image presentation comprising a processor;
providing a continuous 3D virtual canvas showing the current instant position and size (scale) of the images within the virtual 3D canvas;
providing at least one input control device comprising a system of sensors including 3D motion sensors;
providing at least one kind of a coupling between at least one input control device and the at least one part of the painter's body
painting or drawing within 3D canvas by moving part of painter's body while recording change of the motion vector components;
providing a description in digital format of images for right and left eyes on electronic canvas for each instant moment;
providing complete two-dimensional images of the painting for the right and the left eyes;
using left and right images for presentation of 3D painting by available means for three-dimensional vision.

Figure 3A:
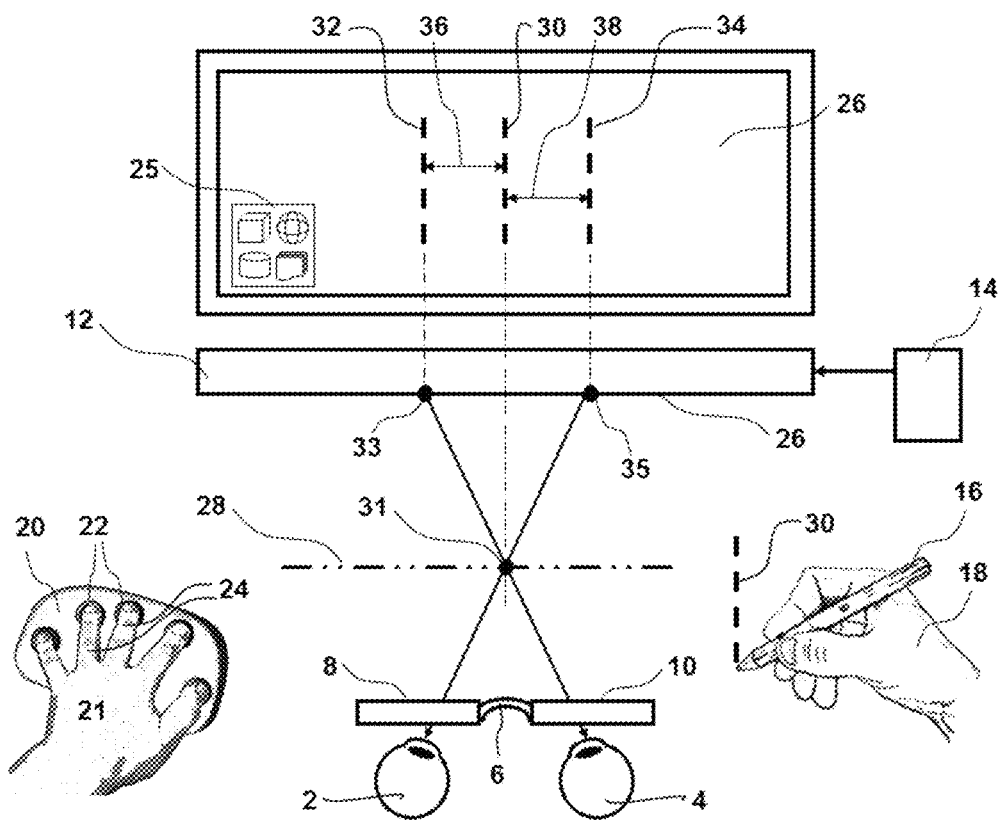
FIG. 3A shows a concept of three-dimensional digital painting on a virtual canvas located between painter and digital monitor in accordance with another embodiment and FIG. 3B illustrates even more detailed concept of three-dimensional painting with multiple input control devices, different means for stereo image presentation and vision and different kind of coupling between input control devices and different parts of human body, motion of which result in three-dimensional painting.
Figure 3B:
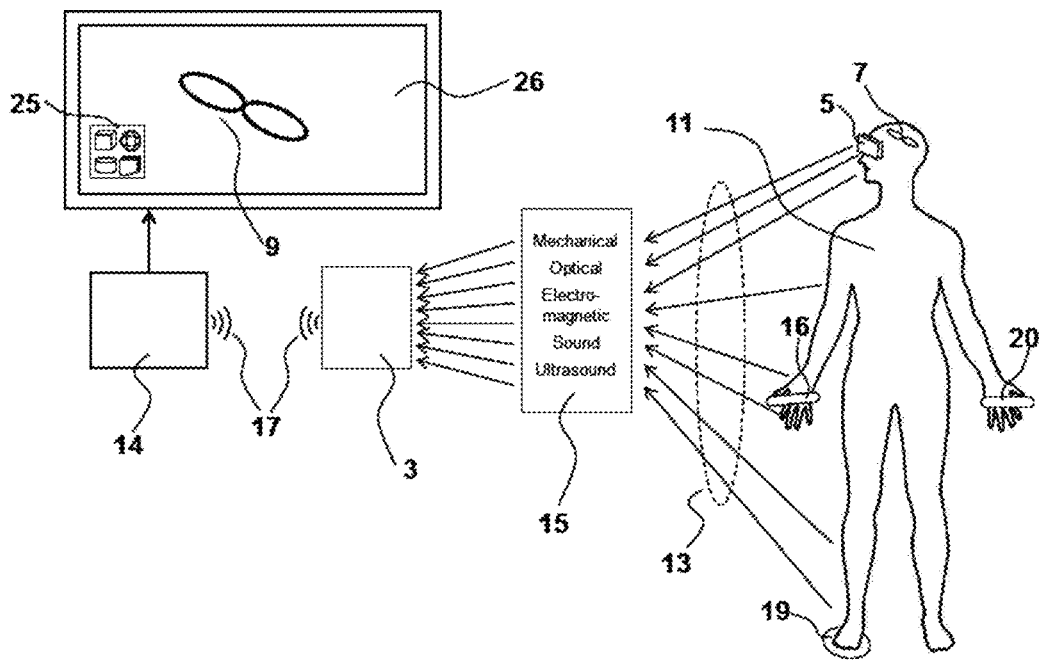

This method and corresponding system for realization of this method are illustrated in FIGS. 3A and 3B. The system comprises an electronic canvas 26 (computer monitor, TV screen, projection screen, display of the mobile device, etc.) controlled by computer 14, as shown in FIG. 3A. 3D digital personal viewer 5, as shown in FIG. 3B, also serves as an electronic canvas, which might have its own processor or communicating with the computer 14. Means for three-dimensional digital vision require two properties. First, it requires an ability of the screen 26 to represent two canvases for the right and left eye. It can be done either by switching the screen between canvases for the right and the left eye, by projecting two images with different polarization for the right and the left eye, by making two striped canvases, which overlap in a way when columns of pixels on the screen are located in turn belonging to two different canvases—right and left or to have two micro-displays for the left and right eye, as in 3D digital personal viewer 5 in FIG. 3B. The second property requires an ability to distinguish corresponding images for the right and the left eye. It can be realized either by using shutter glasses 6 (FIG. 3A) synchronized with the switching of the screen, or by using the raster of vertical miniature cylinder lenses on the front surface of the screen 26, or using the corresponding polarizing filters in the positions 8 and 10 on the eye-glasses 6, or to have two micro-displays for the left and right eye within 3D digital personal viewer 5 (FIG. 3B), or to use autostereoscopic digital displays, which do not require any glasses.

The next key component of the system is at least one input control device comprising a system of sensors, which provide an input information about free motion of at least one part of the painter body into input control device for digital painting or drawing on the digital electronic canvas. FIG. 3A illustrates two input control devices. One of them is electronic brush or pen 16 allowing painting or drawing on the canvas 26 either by hand and/or fingers 18, as shown in FIG. 3A, or by at least one part of the painter's body other than hand and finger coupled to the electronic brush or pen. Obviously this brush/pen can be digital, wireless and provide many other functions useful for inputting information into digital processing systems. For example, in one embodiment brush 16 comprises at least one three-axis input control device allowing digital painting or drawing on the digital electronic canvas, wherein two inputs of at least one three-axis input control device are used for painting of lines or strokes along two orthogonal axes X and Y in a plane of the digital electronic canvas and a third input is used for painting or drawing the lines or strokes along Z axis between a painter and the digital electronic canvas by changing a distance between the painter and an instant virtual position of the digital electronic canvas along the Z axis allowing making three-dimensional paintings (drawings) equally continuous in (XY) plane and (XZ) and (YZ) virtual planes; and wherein a motion captured by the at least one three-axis input control device for making lines or strokes is provided simultaneously and continuously in all three dimensions by movements of at least one part of a painter body.

In another embodiment brush 16 (FIG. 3A) comprises at least one two-axis input control device, wherein two inputs of said at least one two-axis input control device are used for painting of lines or strokes along two orthogonal axes X and Y in a plane of the digital electronic canvas. Another hand 21 is controlling additional at least one-axis input control device 20 for changing an instant virtual position of the 2D canvas along the axis Z between the painter and the canvas. Simultaneous motion of both painter's hands provide three-dimensional paintings (drawings) equally continuous in (XY) plane and (XZ) and (YZ) virtual planes. Although two-axis input control device within the brush 16 is sufficient for painting of lines or strokes along two orthogonal axes X and Y in a plane of the digital electronic canvas increasing a number of axes gives many additional features. For example, using three-axis input control would allow to use it not only like a pen with constant width of the line but like a real brush, when a painter will be able to change the width of the line in the process of painting exactly how he is doing with the real brush. Moreover, additional controls on the tool might allow changing the color, transparency, structure of the stroke and many other characteristics of the painting process and resulting images.

The second input control device 20 in FIG. 3A can have multiple control buttons/joysticks 22 can be used for different fingers 24 increasing the number of functions to be controlled. The control buttons/joysticks 22 can be one-axis, two axis or three-axis additionally increasing the number of controlled functions. If thumb and four fingers are used and each of the buttons/joysticks is a three-axis device then 15 control functions can be used simultaneously. The other parts of the painter's body can also be used for this purpose. For example, controlling functions of the digital painting process can be chosen from a group of: action, turning on and off, navigation of a cursor on the display of the electronic device, scrolling, zooming, shadowing, screening, selecting, rotating, deleting, restoring, saving, opening, closing, searching, setting up, previewing, undoing, clearing, repeating, pasting, finding, replacing, inserting, formatting, color selection, color mixing, line or stroke width, brush size, swatch size, sponge size, eraser size, the canvas virtual position, the depth of the focal plane around the canvas virtual position, special effects or combination. Naturally, all these additional tools and functions can be located within virtual 3D painting canvas by dedicating a certain portion 25 of it, as it shown in FIG. 3A. This at least one selected portion of the temporary 3D virtual grid is used as a toolbox for arranging and organizing multiple parameters and characteristics of the painting tools, color palette, painting process and its different steps, visual effects, setups, commands, wherein a selectable 3D toolbox is chosen from a group: rolodex, 3D stack of sliding flat windows, rotating in different directions geometrical shapes like cube, cylinder, prism, pyramid, sphere, ellipsoid, the surface of which is used for positioning the icons activating corresponding actions, 3D tree with a trunk, branches, sub-branches and leaves corresponding to desirable organizational structure. Moreover, each or some of all those virtual tools can be assigned to a specific input control device coupled to a specific part of a painter's body and parameters of these input control devices such as sensitivity and range can be adjusted remotely.

FIG. 3B illustrates more details and variations of the method and system for digital continuous and simultaneous three-dimensional painting. Input control device 3 is coupled to at least one part of the painter's body 11, wherein a coupling between at least part of the input control device and at least one part of the painter body is chosen from the group 15: mechanical coupling, optical coupling, electro-magnetic coupling, sound coupling, ultrasound coupling or a combination of two or more thereof. For example, input control devices can be mechanically coupled to arm, forearm, hand or fingers, as it is shown by positions 16 and 20. Input control device 19 can be coupled to a foot either mechanically or electro-magnetically respectively comprising, for example, mechanical sensors or electro-static or electro-magnetic proximity sensors. It also can be coupled mechanically to a head and optically to the eyes of the painter, as it shown in position 5. In this case the 3D digital personal viewer 5 combines several functions: function of the digital electronic canvas having a screen and capable to present two pictures for a right eye and a left eye, function of a 3D viewer and the function of input control device providing an input information about the motion of the both eyes and about the motion of the head, when it comprises at least one multi-axis motion sensor. In general any part of the human body can be coupled to an input control device with one or another kind of coupling or its combination. Generalized input control device 3 wirelessly 17 connected to the processor 14 controlling electronic canvas 26 or 5. Obviously multiple input control devices can be used simultaneously in the complex process of three-dimensional painting and in concert with virtual tool box 25. FIG. 3B also illustrates that the system for digital continuous and simultaneous three-dimensional painting can be assembled from the pieces of available electronic equipment provided however by support of corresponding software. When many parts of the human body are supplied with different kind of motion sensors, then such system can be used not only for the painting purpose but also for biomedical applications in research, analysis, medical evaluations and diagnostics, rehabilitation, training in sports, military and competitions because it is capable to provide recording of two-dimensional and three-dimensional images of the motion of the entire body with all its parts synchronized in time and mutual position in three dimensional space.

In accordance with some embodiments, the parts of the human body most suitable for free three-dimensional movement are arms, forearms, hands and fingers thanks to the evolutional genius of biomechanics of bones, joints and muscles of these parts. For many practical applications including painting two properties of moving parts of the body are most important: the range of the motion in all three dimensions and the absolute accuracy of the motion. In average the range of motion is largest for an arm and a forearm. Hand has much smaller range of motion and fingers even smaller. The accuracy of the motion is lowest for the arm and the forearm and significantly higher for the hand and especially high for the fingers. Knowing these properties for centuries painters artists, when they painted pictures especially on the large canvases, which required the use of a full range of arm and forearm motion for large strokes and reaching all the area of the canvas, they also used a maul-stick for providing required support for the forearm or hand to increase accuracy of painting by switching the motion from arm and forearm to motion of hand or fingers. Another challenge of accurate painting is that small accurate strokes require slow accurate motion. It requires very high sensitivity of motion sensors, which is not always achievable. One of the embodiments describes the use of a "digital maulstick". From method viewpoint it requires several steps: freeze the position of the brush within interested area of three-dimensional virtual space, when the brush is moved, for example by free arm; switch the accuracy of the brush to a higher value by either switching the brush or adjusting the input control on the brush, which provides required accuracy; placing the hand with the brush on supporting surface, which provides more accurate motion of the hand and the fingers; turn on (unfreeze) the brush motion and continue to paint within interested area of three-dimensional virtual space with higher accuracy. All these steps realize function of digital maulstick.

This system provides painting or drawing on the electronic canvas for each of the instant virtual positions of the canvas in the third dimension by changing this position with the at least one-axis input control device and verifying this position with the means for three-dimensional digital vision. The system also provides a description in digital format of images for the right and the left eyes on each virtual position of the canvas and of corresponding positions of the canvas The system also provides complete two-dimensional images of the painting for the right and the left eyes by superposition of all layers corresponding to virtual positions of the canvas for the right and the left eye separately The system also provides complete three-dimensional images of the painting by superposition of all layers corresponding to all virtual positions of the canvas. The system provides using left and right images for presentation of three-dimensional painting by available means for three-dimensional vision.

As soon as the system will provide complete two-dimensional images of the painting for the right and the left eye, any available system for stereoscopic imaging can be used for presentation of three-dimensional paintings.

Figure 4:
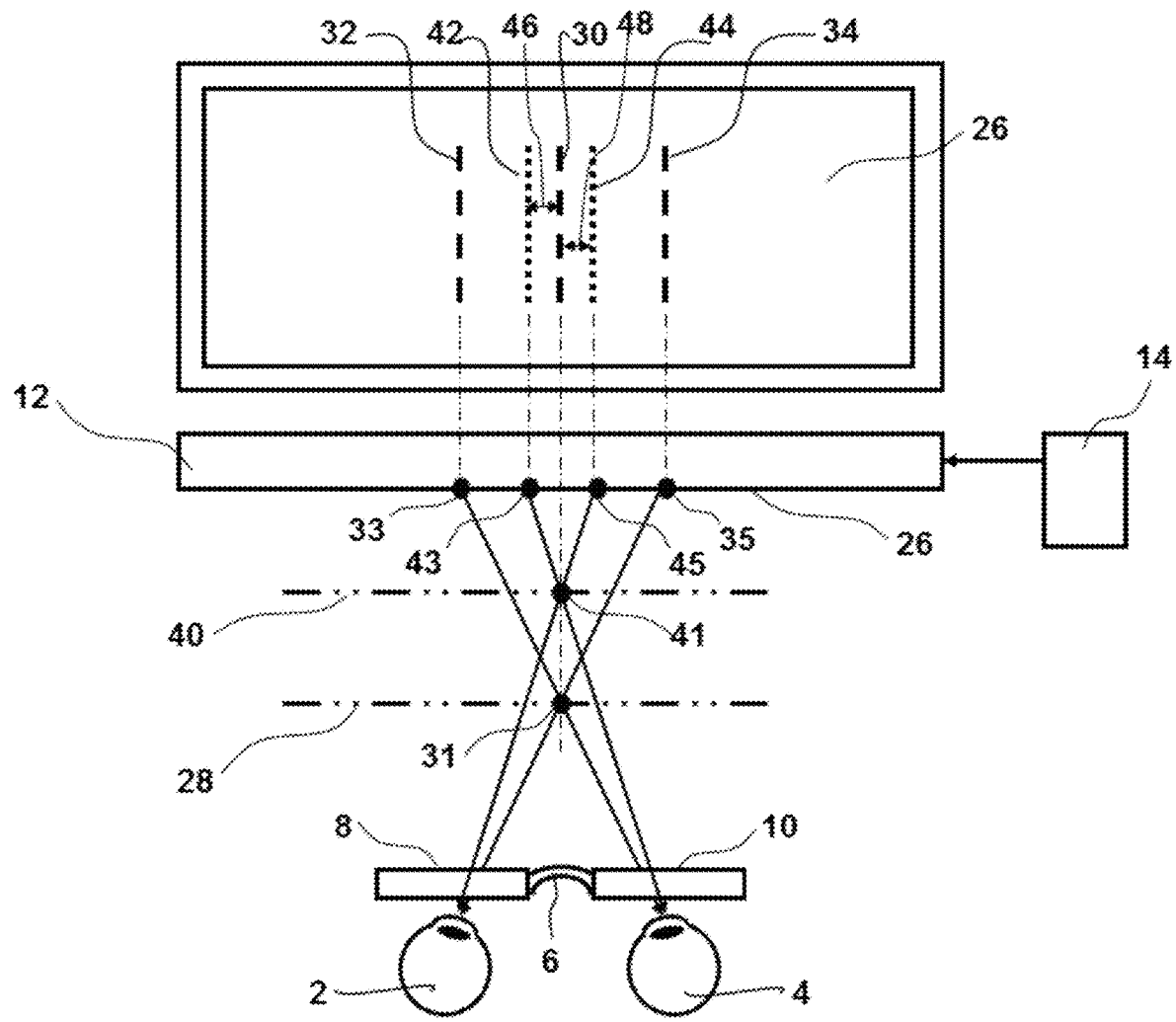
FIG. 4 illustrates how horizontal disparity between images for the right eye and the left eye on the digital electronic display depend on corresponding instant virtual 2D canvas position relative to the painter's eyes.

The method of three-dimensional painting is further illustrated in FIG. 3A. A painter is painting with an electronic brush 16, which he is moving, for example, by his hand 18 either on any surface suitable for moving an electronic brush along this surface or in the air. Let us suppose that a painter is painting a vertical line 30 and he wants to paint it in the virtual position of the canvas 28 in location 31 corresponding to a central line between the eyes 2 and 4. This virtual plane 28 is located between the screen 26 and the painter. It means that both eyes should be focused on the point 31 to see that line in the desired position. It means, in turn, that the image of this line for the right eye should be located on the screen 26 in the position 33 and the image of this line for the left eye should be located on the screen 26 in the position 35. Then the painter will be seeing the line 30 outstanding from the screen plane 26 to the virtual canvas plane 28 in the position 31. For achieving this effect the control device 22 should provide the shift of the line 30 image for the right eye on a distance 36 into location 32 (33). For the left eye similar shift should be 38 in opposite direction into position 34 (35). In other words, the instant virtual position of the canvas is determined by the corresponding shifts of the right and left images in the opposite horizontal directions with respect to the central line on the screen, as illustrated in FIG. 4. It creates binocular disparity and visual sensation of depth.

Changing the shifts of the images for the right eye from 32 to 42 and for the left eye from 34 to 44 the virtual canvas position will change from plane 28 to plane 40, as it is clear from FIG. 4.

Figure 5:
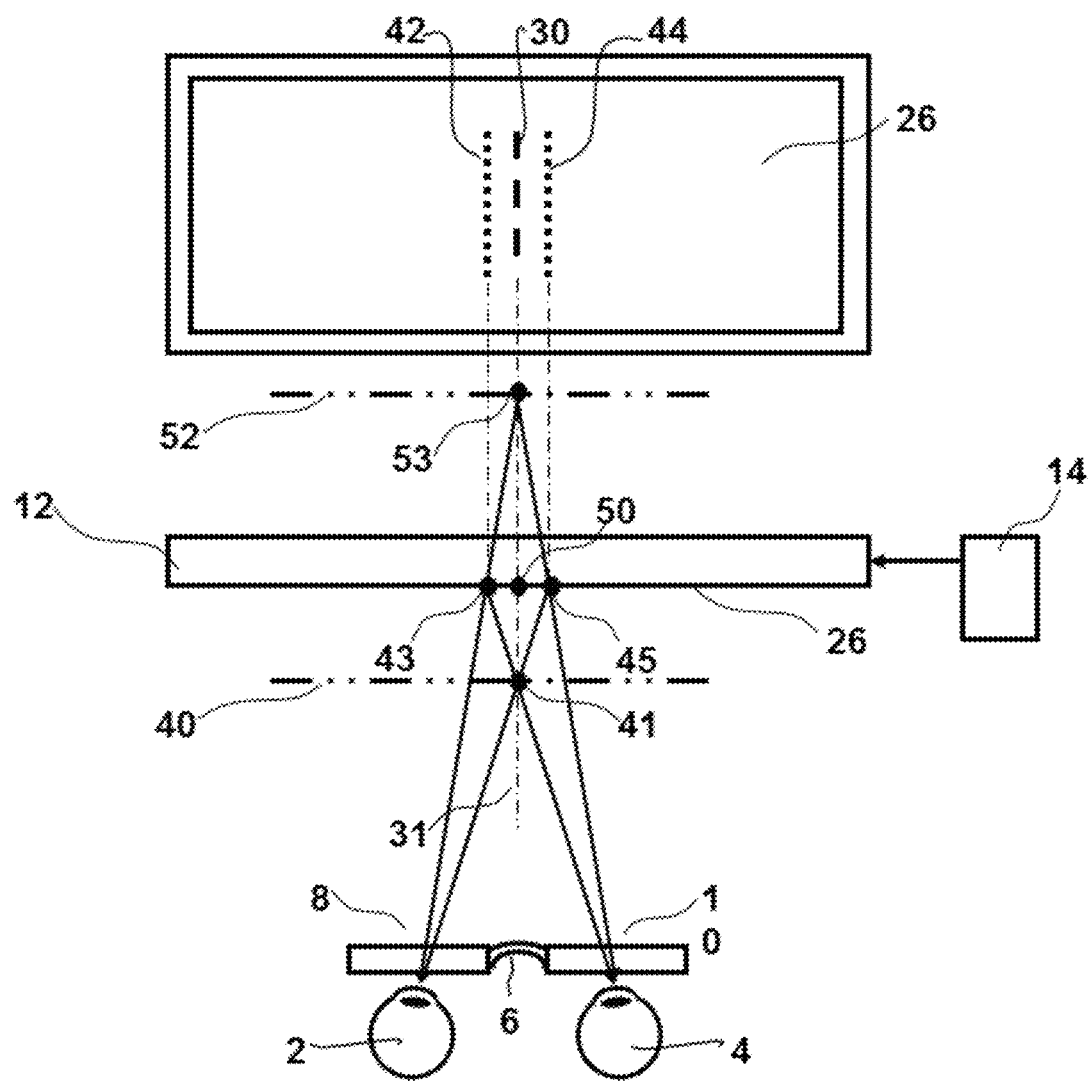
FIG. 5 illustrates how the horizontal disparity between images for the right eye and the left eye on the digital electronic display change sign, when virtual 2D canvas changes position from in front of the display to behind the plane of a display.

FIG. 5 illustrates how the virtual position of the canvas could be located either in front of the screen or behind the plane of the screen. If the line 42 (43) on the screen 26 is allocated to the virtual screen for the right eye 4 and the line 44 (45) on the screen 26 is allocated to the virtual screen for the left eye 2, then the location of the virtual screen corresponds to plane 40. The image of the line 30 (50) will be located in the position 41 on the virtual plane 40, which is located between the screen 26 and the painter.

Let us now change the allocations of the images 43 and 45 on the screen 26 between the right and left eyes. If the line 42 (43) on the screen 26 is allocated to the virtual screen for the left eye 2 and the line 44 (45) on the screen 26 is allocated to the virtual screen for the right eye 4, then the location of the virtual screen corresponds to plane 52. The image of the line 30 (50) will be located in the position 53 on the virtual plane 52, which is positioned behind the screen 26.

It is clear that when the image of the line 30 supposed to be located on the screen plane in the position 50, then there is no difference between the images for the right and the left eye, i.e. there is no shift between the images for the right and the left eye with respect to the center line 31 between the right and the left eye. In this case there is no horizontal or binocular disparity.

Figure 6A:
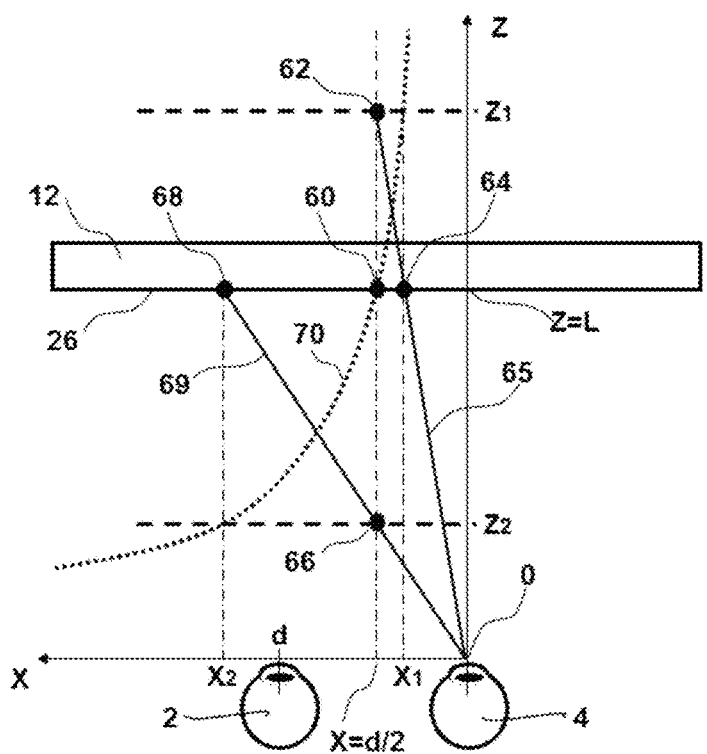
FIGS. 6A and 6B illustrate the offset (horizontal disparity) of the virtual canvas for a right and left eye correspondingly, as a function of the virtual canvas position.
Figure 6B:
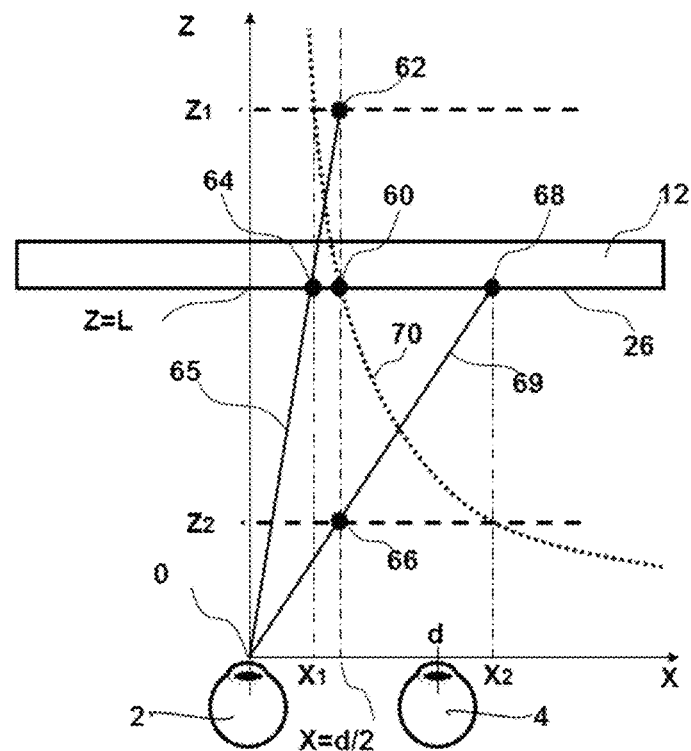

FIG. 6A illustrates the function 70 between the desired location of the virtual 2D canvas plane Z1 or Z2 and the image 64 or 68 correspondingly on the screen 26 for the right eye 4. Similarly FIG. 6B illustrates the same for the left eye. This function can be expressed as:

$$Z = Ld/2x, \quad (1)$$

where Z—location of the virtual canvas;
L—distance between painter and monitor;
d—distance between eyes;
x—location of the image on the screen.

Therefore, in order to move the virtual canvas into a coordinate Z on the axis Z, which originates in the painter eye and perpendicular to the screen, the control of this function should provide a horizontal shift x of the virtual canvas for this eye relative to the point on the screen where axis Z crosses the screen. This shift should be directed toward the other eye. As a result, two virtual canvases will exist in the painter's field of vision and due to their mutual shift in opposite directions the painter will see one virtual screen located either in front or behind the plane of the screen in the coordinate Z. This required shift x can be determined from (1) as:

$$x = Ld/2Z,$$

The minimal shift x is determined by a size of the pixel p on the screen, which defines the resolution of the motion in the plane of the screen. Therefore, this resolution should also define a resolution $\Delta$ of continuity of changing of the virtual distance Z between the digital electronic canvas and the painter according to the expression:

$$\Delta \approx 2p \, Z/d$$

Symbol $\approx$ was used to reflect that the accuracy of this expression is limited and is in the range of 0.3-0.5%.

Figure 7:
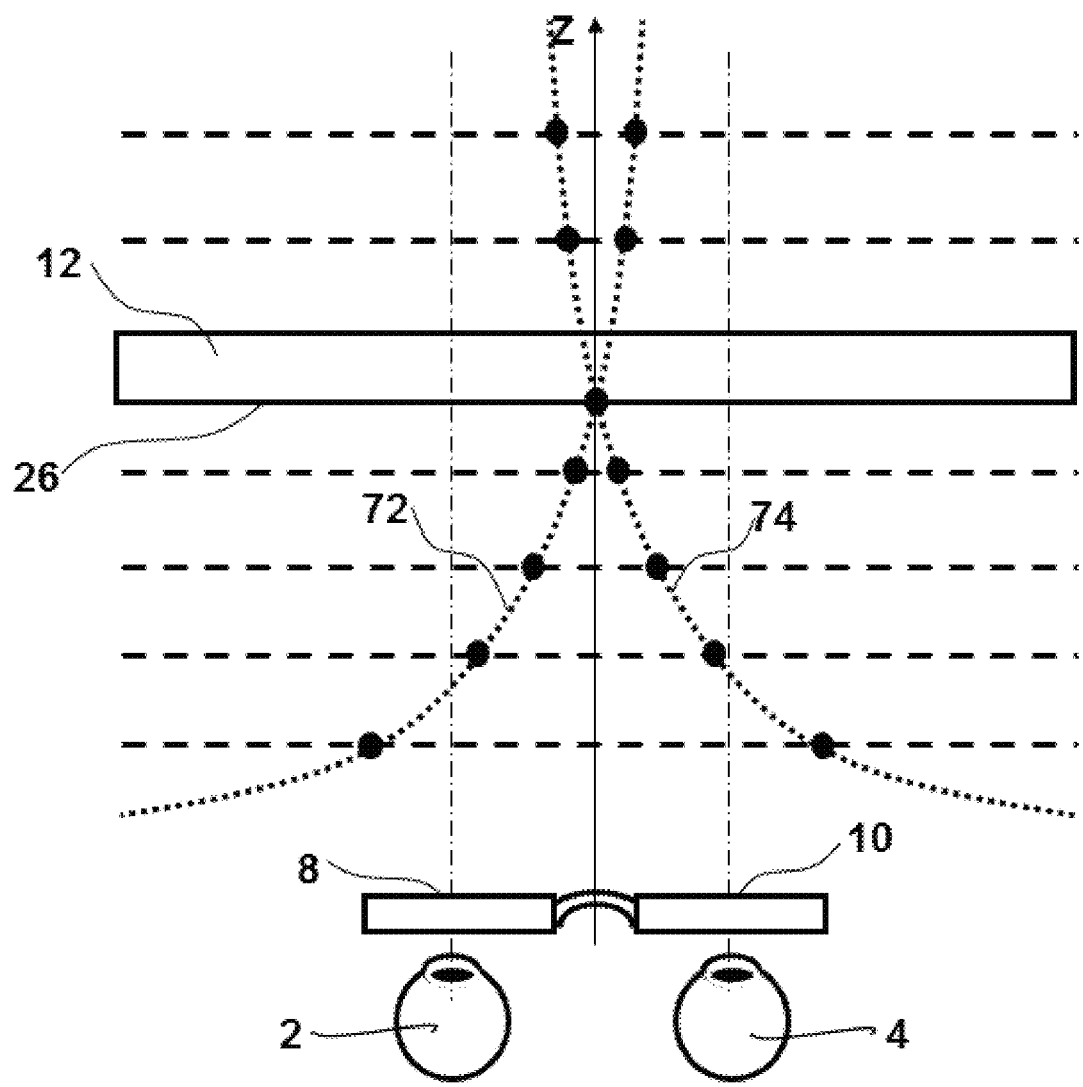
FIG. 7 illustrates how central vertical lines of the displays for the right and left eyes change (offset) in opposite directions depending on the virtual position of the canvas.

FIG. 7 combines FIGS. 6A and 6B presenting both functions 72 and 74 for right and left eye correspondingly.

The challenge with determining the position of the initial canvas is that it is blank and the right and left eye cannot see the difference in their images. Similar situation will exist at the beginning stage of painting, when there are not too many images or the strokes of the electronic brush already exist on the canvas. Even at the later stages of painting or in case of editing three-dimensional pictures (three-dimensional photoshop) it would be very helpful to have temporary grid or system of lines, which would give a painter or observer the visual representation of the current position of the virtual canvas.

In the simplest case the virtual position of the canvas is presented by at least one virtual Z-axis having an origin somewhere in the plane parallel to the screen. It might be located at the location of a painter and directed from the painter plane toward the screen. It has a scale describing a distance from the painter to the virtual position of the canvas and this current virtual position of the canvas is indicated on the scale.

The origin of the virtual Z-axis can be located somewhere in the horizon line and indicate the position of the virtual canvas on the scale of the axis. In general one virtual Z-axis is presented on the screen as a line with the scale connecting some point on the periphery of the screen with some inner point within the screen. The pitch of the scale might be non-linear reflecting the changing distance of the object from the painter.

In more general cases virtual Z-axis can be presented by the line chosen from: straight line, curved line, periodic line, spiral line, vertical line, horizontal line, descending line, ascending line and combination.

Figure 8:
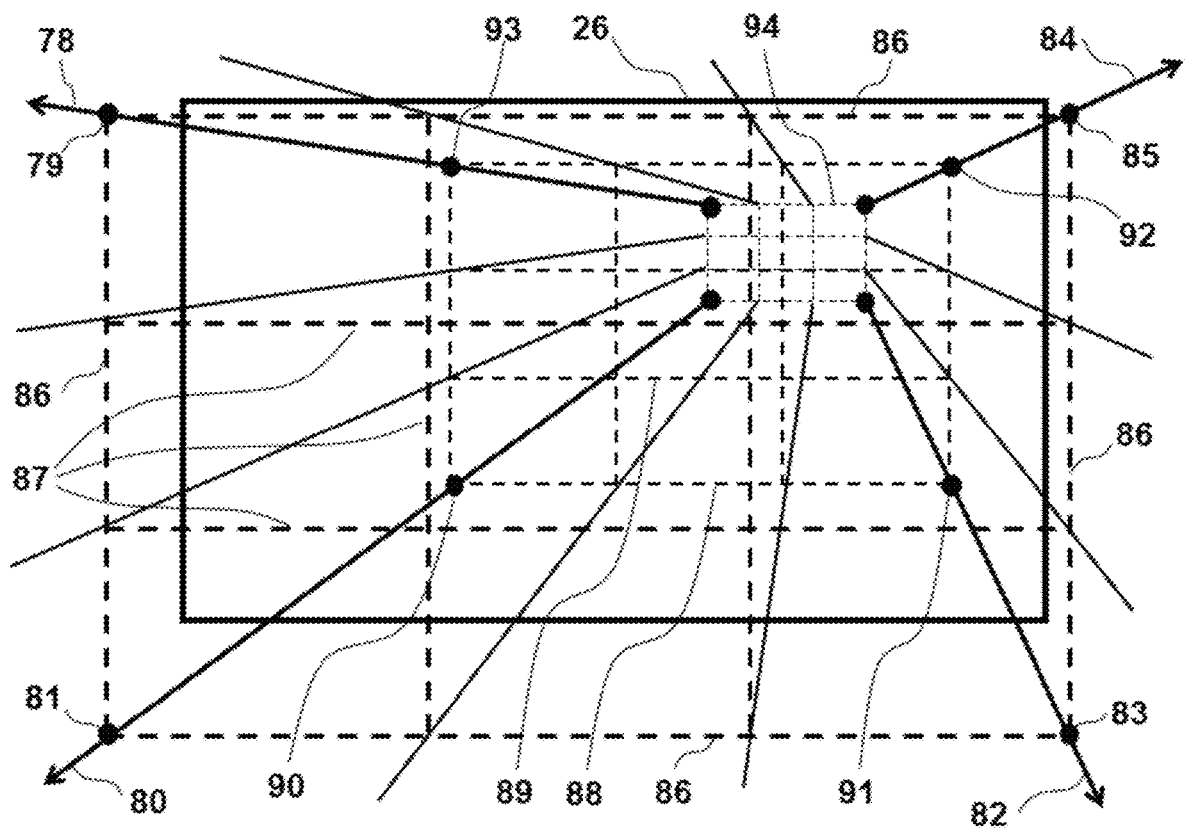
FIG. 8 illustrates virtual Z-axes and temporary grid indicating the instant position of virtual canvas.

It is more convenient to have several Z-axes, as shown in FIG. 8. In this case it is possible to show: the position of the virtual canvas; scaling of the similar objects depending on the position of the virtual canvas; either virtual infinite point—origin of all Z-axes or the most distant virtual position of the canvas, both of which can be selected by the painter. Four major Z-axes 78, 80, 82 and 84 along with several additional Z-axes define a three-dimensional grid, as show in FIG. 8. Corresponding points on the major Z-axes are connected by lines 86, 88, 94 creating a visual representation of the plane, which can correspond to a current position of the virtual canvas. The temporary grid visually defining the virtual position of the canvas is a system of lines including lines connecting points on different virtual Z-axes corresponding to the same position of the virtual canvas.

These rectangles 86, 88 and 94 can have additional inner lines 87, 89, which further provide scaling of two-dimensional images on each virtual position of the canvas. This two-dimensional scaling can be provided automatically while position of canvas is changing. The function of two-dimensional scaling of the canvas position can be chosen beforehand and it will determine the depth of the painting. The depth of the painting in Z dimension can be controlled depending on requirements to a three-dimensional painting. The Z-axes are perceived by the painter as lines going in Z direction from the painter toward some point behind the screen or in opposite direction because they are presented on both canvases for right and left eyes. Therefore, the entire grid is seen as a three-dimensional structure, within which the painting is happening.

There are a number of options that exist with choosing the location and position of the axes, their scales, and, as a result, instant virtual positions of the canvas. For example, at least one virtual Z-axis can have an angle relative to the perpendicular to the canvas in the range of 0 to 90 degrees. The scale on the at least one virtual Z-axis can be chosen as linear, exponential, logarithmic, sine, or any other function. The scale on different virtual Z-axes can be different reflecting the different angular position of the virtual canvas with respect to different virtual Z-axes. In another example, there could be two systems of grids: one is steady coupled to the display or screen and another is moving coupled to the painter's eyes, which can provide more flexibility and accuracy in mutual angular positioning of the 3D objects or images and their scaling within 3D virtual space In general a virtual instant current position of the canvas is presented within a virtual space of temporary 3D virtual grid created by a system of lines related to a chosen system of coordinates within said space, for example Cartesian, Spherical, Cylindrical, Ellipsoidal, etc., and wherein said temporary 3D virtual grid or selected portion of it can be rotated or shifted relative to a painter, wherein this temporary 3D virtual grid allows painter navigate placement of the strokes or 3D sketching within initially empty 3D virtual space and also place the strokes to the sides and to the back of the painted three-dimensional object, when the front view of the object is already defined and wherein this temporary 3D virtual grid can be turned off and on at any time in the process of painting.

Angular direction of the X and Y axes on the canvas can change for different virtual positions of the canvas or for different points of the at least one virtual Z-axis. It would reflect the possibility of creating a distorted three-dimensional virtual space (convex or concave, sort of "crooked mirrors"), which can predetermine the desired distortion of the images within this space independently of the sequence of creating/painting those images.

Figure 9:
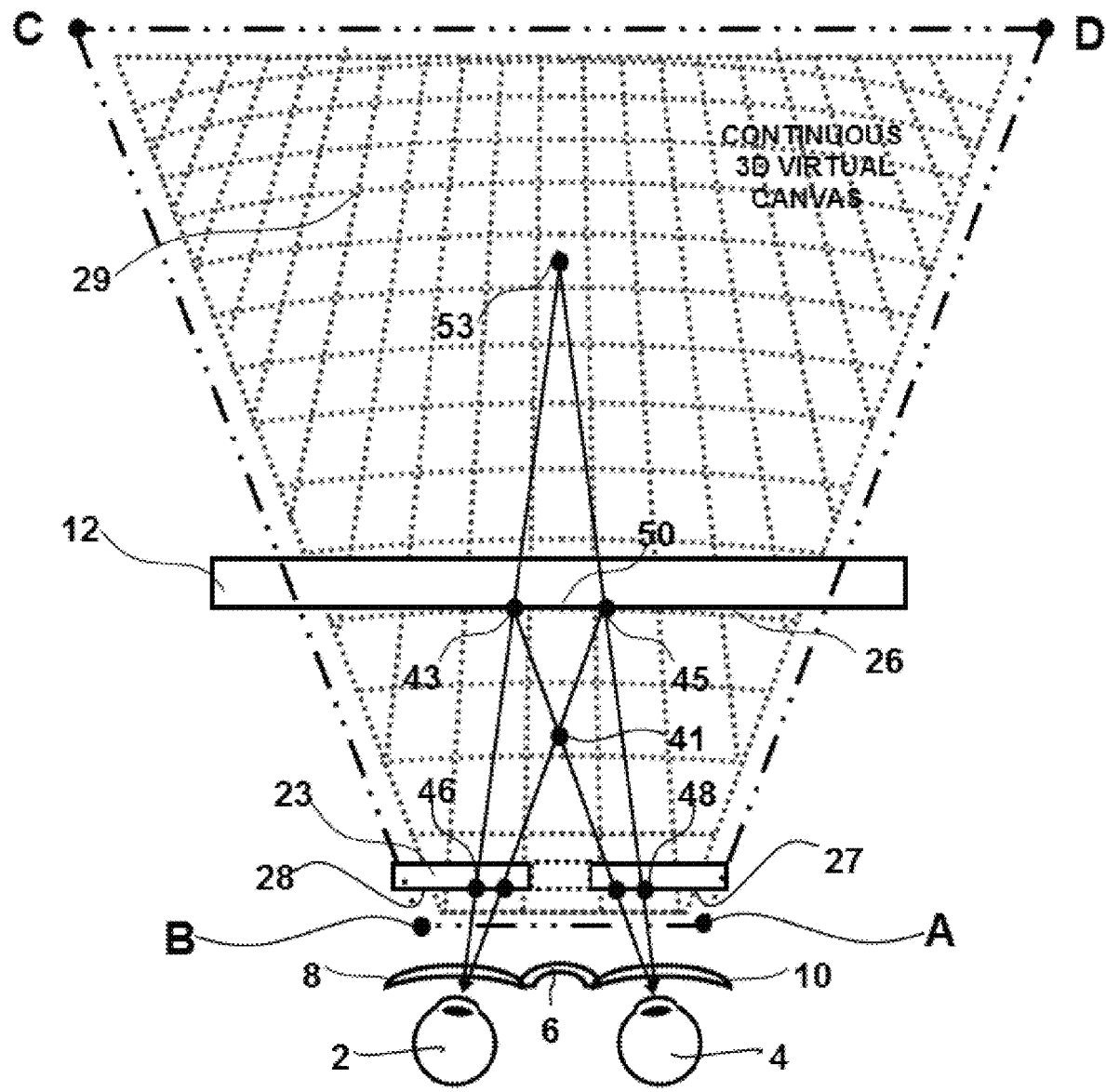
FIG. 9 illustrates the concept of a continuous 3D virtual canvas.

Some of the embodiments for 3D painting were described based on the concept of painting canvas, which historically and traditionally was a two-dimensional surface. The idea of painting in third dimension perpendicular to the plane of the canvas was presented and interpreted as moving a position of the 2D canvas (when it becomes a virtual 2D canvas) closer or further from the painter making the entire painting space three-dimensional. While this approach of presentation and interpretation of 3D painting looks productive in explaining the interrelations between two 2D images for the right and the left eye and stereoscopic virtual 3D image it does not completely reflect the reality and differentiation of invented 3D painting, which is based on a concept of continuous 3D virtual canvas. FIG. 9 illustrates this concept for two cases of digital electronic canvas: steady 3D digital monitor 12 and 3D digital personal viewer 23 with two micro-displays. In one embodiment steady 3D digital monitor 12 has a display 26, which represent a real 2D canvas that actually is two canvases on one display: one is for the right eye and another is for the left eye. These two 2D canvases are separated one from another either by different intervals of time, when each is presented on the display, or by different characteristics like polarization or color, when they are presented simultaneously and continuously on the display 26. As it was explained earlier, 3D stereoscopic images 41 or 53 can appear either between the painter's eyes 2, 4 and surface 26 (position 41) of the display 12 or behind the display 26, as in position 53, depending on sign and value of the horizontal disparity between the 2D images on the display 26 for the right and left eye. Schematically the space between the points A, B, C and D represents a three-dimensional space where the painter can paint 3D picture continuously within this 3D virtual canvas. The virtual distance between AB and CD represents the "depth of the 3D virtual canvas", which certainly can be chosen by the painter prior to painting or changed later. In another embodiment the space of this 3D virtual canvas can be defined by the temporary 3D grid 29, which schematically shown in the FIG. 9 (third dimension, which would be vertical relative to the painter is not shown). As shown in FIG. 9, the temporary grid reflects how the size of the objects can be scaled depending on the position within 3D canvas. It also reflects how already pained or existed objects can be scaled, when they are navigated or moved in another position within 3D canvas. The side-planes of the 3D virtual canvas AD and BC define the field of horizontal view, which is determined by the size of the screen and distance between the painter head and the screen 26. The field of view if it is in the range of human binocular vision allows painter to create a virtual three-dimensional picture within the sector AB and C and D. The field of horizontal view represents the "width of the 3D virtual canvas", which is obviously variable. Similarly the field of vertical view (not shown in FIG. 9) would represent the "height of 3D virtual canvas". The limiting border AB of the 3D virtual canvas is defined by a maximum angle of bringing eyes together. In reality it can be not a flat surface presented by line AB but a curved surface depending on physiological specifics of painter's eyes. The limiting border CD is located on a distance Zmax from the painter, which is the maximum depth of the 3D virtual canvas and it depends on the painter's ability to distinguish the minimal amount n of pixels in horizontal shift of the image on the display 26 according to the expression:

$$Zmax = Ld/2n, \quad (2)$$

where Zmax—the maximum depth of the 3D virtual canvas;
L—distance between painter and monitor;
d—distance between eyes;
n—minimal number of pixels on the display that painter is capable to distinguish in horizontal direction.

According to another embodiment digital electronic canvas 23 inside 3D digital personal viewer has two microdisplays 27 and 28 for the right and for the left eye correspondingly representing two 2D canvases. As 2D displays are located close to the eyes of the painter two additional lenses 8 and 10 are required for focusing images on the displays directly into corresponding eyes. After adjustment of the lenses 8 and 10 so that the surface of the displays 27 and 28 will be in the focus of the painter's eyes the 3D space between the displays and the glasses is very limited for using it as part of the 3D virtual canvas. It means that the overwhelming majority of the 3D virtual canvas in this case will be located behind the plane of the microdisplays 27 and 28. Similarly to the previous case 3D stereoscopic image 53 can appear behind the display 27 and 28, when the real images 48 and 46 appear on the 2D displays 27 and 28 correspondingly for the right and the left eyes. The field of horizontal view is determined by the size of the displays and distance between the painter head and the displays and also by the relation of it to the range of human binocular vision. The maximum depth of the 3D virtual canvas Zmax from the painter is determined by the same expression (2), where parameter L, as distance between the painter and the display, is much smaller than in the previous case and the painter's ability to distinguish the minimal amount n of pixels in horizontal shift of the image on the displays 27 and 28 is also different.

Figure 10:
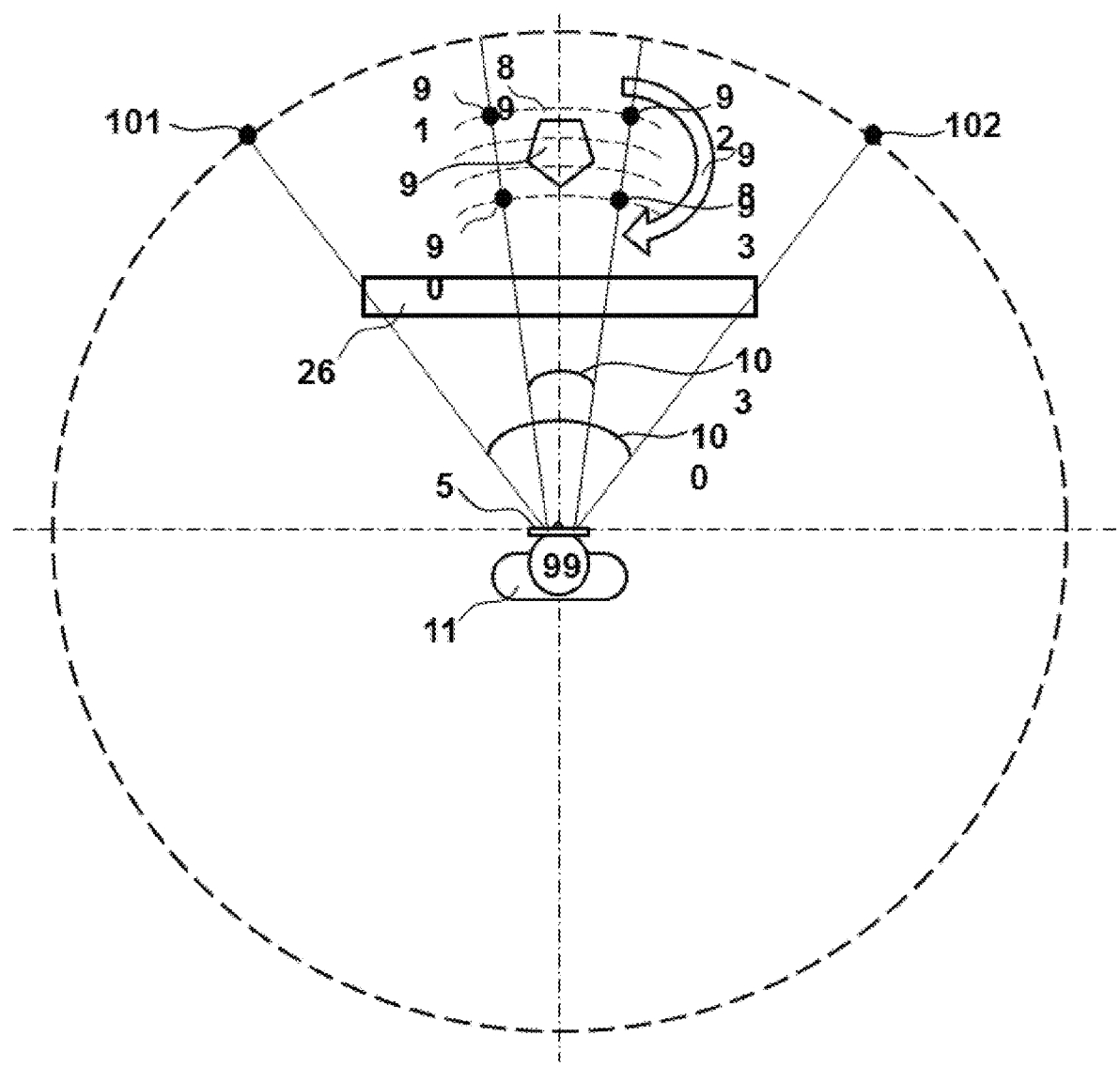
FIG. 10 illustrates a schematic top view of an art studio for virtual three-dimensional painting.

In reality (not virtual or augmented) the artists who deal with 3D real objects are sculptors working with either clay or plasticine. If the size of the sculpture is big the artist has to walk around it or even use latter or scaffolding to reach all the areas of creating sculpture. If the sculpture is not large he usually use a turn-table, which allows him to sit on one place, rotate table and working on the sculpture from all sides creating a real three-dimensional object. Similarly in virtual or augmented reality there are two approaches to paint complete three-dimensional picture. Let us look at the FIG. 10, which illustrate the top view of the virtual art studio. In one embodiment painter 11 with glasses 5 on his head 99 sits in front of the digital electronic canvas 26 having a screen and capable of presenting two pictures for a right eye and a left eye. The field of horizontal view 100 is determined by the size of the screen and distance between the painter head 99 and the screen 26. The field of view 100 if it is in the range of human binocular vision allows painter to create a virtual three-dimensional picture within the sector 99, 101, 102. Using one of the possible versions of the three-dimensional grid 89 the painter can create three-dimensional object 9 or at least front part of it. In another embodiment, when 3D digital personal viewer 5 is used instead of digital electronic canvas 26, the painter can walk around virtual object 9 continue painting it from sides and back like sculptor walks around sculpture in a process of working ("walking" mode). If the painter wants to work in a comfort of his chair with the digital electronic canvas 26 then he can select 3D area 90, 91, 92, 93, which includes object 9, and rotate this area around some vertical axis within this area, for example clock-wise 98, as shown in FIG. 10. While rotating on some angle he can continue to paint his object from sides and back, like sculptor rotating his turn-table, to reach all sides of his virtual three-dimensional picture ("turn-table" mode). When the work on this object is finished, the painter can return selected area in the initial position and unselect or paste it back in place. Zooming in and out of the selected area also liberates the painter from a need to build the scaffolding around large three-dimensional picture. Similarly, there are two approaches for virtual 360° panoramic three-dimensional painting. One is based on using 3D digital personal viewer 5, when the painter is walking inside virtual closed space and painting ("walking" mode). Another approach is based on rotating the entire 360° grid around vertical axis close to the nose of the painter. From the comfort of his chair the painter will be seeing and will be able painting within the complete inside virtual closed space sliding sector by sector on the screen of his digital electronic canvas 26 ("turn-table" mode).

The total three-dimensional scaling grid, although it is temporary and does not interfere with the painting, might be helpful during the entire process of painting and can be turned on and off any time. There are many different ways of visualization of selected virtual position of the canvas. For example, the selected position of the virtual canvas can be presented as a focal plane with the small depth of sharpness. It means that the images within this plane will be sharp while the images on the other planes in front and behind the selected plane will be presented as blurred. The depth of sharpness might be set up beforehand or controlled continuously in the process of painting by one of the control buttons/joysticks 22, as shown in FIG. 3A.

In another example of the visualization of selected position of the virtual canvas this position can be presented as a semi-transparent plane, which is crossed by the Z-axes. The part of Z-axes between the plane and the painter will be seen sharp while the other part, being behind the semi-transparent plane, will be seen blurry. Therefore, the position of the virtual canvas will be visually defined within the chosen coordinate system.

Another approach of creating some kind of 3D structure within a virtual 3D painting space, which initially is empty, for visualization of the instant position of the virtual canvas is using 3D photo-picture. This 3D photo-picture can be either borrowed or specifically made for a painting project. This photo-picture can be inserted as an initial 3D background, which can be turned on and off at any moment of the painting and either linked to the 3D painting or kept independent and separate. Linking this photo-picture to the afterwards painting illustrates the concept of 3D photoshop, when one makes 3D photo-pictures and needs to correct it with manual means. 3D photoshop has many other potential applications. For example, one application could be in development of new 3D games, based on collective collaborative painting. Another example is personalization of the existing game characters by adjusting, editing, correcting or even complete redrawing or repainting the characters to player's taste within the games similar to Pokemon Go or alike.

The method of digital three-dimensional painting, three-dimensional drawing and three-dimensional object navigating within 3D virtual canvas by at least one part of the user's body coupled to the at least one input control device and method of digital recording of painted images described above can also possess the following properties:

providing a description in digital format of images on each virtual position of the canvas and of corresponding positions of the canvas and providing complete three-dimensional digital image of the painting for different applications associated with three-dimensional image processing (like rotation, moving, scaling, animation, etc.); at least one part of the painter's body for making said simultaneous and continuous strokes or lines in all three-dimensions includes any part of a body, which the painter can move (arm, forearm, hand, fingers, leg, toes, head, lips, eyes . . . ); providing a system of sensors comprising at least one sensor, which is remotely determining (measuring) the motion of at least one part of the painter's body in at least one dimension;

painting or drawing on the 2D electronic canvas for each of the instant virtual positions of the 2D virtual canvas in the third dimension will result in simultaneous painting on two 2D canvases switching between right and left eye with frequency high enough that hand-painted images would appear on both canvases with certain horizontal offsets (disparity) with respect to a central vertical line for each canvas on a distance corresponding to chosen virtual position of the 2D canvas; providing simultaneous appearance of a similar stroke for the images for the right and the left eye, wherein a simultaneousness of appearance of said similar stroke for the images for the right and the left eye is limited by a smallest time interval equal to an inverted frequency of refreshment of frames on the digital electronic canvas;

providing a complete two-dimensional image of the painting for the right and the left eyes obtained by superposition of all layers corresponding to virtual positions of the 2D canvas for the right and the left eye separately;

providing continuous chain of multiple virtual positions of the 2D canvas along the axis between the painter and the canvas;

providing a property of the virtual 2D canvas to be transparent outside the painted area on the current virtual position of the canvas for all images on the next positions of the canvas located further from the painter;

providing a property of the virtual 2D canvas to mask by the painted area on the current virtual position of the canvas the images on the next positions of the canvas located further from the painter;

providing such a property of electronic canvas, wherein the opacity and transparency of the painted areas are controlled independently for any layer corresponding to an instant position of the virtual 2D canvas;

providing a property of electronic 2D canvas to be switched in turn for left and right eye with a certain frequency high enough that drawn lines and painted strokes are simultaneous and continuous for both right and left images;

providing the means for three-dimensional digital vision, which comprise the electronic canvas capable switching in turn for left and right eye with a certain frequency and shutter glasses switching synchronously with electronic canvas between left and right eye;

providing two or more at least two-axis input control devices allowing simultaneous digital painting or drawing on the canvas;

providing two or more at least two-axis input control devices allowing simultaneous digital painting or drawing on different virtual positions of the canvas;

switching electronic canvas between two or more at least two-axis input control devices, their corresponding additional at least one-axis input control devices and corresponding shutter glasses, which are switching synchronously with electronic canvas between these input control devices and for each input control device between left and right eye;

providing additional two or more at least one-axis input control devices, which are used for controlling functions of the digital painting process chosen from a group of: action, turning on and off, navigation of a cursor, image or object on the display of the electronic device, scrolling, zooming, shadowing, screening, selecting, rotating, deleting, restoring, saving, opening, closing, searching, setting up, previewing, undoing, clearing, repeating, pasting, finding, replacing, inserting, formatting, color selection, color mixing, line or stroke width, brush size, swatch size, sponge size, eraser size, special effects or combination; providing a concept of "digital maulstick", which provides required accuracy by placing the hand with the brush on supporting surface for more accurate motion of the hand and the fingers within interested area of three-dimensional virtual space.

providing painting or drawing on the electronic canvas, which is happening simultaneously with changing the virtual positions of the 2D virtual canvas in the third dimension by changing this position with the at least one-axis input control device and verifying this position with the means for three-dimensional digital vision;

providing an additional input control determining the range of variations of the canvas virtual positions within the system of three-dimensional digital vision;

providing an additional input control determining the depth of the focal plane around the canvas virtual position within the system of three-dimensional digital vision;

providing presentation of the virtual position of the canvas as a focal plane with a small focal depth for the purpose of increasing accuracy of verification of virtual canvas position;

providing presentation of the virtual position of the canvas as a temporary grid corresponding to this virtual position of the canvas;

providing a grid in the plane of the canvas corresponding to the virtual position of the canvas within the system of three-dimensional digital vision, which has the pitch of the grid proportional to the distance from the painter to the virtual position of the canvas;

providing grid in the plane of the canvas, wherein pitch of the grid is proportional to the distance from the painter to the virtual position of the canvas and changing the virtual position of the canvas automatically changes the grid pitch;

providing such a way of presentation of the virtual position of the canvas, where it is presented by at least one virtual Z-axis having an origin somewhere in the plane parallel to the canvas and located at the location of a painter, this at least one virtual Z-axis is directed from the painter plane toward the canvas and having a scale describing a distance from the painter to the virtual position of the canvas and this virtual position of the canvas is indicated on this scale;

providing at least one virtual Z-axis, which is presented on the canvas as a line with the scale connecting some point on the periphery of the canvas with some inner point within the canvas;

providing at least one virtual Z-axis, which is presented by the line chosen from: straight line, curved line, periodic line, spiral line, vertical line, horizontal line, descending line, ascending line and combination;

providing such angular direction of the X and Y axes on the canvas, which can change for different virtual positions of the canvas or for different points of the at least one virtual Z-axis;

providing at least one virtual Z-axis, which can have an angle relative to the perpendicular to the canvas in the range of 0 to 90 degrees;

providing a scale on the at least one virtual Z-axis, which is chosen from: linear, exponential, logarithmic, sine, or any other function;

providing two virtual Z-axes having an origin somewhere in the plane parallel to the canvas and located at the location of a painter, these two virtual Z-axes are directed from the painter plane toward the canvas and having scales describing a distance from the painter to the virtual position of the canvas and this virtual position of the canvas is indicated on these scales;

providing three virtual Z-axes having an origin somewhere in the plane parallel to the canvas and located at the location of a painter, these three virtual Z-axes are directed from the painter plane toward the canvas and having scales describing a distance from the painter to the virtual position of the canvas and this virtual position of the canvas is indicated on these scales;

providing four virtual Z-axes having an origin somewhere in the plane parallel to the canvas and located at the location of a painter, these four virtual Z-axes are directed from the painter plane toward the canvas and having scales describing a distance from the painter to the virtual position of the canvas and this virtual position of the canvas is indicated on these scales;

providing scales on different virtual Z-axes, which can be different reflecting the different angular position of the virtual canvas with respect to different virtual Z-axes;

providing a temporary grid visually defining the virtual position of the canvas, which is a system of lines including lines connecting points on different virtual Z-axes corresponding to the same position of the virtual canvas;

providing a temporary 3D virtual grid created by a system of lines related to a chosen system of coordinates within said space, for example Cartesian, Spherical, Cylindrical, Ellipsoidal, etc.;

providing that temporary 3D virtual grid or selected portion of it can be rotated or shifted relative to a painter, which allows painter to place the strokes to the sides and to the back of the painted three-dimensional object;

providing another kind of 3D structure within a virtual 3D painting space for visualization of the instant position of the virtual canvas by using 3D photo-picture;

providing 3D Photoshop for correcting and adjusting 3D photo-pictures;

providing a concept of taking the 3D photo-pictures, while looking how this 3D picture would look like with the 3D viewer and later using the same equipment for correcting these pictures with 3D Photoshop;

providing means for presentation of three-dimensional images, which are chosen from a group of: optical projection of two images with polarized light onto one screen and using polarized glasses, optical projection of two images with colored light onto one screen and using corresponding colored glasses, stereoscopic glasses and two photographs or slides, three-dimensional digital personal viewer, shutter glasses and synchronous switching display between left and right eye, direct projection of left and right images onto retina of the eyes;

associating each virtual position of the canvas with the corresponding zooming value of the image, which can be set up in different required ranges in such a way that equal size of an object on different virtual positions of the canvas would be zoomed out while virtual positions of the canvas will be moving from the painter and would be zoomed in while virtual positions of the canvas will be moving toward the painter;

associating a painted stroke or image with a certain virtual position of the canvas and later moving it to a different virtual position of the canvas, either with zooming or without zooming, and pasted on this new position of the canvas;

associating a painted three-dimensional image with certain range of virtual positions of the canvas and later moving it to a different range of virtual positions of the canvas, either with corresponding zooming or without zooming, and pasting on these new positions of the canvas.

The system for digital three-dimensional painting, three-dimensional drawing and three-dimensional object navigating within 3D virtual canvas by at least one part of the painter's body coupled to the at least one input control device and system for digital recording of painted images described above can also comprise the following elements:

an electronic canvas, which is chosen from the group: computer monitor, TV screen, projection screen, display of the mobile device or any other graphical computer output device;

at least two-axis input control device allowing digital painting or drawing within 3D virtual canvas, which is chosen from the group: sensitive pad, mouse, track ball, joystick, finger joystick, thimble, key-button, touch pad, touch screen, 6D motion sensor, smart pen, universal tool described below or at least one sensor, which is remotely determining (measuring) the motion of at least one part of the painter's body in at least one dimension;

at least two-axis input control device allowing digital painting or drawing on the canvas, which is a three-axis input control device;

a three-axis input control device allowing digital painting or drawing on the canvas, which is a universal tool described below;

an additional at least one at least one-axis input control device for virtual changing the position between the painter and the stroke or line within 3D virtual canvas, which is chosen from a group of: scroll wheel, sensitive pad, mouse, track ball, joystick, finger joystick, thimble, key-button, touch pad, touch screen, 6D motion sensor, smart pen, universal tool described below or at least one sensor which is remotely determining (measuring) the motion of at least one part of the painter's body in at least one dimension, and alike;

an additional at least one at least one-axis input control device for virtual changing the position between the painter and the stroke or line within 3D virtual canvas, which can be either two-axis or three-axis input control device;

an additional at least one at least one-axis input control device for virtual changing the position of the virtual canvas is integrated within one device with at least one of at least two-axis input control devices allowing digital painting or drawing on the virtual canvas;

an additional input control determining the range of variations of the virtual canvas positions;

an additional input control determining the depth of the focal plane around the canvas virtual position;

means for presentation of three-dimensional images, which are chosen from a group of: optical projection of two images with polarized light onto one screen and using polarized glasses, optical projection of two images with colored light onto one screen and using corresponding colored glasses, stereoscopic glasses and two photographs or slides, three-dimensional digital personal viewer, shutter glasses and synchronous switching display between left and right eye, direct projection of left and right images onto retina of the eyes;

three-dimensional digital personal viewer, which comprises: two micro-displays for left and right eye, two lenses of the glasses for projecting the images from the displays into eyes, processor, memory, sensors, power supply, transceiver, body of the viewer integrating all the elements of the device.

The accuracy of drawing, painting and object navigating in 2D or 3D space naturally is defined by the precision of the motion of the part of the painter's body, to which the input control device is coupled or attached. It is well known that the most precise motion within the human body is delivered by fingers. That is why digital painting actively developing the last decade is utilizing control devices like digital pens and styluses which mostly need touch-screens or touch-pads.

Figure 11A:
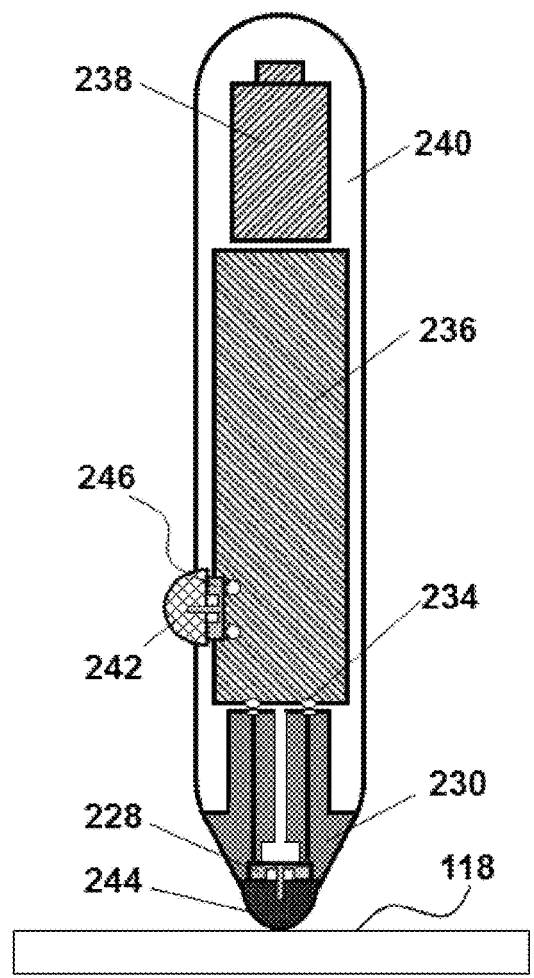
FIG. 11A illustrates a concept of a tactile end-point digital brush and its major components and FIG. 11B illustrates a new approach—combined tactile and optical sensing, wherein high precision of a tactile end-point contact drawing is complemented by high speed motion controlled by optical sensor.

FIG. 11A illustrates an example of an input control device allowing digital painting or drawing on the 2D canvas or 3D virtual canvas without need of additional touch-screen or touch-pad. This device comprises several components. An end-point 244 is coupled to an integrated at least one at least two-axis force sensor 228 within the device. IC circuit for digitizing the information from at least one at least two-axis force sensor and processing the data related to the change of the force vector components can be integrated on the same chip 228 with force sensor. It also can be located within the block 236 in the main body 240 of the device. The same block 236 can comprise hardware and software for providing a description in digital format of how the device has been pressed to the surface based at least in part on the force applied by the end-point to the writing surface. It also can comprise hardware and software for providing a description in digital format of how the device has been moved over the surface based at least in part on the correlation between the force vector components and corresponding movement vector components. End point 244 with force sensor 228 can be integrated within an interchangeable head 230, which is electrically connected by contacts 234 with the main processing block 236. The head 230 is the most delicate part of the device, as it has a direct mechanical contact with the painting surface and therefore, wear and tear of the end point would require periodic change. Making the head 230 interchangeable and having low cost and leaving the most expensive component within the main body 240 of the device allows reducing the total cost of ownership of this device. Block 236 can also comprise wireless communication circuits. Power supply 238 is also located in the device body 240. One or more additional 3D control finger-joysticks 242 with their 2D or 3D sensors 246 can be integrated in the device. These additional control finger-joysticks can be used for controlling multiple functions of the process of painting or objects navigating.

The device is moving with a hand and/or fingers such that the end-point 244 is contacting a surface 118, which is not touch sensitive and suitable for such movement across the surface in a process of painting, drawing, writing or cursor navigating while recording with the integrated at least one at least two-axis force sensor, the change of the vector force representing the motion of the device and force applied to the sensor by the end-point.

The painting device can further comprise at least one sensor chosen from the group of sensors consisting of: one-axis linear accelerometer, two-axis linear accelerometer, three-axis linear accelerometer, one-axis gyro, two-axis gyro, three-axis gyro, one-axis angular accelerometer, two-axis angular accelerometer, three-axis angular accelerometer, one-axis compass, two-axis compass, three-axis compass, altimeter for determining the motion parameters, at which the device has been moved between recording of two positions within the working three-dimensional painting space.

The end-point 244 can be chosen from the group: a pin [tip] coupled to the at least one at least one-axis force sensor, a ball contacting with the at least at least two-axis force sensor, a bunch of fibers coupled to the at least one at least two-axis force sensor.

Figure 11B:
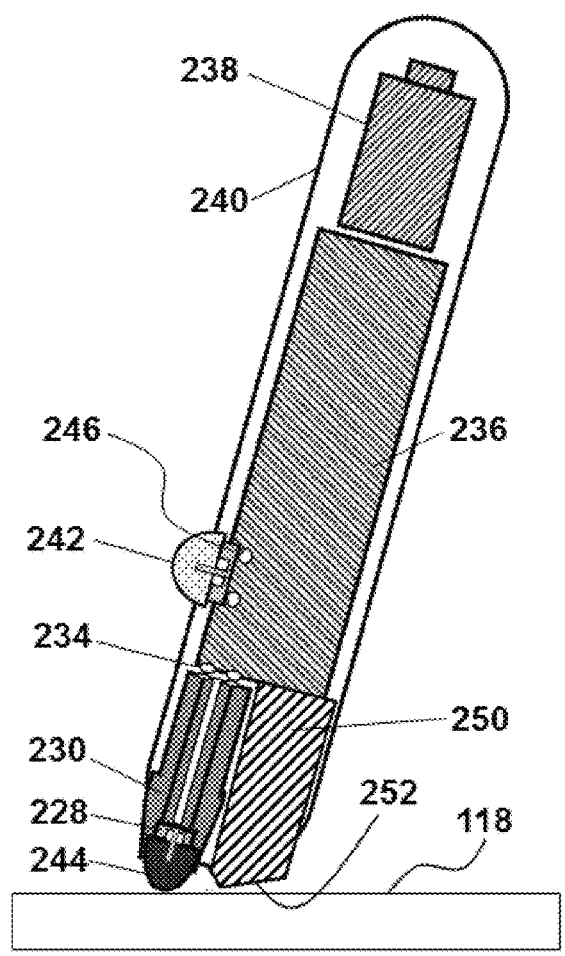

FIG. 11B illustrates another example of an input control device allowing digital painting or drawing on the 2D canvas or 3D virtual canvas without need of additional touch-screen or touch-pad. This pen in addition to the interchangeable head 230 with the end point 244 and tactile force sensor 228 comprises an additional block 250 of optical tracking the position and movements of the end point 244 through the window 252 similar to optical or laser mouse. LED or laser diode illuminates the working surface 118 through the window 252 and the image of the surface under the window 252 is perceived by the photo-sensor array inside the block 250. Therefore, the optical block 250 serves for the wide movements of the pen on the working surface area 118 while the end point 244 serves for capturing precise movements for drawing the details of the design. The other components like block 236 of digital processing, wireless communication circuits and multiple sensors, and power supply 238 and one or more additional 3D control finger-joysticks 242 can be integrated in the device similar to what was described for device in FIG. 11A. This approach can be defined as optical-motion-tactile sensing control (tool) device.

Figure 12:
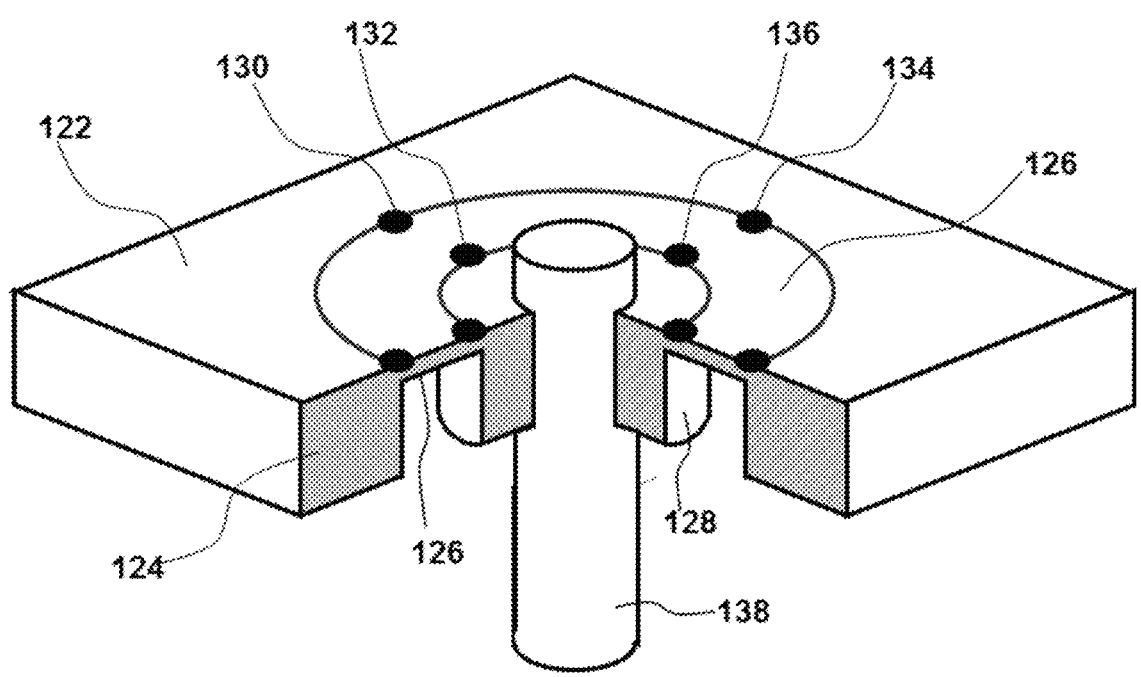
FIG. 12 shows a three-dimensional force sensor, which can be used as a tactile sensor in end-point digital brush.

FIG. 12 illustrates an example of a force sensor, which can be coupled to an end point of the painting device. It comprises a semiconductor substrate sensor chip 122, which, in its turn, comprises a frame element 124, a rigid island element 128 and an elastic element 126 mechanically coupling said frame and said rigid island elements 128. A set of two or more stress-sensitive IC components 130, 132, 134, 136 are integrated into the elastic element 126. At least one force-transferring element 138 couples the end-point 244 to a rigid island element 128 of a sensor die 122 for transferring the applied external vector force from the end-point through the force-transferring element 138 to the rigid island element 128 of the sensor die 122, and thereby generating electrical outputs from application the external force vector via stress-sensitive IC components 130-136 positioned in the elastic element 126 each carrying the unique orthogonal system component of signal from the force vector, where the IC component outputs are functions of input component stresses developed from the orthogonal system force components.

In general, at least two-axis force sensor is chosen from a group: mechanical force sensor, linear acceleration force sensor, angular acceleration force sensor, Coriolis force or angular rate force sensor and combination.

Figure 13:
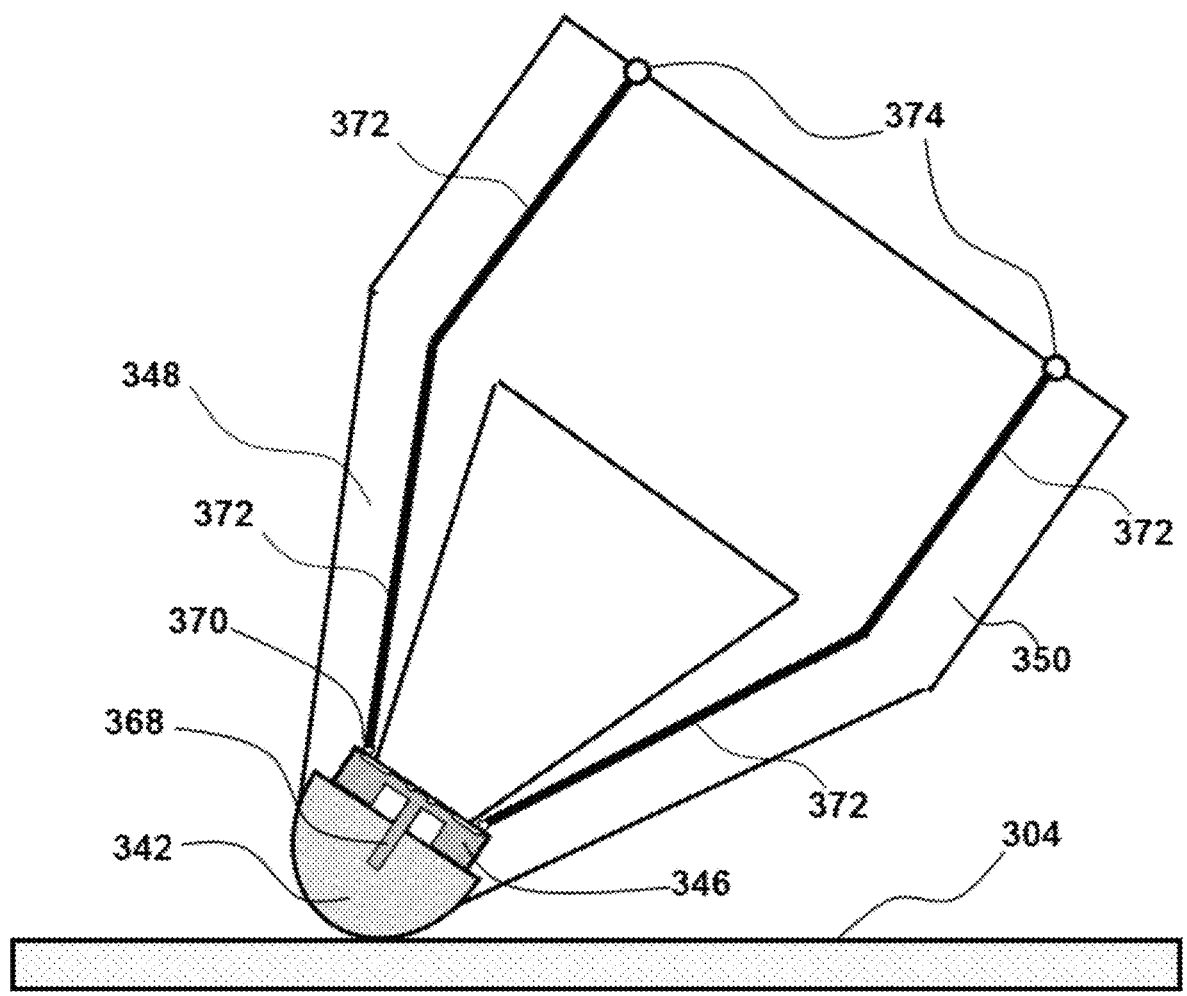
FIG. 13 illustrates the three-dimensional force/tactile sensor within an end-point of an interchangeable cartridge of the digital brush.

FIG. 13 illustrates an example of the interchangeable head 350 of the painting tool. The head comprises an end-point 342 fixed in the conical part 348 of the body of the head 350. The force sensor die 346 is attached to the end-point by the force-transferring element 368. The contact pads 370 of the die 346 are electrically connected by the wires 372 with the external electrical contacts 374, which provide electrical connection of the force sensor with the main processing electronic circuit located within non-interchangeable part of the painting tool.

The method described above can be used for a method of converting two-dimensional images into digital three-dimensional images, said method comprising:
  providing an electronic canvas (computer monitor, TV screen, projection screen, etc.);
  providing a digitized two-dimensional image (picture, photo, drawing, etc.)
  providing means for three-dimensional digital vision (shutter glasses, splitting canvas on two canvases and switching these canvases between left and right eye, etc.);
  providing at least one at least two-axis input control device allowing selecting images and digital painting or drawing on the canvas;
  providing additional at least one at least one-axis input control device for virtual changing the position of the canvas along the axis between the painter and the canvas;
  selecting certain areas on the digital two-dimensional image, which are supposedly closer to the viewer than the background of the image;
  providing a description in digital format of selected areas;
  selecting virtual position of the canvas, which supposedly corresponds to the spatial position of the selected areas in the third dimension between the viewer and the background;
  pasting the selected areas onto the selected virtual position of the canvas, which will result in splitting the selected areas on two copies for the right eye and the left eye and shifting (offsetting) these two copies horizontally in opposite directions with respect to a central vertical line for each canvas on a distance corresponding to the chosen virtual position of the canvas;
  selecting next areas on the image, which are supposedly closer to the viewer than the previously selected and shifted areas of the image;
  providing a description in digital format of selected areas;
  selecting next virtual position of the canvas, which supposedly corresponds to the spatial position of the selected next areas in the third dimension closer to the viewer;
  pasting the selected next areas onto the selected next virtual position of the canvas, which will result in shifting these next areas horizontally in opposite directions with respect to a central vertical line for each canvas on a distance corresponding to the chosen next virtual position of the canvas;
  selecting next areas on the image and pasting them on the virtual canvases closer and closer to the viewer as many times as needed until closest to the viewer areas would not be selected and pasted;
  providing a description in a digital format of composed right and left images;
  using left and right images for presentation of corresponding three-dimensional images by available means for three-dimensional vision.

The sequence of selecting and pasting areas from the image can be realized in an opposite order, namely from the foreground toward the background or in arbitrary order.

The areas between the two overlapping consecutively selected areas are gradually shifted horizontally such that pixels closer to the border of the first selected area are shifted to the same distance as the first area and that pixels closer to the border of the second selected area are shifted to the same distance as the second area while all the other pixels between the first and the second areas along the horizontal axis are shifted on different distances according to the predetermined law of the gradient of shift between the first and the second areas.

The gaps, which appeared between the two consecutively selected and shifted on different distance areas, can be filled in manually with at least one at least two-axis input control device allowing digital painting or drawing or selecting and stamping on the electronic canvas.

Obviously, the method of three-dimensional painting can be used for editing, enhancing, filtering and modifying three-dimensional photo images (three-dimensional photoshop), said method comprising:
  providing a three-dimensional photo image;
  providing an electronic canvas (computer monitor, TV screen, projection screen, display of the mobile device, etc.);
  providing means for three-dimensional digital vision (shutter glasses, splitting canvas on two canvases and switching these canvases between left and right eye, eye glasses or headset with two micro-displays for a right and a left eye for a direct projection of right and left images into a retina of the corresponding eye, etc.);
  providing at least one at least two-axis input control device allowing digital painting, drawing or selection areas on the canvas;

providing additional at least one at least one-axis input control device for virtual changing the position of the canvas along the axis between the painter and the canvas;

choosing the virtual position of the canvas corresponding to the areas on the three-dimensional photo image, which is supposed to be edited, enhanced, filtered or modified;

painting, drawing, editing, enhancing, filtering or modifying selected areas on the electronic canvas for each of the virtual positions of the canvas in the third dimension by changing this position with the at least one-axis input control device and verifying this position with the means for three-dimensional digital vision;

providing a description in digital format of images for right and left eyes on each virtual position of the canvas and of corresponding positions of the canvas;

providing complete modified and edited two-dimensional images of the three-dimensional photo image for the right and the left eyes;

using left and right images for presentation of edited three-dimensional photo image by available means for three-dimensional vision.

Figure 14:
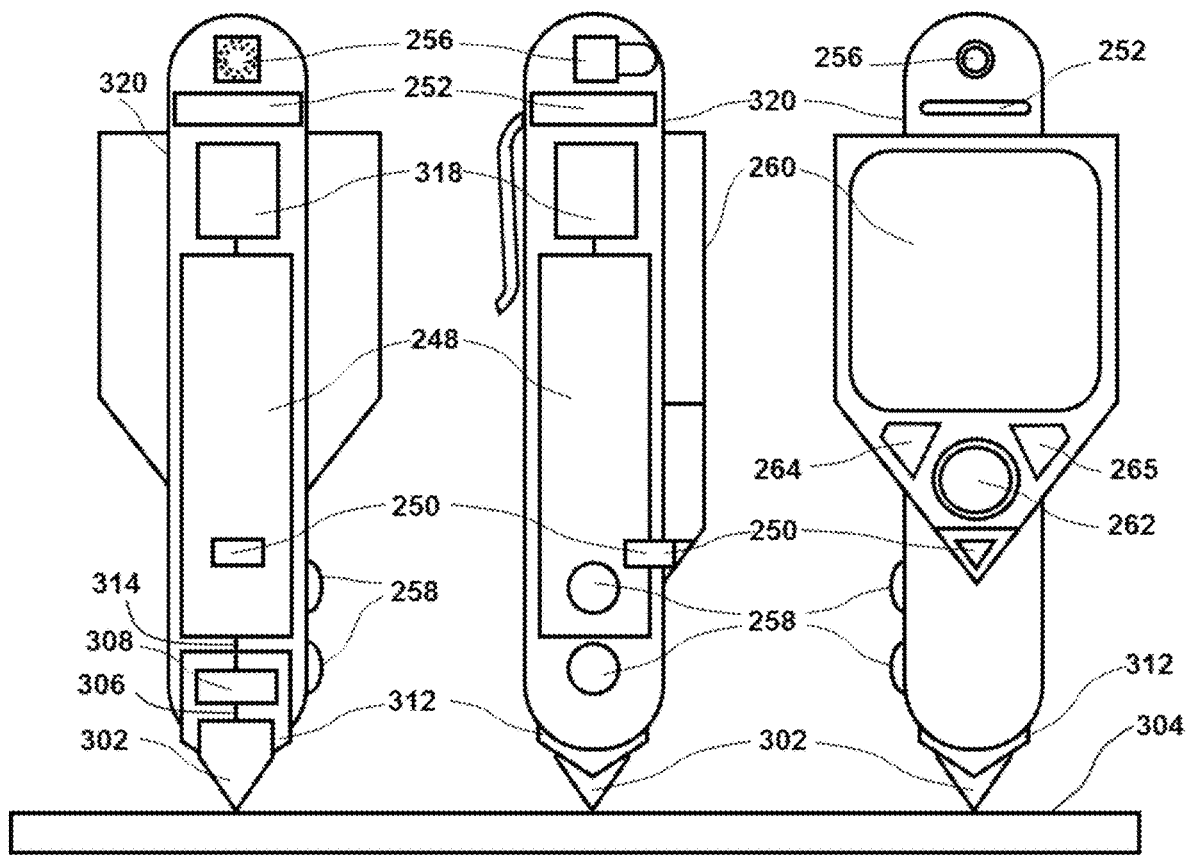
FIG. 14 shows a concept of a universal tool combining a smart phone and a digital brush and pen, as a universal input control device, as pointing/navigating, hand-written text messaging and drawing messaging.
Figure 15A:
FIG. 15A is an illustration of a universal tool and FIG. 15 B illustrates a different version of a universal tool, having a touch screen for navigation, gaming, smart phone, as a universal remote control for the smart-home applications, for making 3D photos, or 3D videos.
Figure 15B:
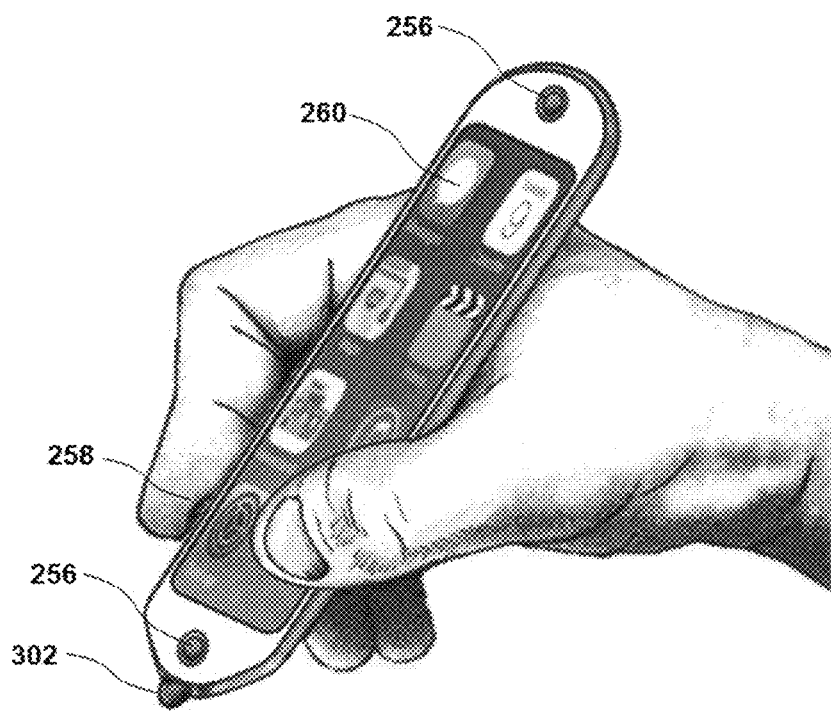

FIGS. 14 and 15 illustrate an example of a universal tool, which can be used for multiple applications. It can be used as a painting or drawing tool, as a pen or pencil for writing, as a mouse or joystick for navigation on the screen or computer or mobile gaming. It can have a wireless capability and can be combined with cell-phone capabilities with all the attributes, which smart phone has: display, camera, microphone, speakerphone, control buttons, etc.

As follows from FIG. 14, which depicts the front, side and back projections of the device, it has an end-point 302 coupled to the multi-axis force sensor 308 within an interchangeable cartridge 312. The tool has an electronic block 248, which comprises digital processor, wireless communication circuits, additional sensors, etc. For example, microphone 250 can be part of the block 248. Inside the body 320 of the device a power supply 318, speakerphone 252 and photo-camera 256 can also be located. A part of the body 320 is a display 260. A number of control buttons 258, 262, 264, 265 can be situated in convenient locations on the body 320 of the tool. Different functions, as described above, can be assigned to these control buttons. Each of these buttons can be multi-axis micro-joysticks significantly increasing the total number of functions under control.

FIGS. 15 A and B illustrate examples of a universal tool described above. While universal tool shown in FIG. 15 A is functionally an almost exact copy of the device shown in FIG. 14 the tool in FIG. 15 B illustrate a different version of a universal tool, having a different shape, bigger screen, which can be touch-sensitive with multiple icons providing additional control functions not only as painting or drawing tool or as a mouse or joystick for navigation on the screen or computer or mobile gaming, but also as a cell-phone with all the attributes of a smart phone. It might have display, camera, microphone, speakerphone, control buttons, etc. It can be also used as a universal remote control for the smart-home applications. This universal tool can have two photo cameras instead of one, as shown in FIG. 15 B, for making 3D photos, or selfies, or 3D short videos. These two photo cameras 256 can also be located on the opposite to the display side and if located at a distance from each other equal to an average distance between human eyes then this tool can be used making and viewing 3D photos and 3D videos.

It should be understood that the microstructures of the die, structures of the finger-mice, finger buttons and micro-joysticks and methods of their fabrication do not limit the present invention, but only illustrate some of the various technical solutions covered by this invention. While the invention has been described in detail with reference to preferred embodiments, it is understood that variations and modifications thereof may be made without departing from the true spirit and scope of the invention.

Figure 16:
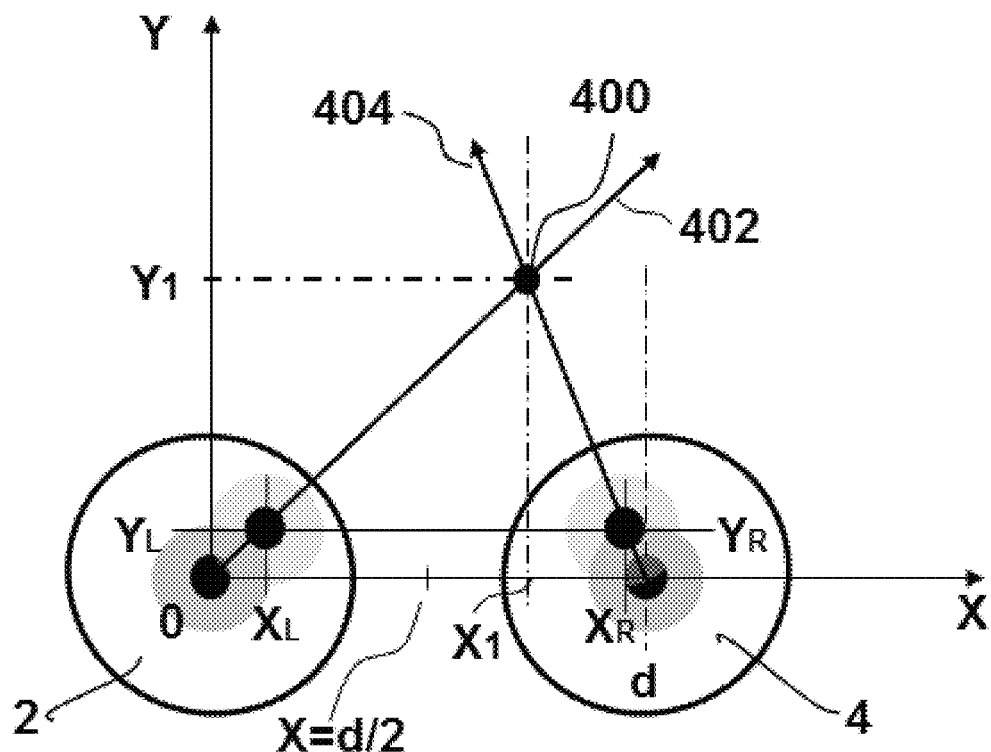
FIG. 16 illustrates how coordinates of point of focus on XY plane parallel to the canvas can be measured and calculated.
Figure 17:
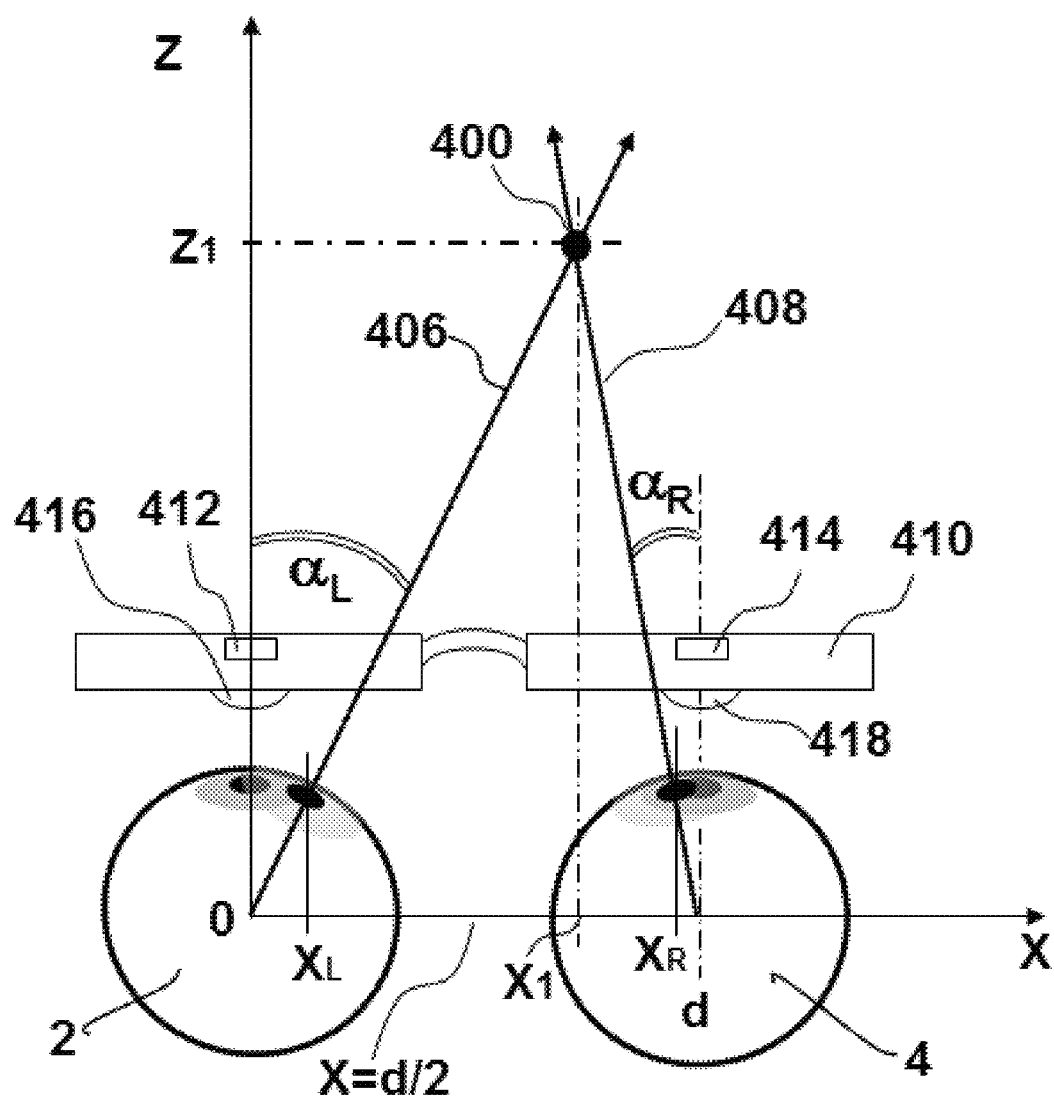
FIG. 17 illustrates how a coordinate Z (a depth in three-dimensional virtual space) of point of focus on XZ plane can be calculated.

FIGS. 16 and 17 illustrate an example of how painting or drawing can be done based on the moving of other than hand and finger parts of the human body. In particular, human eyes can be used for this purpose. One eye can be used for painting or drawing on the two-dimensional plane, while both eyes provide capability of realizing painting or drawing in virtual three-dimensional space. It can be used for multiple applications. It can be used for handless painting, drawing or writing, as a mouse or joystick for navigation on the screen of a computer or mobile gaming. It can be used for communication with paralyzed patients, for rehabilitation and education. It can be used as an additional communication channel in parallel with verbal/hearing and manual/tactile channels.

FIG. 16 illustrates schematically two eyeballs 2 and 4 on the XY plane. An initial center of the pupil of the left eye is located in the origin of XY plane and an initial center of the pupil of the right eye is located on a distance d from the origin on axis X. If a human being is looking at the point of view 400 at the XY plane then his/her eyeballs rotate and the pupils of both eyes would have new position on the XY plane. The left pupil will have new coordinates: X=XL and Y=YL and the right pupil will be at: X=XR and Y=YR. These coordinates determine the direction 402 of the left eyeball toward the point of focus 400 and the direction 404 of the right eyeball toward the point of focus 400. It is self-explanatory that if one can measure coordinates XL, YL and XR, YR then the coordinates X1, Y1 of the point of focus will be also known. Therefore, measuring the instant position of the eye pupils with respect to their initial position and change of their position allows determining the instant point of focus and trajectory of this point on XY plane, as a result of eye movement.

FIG. 17 illustrates schematically how with the measurements described above the depth of vision or the third coordinate on the axis Z perpendicular to the XY plane can also be determined. Two eyeballs 2 and 4 are shown here on the XZ plane. The glasses 410 for stereoscopic vision are also shown in the picture. These glasses comprise two photo-sensor arrays 412 and 414 for the left and right eyes correspondingly. The images of the eye and the pupil are projected to the photo-sensor arrays through the optical systems 416 and 418. These photo-sensor arrays allow making measurements of initial pupils' position and their instant positions relative to initial positions described above. When coordinates XL and XR are measured, then knowing the geometry of the eyeball, it is easy to determine an angular direction 406 $\alpha$L and angular direction 408 $\alpha$R toward projection of point of focus 400 on XZ plane. It gives the Z1 coordinate of the point of focus on XZ plane. As a result of these measurements and calculations, all three coordinates X1, Y1 and Z1 of instant position of point of focus within three-dimensional virtual space are determined. Moving the instant point of focus by moving both eyeballs allows anyone to make a three-dimensional trajectory of this movement, e.g., making handless painting or drawing possible.

Figure 18A:
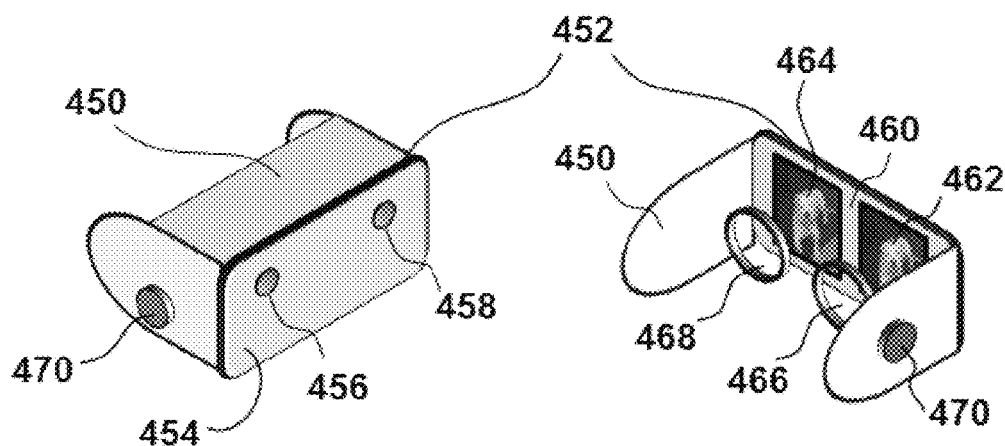
FIGS. 18A and 18B illustrate a concept of a system and method for taking 3D photo and video images with a modified (new) smart phone (FIG. 18A) or universal tool (FIG. 18B) having two photo-cameras, modifying these 3D images with 3D photoshop and transmitting corrected pictures.
Figure 18B:
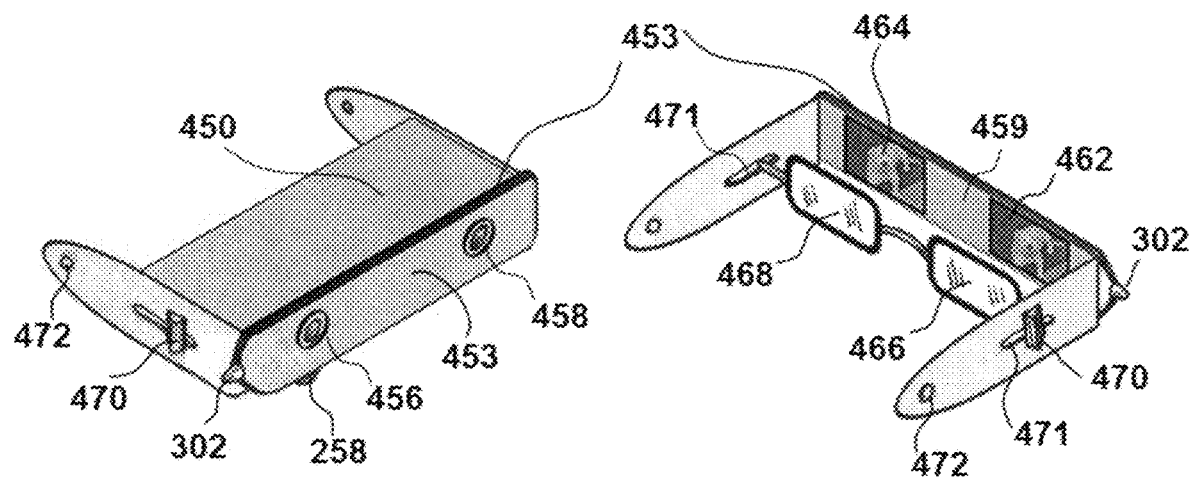

FIGS. 18A and 18B illustrate schematically a concept of systems and method for taking 3D photo and video images with either a new version of smart phone having two photo-cameras (FIG. 18A) or with universal tool (shown in FIG. 15B) also having two photo-cameras (FIG. 18B). These systems can make 3D photo or video, modifying these 3D images with 3D-photoshop and sharing corrected pictures via the cell-phone. The systems comprise an eye glasses or headset 450 for viewing 3D images. It also comprises a smart phone 452 or universal tool 453, which has two sides 454 and 460 for phone and also 453 and 459 for tool correspondingly. The side 454 (453) comprises two photo-cameras 456 and 458, which are positioned along longer side of the phone of tool at the distance from each other corresponding to average distance between the human eyes. The area of the display's side 460 of the phone 452 and side 459 of the universal tool 453 can be divided into two micro-displays 462 and 464 for a right and a left eye correspondingly for a direct projection of right and left images 462 and 464 into a retina of the eye. The eye glasses or headset 450 have a simple optical lenses 466 and 468 allowing see the 3D stereo photo-picture or 3D video before, after and in the process of shooting the picture or video. The systems also might have some simple individualized adjustments like focusing by changing the distance between the lenses 466 and 468 and corresponding images 462 and 464 with a knob or slider 470 or some other mechanism. Control buttons on the edges of the smart phone or control buttons of the universal tool like end-point 302 coupled to the multi-axis force sensor and micro joystick 258 can be used for multiple functions required for 3D photo and video shooting and editing.

A corresponding method for editing, enhancing, filtering and modifying three-dimensional photo images (three-dimensional photoshop), can additionally comprise the following steps: providing a three-dimensional photo image; choosing the virtual position of the canvas corresponding to the areas on the three-dimensional photo image, which are supposed to be edited, enhanced, filtered or modified; painting, drawing, editing, enhancing, filtering or modifying selected areas on the electronic canvas for each of the virtual positions of the canvas and verifying this position with the means for three-dimensional digital vision; providing complete modified and edited two-dimensional images of the three-dimensional photo image for the right and the left eyes; using left and right images for presentation of edited three-dimensional photo image by available means for three-dimensional vision.

Figure 19A:
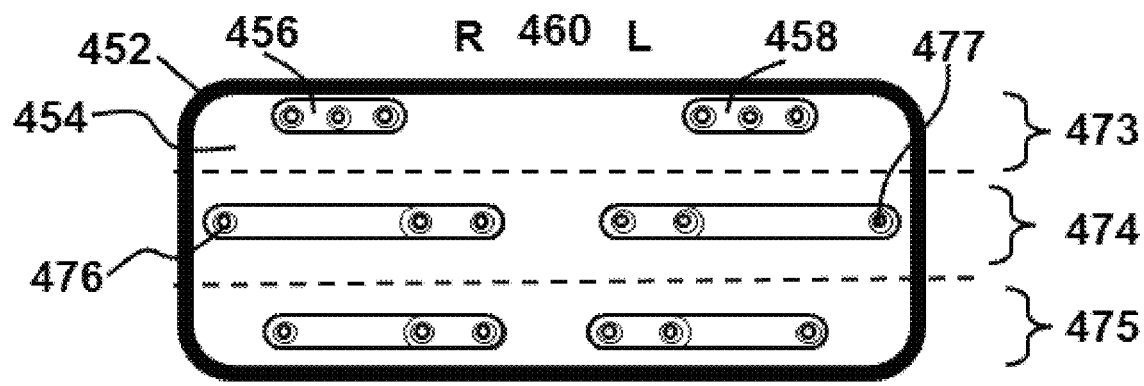
FIGS. 19A, 19B, and 19C illustrate a concept of a 3D smart phone with different options for taking 3D pictures and 3D videos and presentation 3D images in different formats.
Figure 19B:
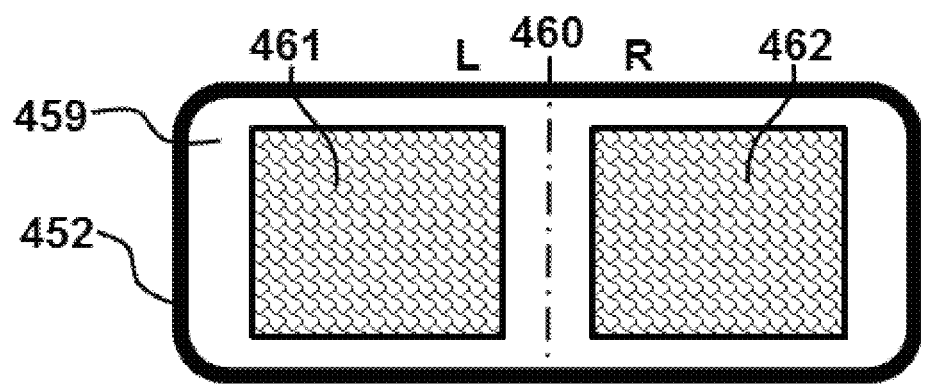
Figure 19C:
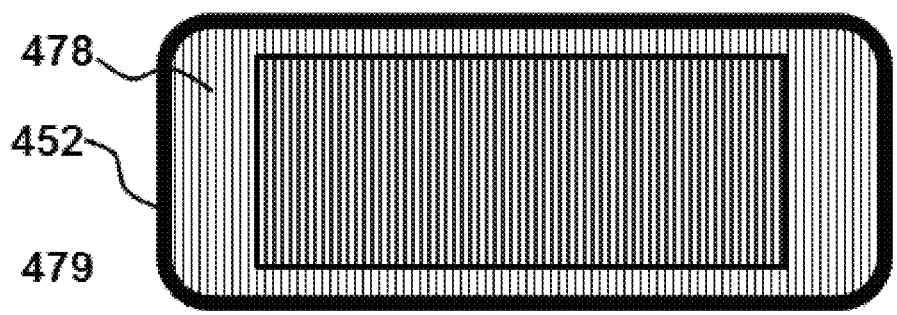

FIGS. 19A, 19B and 19C illustrate schematically a concept of a new version of smart phone 452 having multiple photo-cameras systems 473, 474, 475 for taking 3D photo and video images and different formats for their presentation on a displays of these phones. The back side of the phone, where usually photo-cameras are located, is shown in FIG. 19A. For 3D stereo camera systems the cameras for the right eye 456 is usually located on a certain distance from the cameras for the left eye 458. It should not necessarily be symmetrical relative to the center line 460, but rather is determined by the type of the specific set of cameras in the system of cameras (one camera, two cameras, three or more cameras) as is shown by 456 and 458 for three-cameras sets. Usually the combination of cameras is chosen from: wide-angle lens, ultrawide lens, telephoto lens, monochrome sensor, time-of-flight camera (depth sensor) and combination for 2D photo and video can be either one camera, or two cameras, or three, or more cameras in the set. For 3D stereo cameras it should be two sets of cameras: one for the right eye 456 and one for the left eye 458. Obviously, for 3D stereo pictures or video the requirements for the combinations of the cameras and their locations including distance between left and right sets on the back side of the phone will be determined by a number of additional factors depending on desired achieving effects. For example, two telephoto cameras 476 for the right eye and 477 for the left eye in FIG. 19A are positioned on the maximum distance from each other to increase the distance of noticeable stereo effect for the objects located farther from the camera.

FIGS. 19B and 19C illustrate schematically a concept of 3D photo and video images and different formats of their presentation on a display of the phone. The first format is two images 461 and 462 for the left and the right eyes correspondently (FIG. 19B). The size and location of the images depend on specific parameters of the 3D viewer and can be changed and adjusted electronically on the display of the phone. FIG. 19C illustrates the use of a lenticular arrays 478 made from the thin layer of plastic material and covered the surface of the phone display including the image 479. Lenticular arrays could be either cylindrical for a landscape view, as shown in the FIG. 19C, or spherical lens array if flipping between landscape and portrait modes on the display is needed. One image of the picture on the display consists of a sequence of alternating narrow strips of images for the left and right eyes. Additional alignment and adjustment between the striped image and lenticular array might be possible at the program control level.

A systems illustrated in FIGS. 18 and 19 can be used not only for taking 3D stereo photo-pictures or 3D video but also for editing, enhancing, filtering and modifying three-dimensional photo images (three-dimensional photoshop) with the same hardware. The obvious advantage of the system is the ability to share not only limited volume of downloaded 3D stereo images but unlimited and personal 3D images, which were taken, edited and transmitted via standard channel by the smart phone used within the system and the recipient can immediately watch 3D images using his/her regular phone, which doesn't have two photo-cameras on the opposite to display's side of the phone, along with low cost 3D viewer, for example the Google Cardboard Viewer. The major disadvantage of many viewers is their relatively large size for portable devices.

Figure 20:
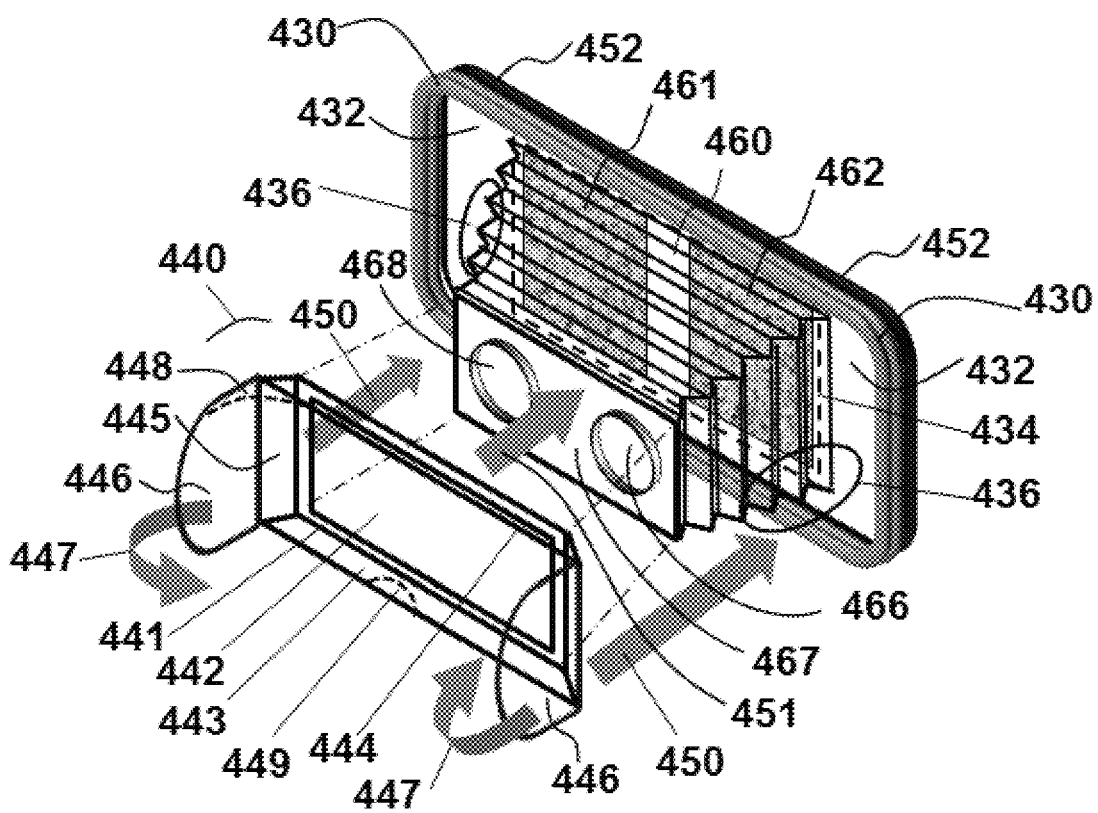
FIGS. 20A and 20B illustrate a concept of a portable, collapsible, light, low cost 3D viewer for viewing 3D pictures or videos made with help of a 3D smart phone.
Figure 20:
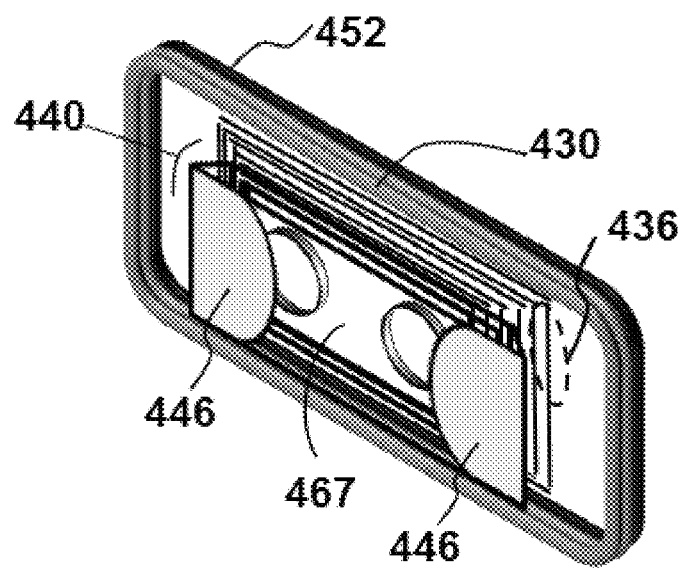

A new approach to portable collapsible foldable low cost 3D viewer is illustrated in FIGS. 20A and 20B. The viewer has the following major components: the main body 430; the plate 467 with the lenses 466 and 468; the face unit 440 and two collapsible bellows: one 436 connecting internal surface of the plate 432 of the main body 430 with the plate 467 from the back side and another smaller bellows (not shown on the figure) connecting the front side of the plate 467 with the back side of the face part 440. The main body 430 has the size of a smart phone 452 and the flat plate 432 has the window 434 for observing the display 460 of the phone 452, which is applied to the body 430, as shown in FIG. 19. The display 460 of the phone 452 is configured to display two pictures: one 462 for the right eye and another picture 461 for the left eye. Both pictures are seen through the window 434 in the plate 432, as shown in the figure. The main collapsible bellows 436 is attached to the plate 432 along and around the perimeter of the window 434. The front end of the bellows 436 is attached to the plate 467, which comprises two lenses 466 and 468 for the left and the right eyes correspondingly. The bellows 436 can completely collapse in the direction of the arrow 450 and together with lenses plate 467 can be accommodated within the thickness of the main body 430 in the portable mode. The face unit 440 of the viewer comprises a back side 441 with the window 442, the bottom 443, the top 444 and the left and the right sides 445. The two latter are connected to the folding side-shades 445 and 446, which can be folded toward the body of the face unit, as shown by arrows 447, when it is in the portable mode. To better accommodate the face unit to the shape of the face, additional elements can be used, like soft element 448 for better corresponding to a forehead shape, or notch 449 for a nose of the user. The small bellows (not shown in the figure) provide fine focusing of the lenses with respect of the eyes of the user. It might have only a couple of folds and one end is attached to lenses plate 467 and the other end is attached to along and around window 442 of the face unit 440. In a portable mode the face unit 440 with the folded side-shades 446 should be moved toward direction shown by arrows 540 and together with collapsing small bellows, lenses plate and main collapsing bellows all the elements of the viewer will be accommodated within the main body 430, as illustrated in FIG. 20B. There are a number of ways to suggest a mechanical system for forcing the collapsing of all parts within the body 430 of the viewer for portable mode and bringing them back to operating mode including the additional individual adjustment of the distance between the user's eyes and plate 451 with two lenses 466 and 468. There are also many solutions for attaching and holding the smart phone 452 close to the body of the viewer 430 may be suggested along with the multiple straps for holding the viewer on the head of the user and carrying the viewer in a portable mode.

Figure 21:
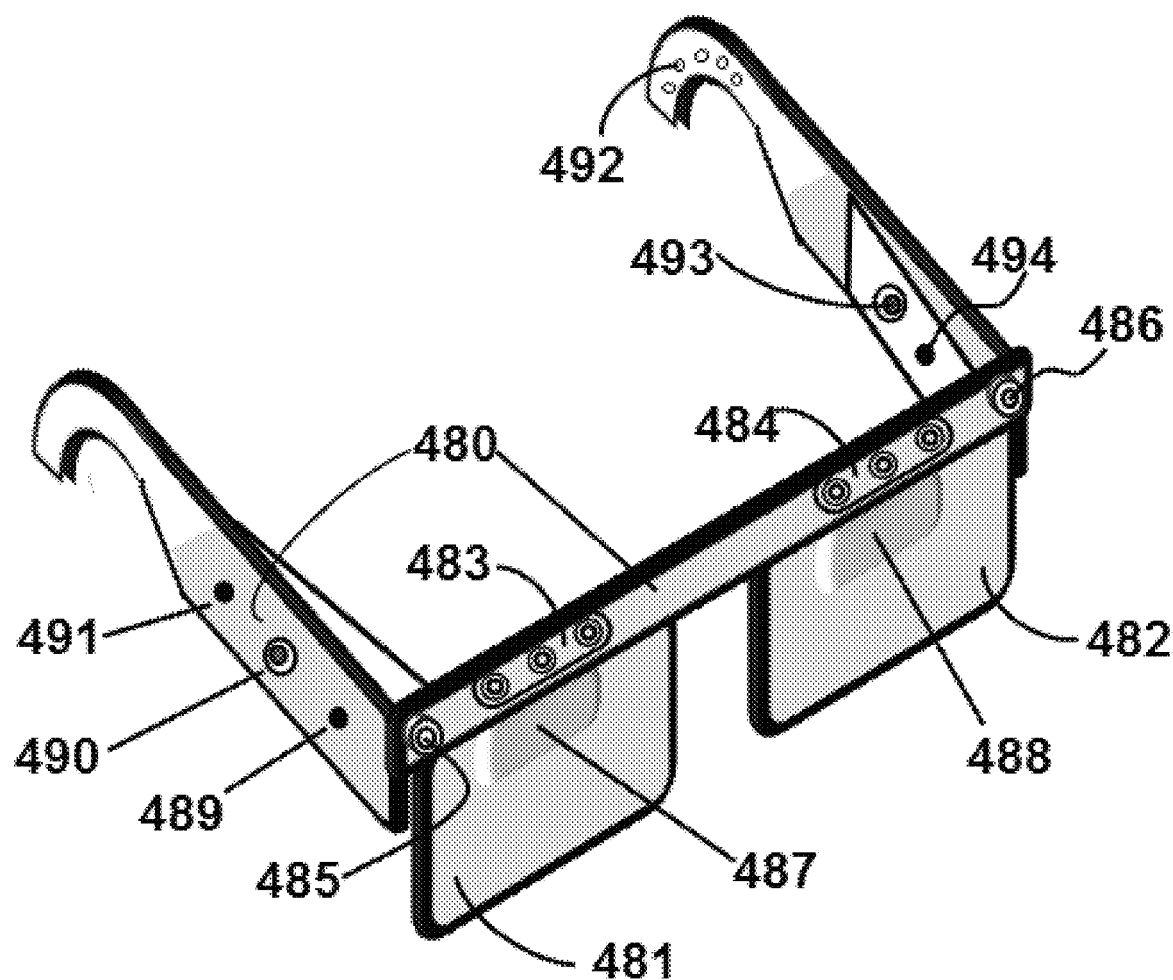
FIGS. 21A, 21B and 21C illustrate a concept of smart glasses in relation to a need for graphics input control and remote tactile sensing for multiple controls of smart glasses.
Figure 21:
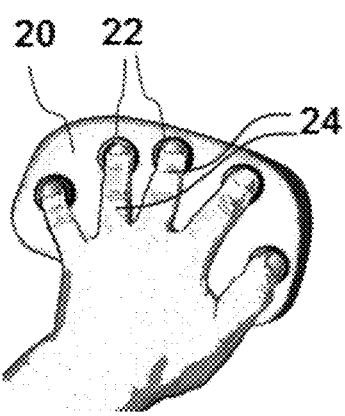
Figure 21:
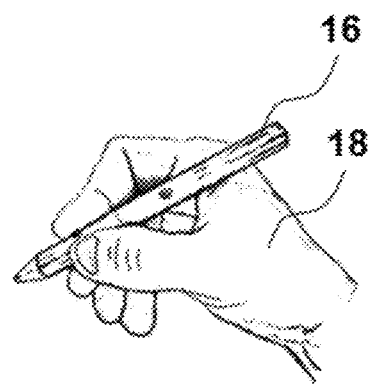

FIGS. 21A, 21B and 21C illustrate schematically a concept of 3D smart glasses that comprises the frame 480. The central part of the frame comprises two displays 481 and 482 for right eye and left eye correspondingly. For augmented reality (AR) applications these displays can be see through and additional displays 487 and 488 can serve for AR information. The frame can also comprise two sets of photo cameras 483 and 484 for making 3D photo and 3D video, each set can include several cameras, combinations of which provide high quality pictures. Inside the central frame there are at least two cameras (not shown in figure) focused on the eyeballs of the user for measuring the position of the eye balls and calculating the point of eyes' focus. Besides using this information directly for control of the information shown on the displays, for example for texting or communicating with disabled people, it also can be used for more active interaction with the surrounding environment. Two external cameras 485 and 486 are embedded into the front frame on micro-suspensions and micro actuators allow rotating these cameras mimicking within certain angle the eye balls and in control mode repeating the point of focus of the user's eyes. The same platform for the rotating cameras 485 and 486 can be used for focusing two lasers on the target of user's interest. The other features of the smart glasses might include: different kind of control buttons 489, 491 or finger joystick 490, microphone 494 for voice control and speakerphones 492, laser and scanner 493, accelerometers, gyro, thermometer, altimeter, compass, bio sensors, outside and inside navigators, etc. All these sensors and visual and voice information provide enormous amount of information. However, wireless graphics input control that provides inputing graphical or color painted images, which impossible to introduce to the system by any other means, remains a weak link in the comprehensive information supply. FIGS. 21B and 21C illustrate two input control devices described above and illustrated also in the FIG. 3A and FIGS. 11A and 11B.

Figure 22:
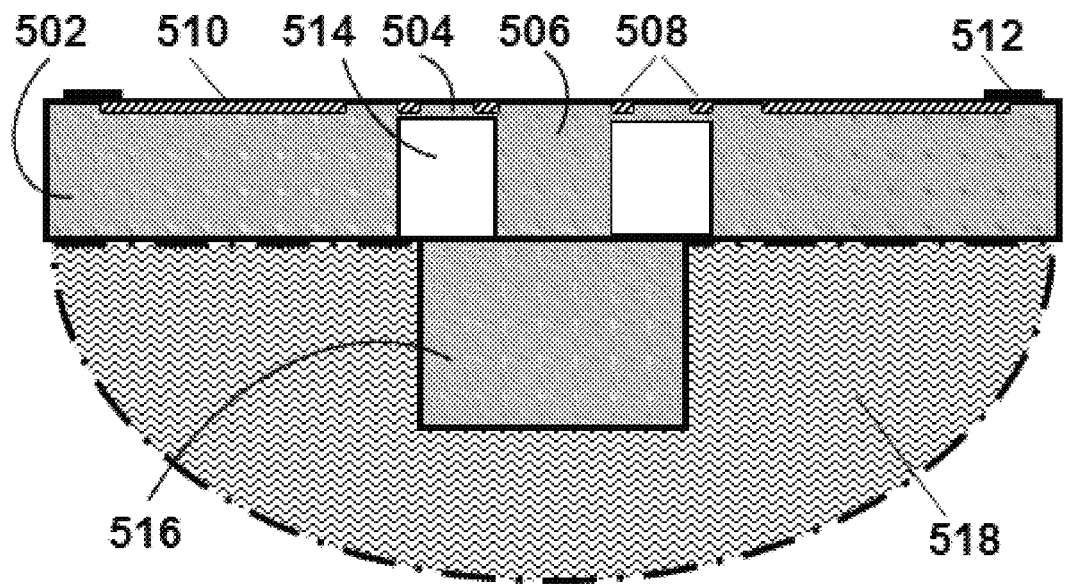
FIGS. 22A and 22B illustrate schematically a concept of a heart of the tactile and motion sensors, which can be integrated on the same chip with the processing circuitry for mass low cost manufacturing.
Figure 22:
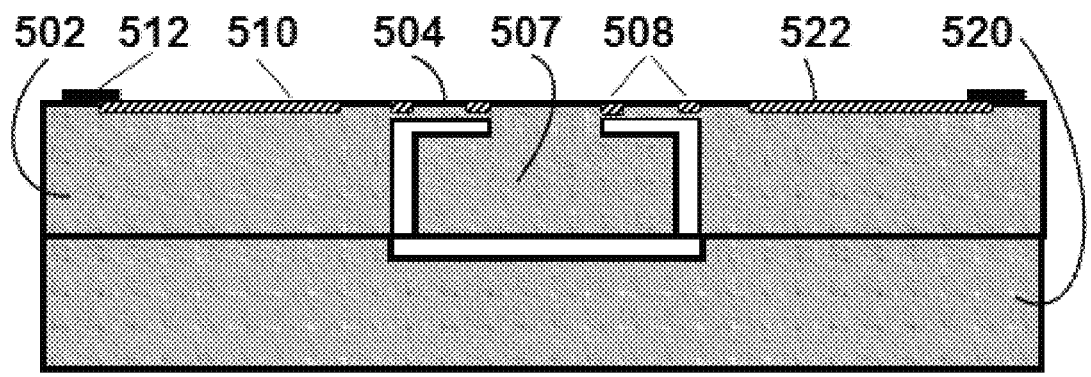

FIGS. 22A and 22B illustrate schematically a concept of a heart of the tactile and motion sensors which have the same principle, structures and processing technology, which can be integrated on the same chip and also with the processing and wireless communication circuitry for mass low cost manufacturing. The frame 502 of a semiconductor substrate sensor chip comprises on its planar side at least three sets of two or more stress-sensitive IC components 508 that are integrated into the elastic elements 504, a rigid island element 506, wherein elastic elements 504 are mechanically coupling said frame and said rigid island element 506. The processing and wireless communication circuits 510 and contact pads 512 are also integrated within the frame 502 of the chip. A force-transferring element 516 is coupled to a rigid island element 506 and contacting with a protective elastic cover 518, which might contact the any external surface, which should be touched by this tactile sensor. FIG. 22B illustrates a motion sensor, which can be fabricated on the same substrate as the previous tactile sensor. As can be seen from the figures, the sensor chip is practically the same with the only difference of microstructure of rigid island element 507 and a need for cover cup 520 for protection of proof mass 507 from shock overloading. These sensors can be used for multiple applications including for systems of smart glasses that provides tactile capability, as additional input control devices for the user, which can provide a number of input controls, like remote touch-pad, typing and texting, control of the display functions and processes needed for enhancing smart glasses.

FIGS. 23A, 23B, 23C and 23D illustrate schematically concepts of multiple practical applications of tactile and motion wearable sensors including several options of power sources, sensor arrays and actuator arrays for haptic feedback to user. FIG. 23A, illustrates schematically a concept of a thimble-like tactile system 524 and a ring-like micro joystick 526 around the finger 525 that provides tactile capability. Both represent autonomous input control devices or tools capable for delivering control of multiple functions of mother system including delivering graphics input. Both systems comprise tactile and/or motion sensor 528. The circular shape around the finger opens the possibility of incorporating a solenoid 530 around a finger 525 what allows to use the wireless charging of the rechargeable battery or a capacitor 532, which is used as power supply for the electronics within these systems Moving fingertip across a hard surface 523 3D sensitive tactile sensor 528 provides options of being a micro-joystick in 3D virtual space. It also serves as a finger pen similar to a finger on a touch pad. Tapping by the tip of the finger provides signals by either tactile sensor or motion sensor 528. It might be helpful with typing or texting. As a thimble is a good place for receiving medical health information, additional micro-devices like electrode 527, red laser 529 and photo-sensor array 531 can be added in the wall of the thimble. The electrode 527 together with the similar electrode on the other hand can be used for measuring ECG. The laser 629 and photo-sensor array together can be used for the heartbeat and oxygen level.

FIG. 23B illustrates the other features of such systems, wherein elastic gloves 533 on the fingers 525 comprising array of the tactile and/or motion sensors 528. Plastic piezoelectric plates 536 due to a natural motion of the fingers bend the plates, which generate electrical charge collected by a capacitor 534. Capacitor 534 is electrically connected with the plates 536 and sensors 528 by flexible wire 538. Another new feature of this embodiment is that similar plastic piezoelectric electrodes 540 powered through wire 542 and act like vibrator on the points of contact with the skin of the finger providing haptic feedback to the user about strength of touching of real and virtual objects. The possible applications are innumerable.

Figure 23:
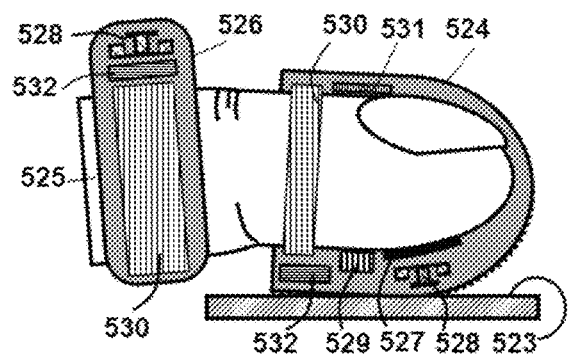
FIGS. 23A, 23B, 23C and 23D illustrate schematically concepts of multiple practical applications of tactile and motion wearable sensors designed around a hand and its fingers including several options of power sources, sensor arrays and actuator arrays for haptic feedback to user.
Figure 23:
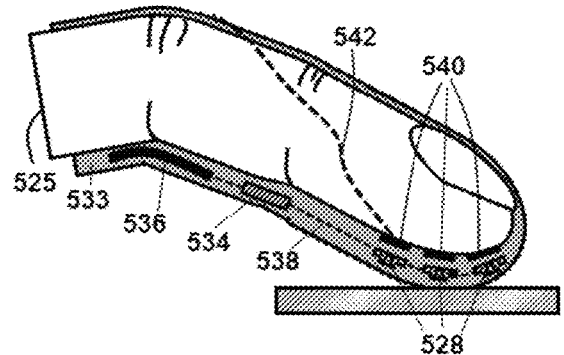
Figure 23:
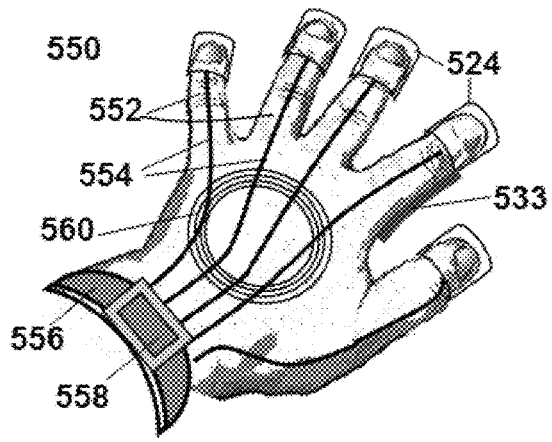
Figure 23:
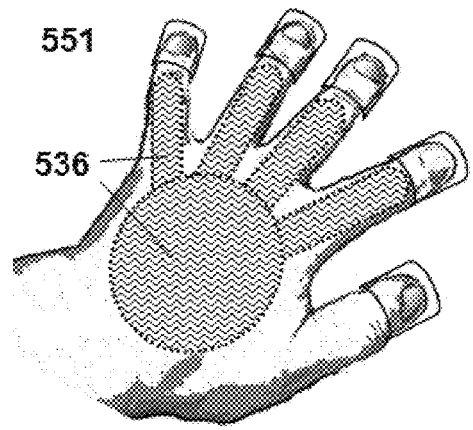

FIG. 23C illustrates the other features of such systems, wherein elastic gloves 550 on the fingers 552 comprising array of the tactile and/or motion sensors from either thimbles 524 on each finger or from embedded sensors and actuators 533. It creates more complex system with broader capabilities than one finger systems. Such systems would require, for example, more powerful rechargeable batteries, which can be located in the wristband 556 or within combined smartwatch 558 or other similar gadget. More powerful solenoid 560 provides fast recharging the battery of the glove. The power supply from the centralized battery can be provided through the wire micro-cables 554. FIG. 23D illustrates another option of powering the system 551 by the piezoelectric plates 536, which more efficiently would be working on the palm of the hand, as shown in the figure. All the examples of input control devices (tools) illustrated in FIG. 23 provide a number of input controls, like remote touch-pad, typing and texting, control of the display functions and processes needed for enhancing smart glasses.

Therefore, while the invention has been described with respect to a limited number of the embodiments, those skilled in the art, having benefits of this invention, will appreciate that other embodiments can be devised which do not depart from the scope of the invention as disclosed herein. Other aspects of the invention will be apparent from the following description and the appended claims.

What is claimed is:

1. A method of digital continuous and simultaneous three-dimensional objects navigating, said method comprising:

providing a digital electronic display having a physical surface and a geometrical surface and configured for presenting two images: one for a right eye and the other for a left eye of a user;

providing means for creating a continuous 3D virtual canvas comprising the geometrical surface of the digital electronic display and a virtual volume that includes the geometrical surface of the digital electronic display in said 3D virtual canvas by digitally changing a value and a sign of horizontal disparity between two images for the right eye and the left eye and their scaling on the digital electronic display corresponding to instant virtual distance between the user's eyes and an instant (3D) image of the object within the virtual 3D canvas; wherein a resolution $\Delta$ of continuity of changing of the virtual distance Z between the user and the virtual images within 3D virtual canvas is defined by a size p of a pixel on the digital electronic display in horizontal direction and by a distance d between pupils of the user's eyes according to an expression: $\Delta \cong 2p\,Z/d$;

providing at least one input control device comprising: a system of sensors that provide input information about free 3D motion of at least one part of the user's body into the at least one input control device for digital objects navigating within 3D virtual canvas;

providing at least one kind of a coupling between at least part of the at least one input control device and the at least one part of the user's body;

moving the at least one part of the user's body while the system of sensors within the at least one input control device is providing information for recording change of vectors of mechanical motion parameters of the at least one part of the user's body, said system of sensors provide simultaneous appearance of similar images of the objects for the right and the left eye for any instant position within 3D virtual canvas;

wherein a simultaneousness of appearance of said similar scaled images of the objects for the right and the left eye is limited by a smallest time interval equal to an inverted frequency of refreshment of frames on the digital electronic display and wherein a motion of the objects in the process of navigating in all dimensions is provided simultaneously and continuously in all directions of a 3D virtual space by free moving the at least one part of the user's body.

2. A method according to claim 1:

wherein digital objects navigating within a 3D virtual space comprises at least one of 3D digital painting, 3D digital drawing, 3D digital design, 3D digital gaming, 3D digital augmented reality (AR), 3D virtual reality (VR), and mixed reality (MR); and wherein objects within 3D virtual space comprises at least one of objects within one-dimensional, two-dimensional and three-dimensional space, and objects that are permanent or variable with at least one of time, shape, dimensions, combinations of colors, transparency, opacity; and wherein navigation of the objects within a 3D virtual space includes changing position and orientation of the objects and includes at least one function chosen from the group of functions consisting of: appearance and disappearance, action, turning on and off, scrolling, scaling, zooming, shadowing, screening, selecting, deleting, restoring, saving, opening, closing, searching, setting up, previewing, undoing, clearing, repeating, pasting, finding, replacing, inserting, formatting, grouping, ungrouping, color selection, color mixing, assigning line or stroke width, assigning brush size, assigning swatch size, assigning sponge size, assigning eraser size, assigning a canvas virtual position, assigning depth of a focal plane around an instant virtual position of the stroke within 3D virtual canvas, creating special effects, and a combination thereof.

3. A method according to claim 1, wherein free linear and angular motion of the at least one part of the user's body for making simultaneous and continuous objects navigating three-dimensions is detected by the system of sensors providing an input information about free 3D linear and 3D angular motion into the at least one input control device (tool) for digital objects navigating within 3D virtual canvas, wherein the system of sensors are chosen from a group of sensors consisting of: a one, two or three-axis force sensor; a pressure sensor; a one, two or three-axis tactile sensor; a one, two or three-axis linear accelerometer; a one or two-axis tilt sensor; a one, two or three-axis gyro sensor; a one, two or three-axis angular accelerometer; a one, two or three-axis magnetometer; 6D or 9D Inertial Measurement Unit (IMU); an altimeter; an optical sensor; a photo-sensor array; an electromagnetic sensor; an ultrasound sensor; a microphone; and combinations, which provide a multi-axis sensor system for determining linear and angular motion parameters of the at least one part of the user's body, which has been moved between recording of two virtual positions of the object within 3D virtual canvas with help of at least one input control device (tool).

4. A method according to claim 1, wherein the means for creating a continuous 3D virtual canvas comprising a processor comprising:

means for receiving inputs from at least one multi-axis input control device (tool) for three-dimensional image presentation for objects navigating along and around three axes X, Y and Z within XYZ virtual space and wherein at least one input is used for objects navigating along axis from the user's eyes toward the digital electronic display and beyond by changing a horizontal disparity between images for the right eye and the left eye and their scaling, making three-dimensional objects navigating equally continuous in (XY) plane and (XZ) and (YZ) virtual planes;

means for using a motion captured by the at least one input control device for objects navigating, and the motion is provided simultaneously and continuously in all three dimensions by linear and angular movements of the at least one part of the user's body;

means for description in digital format of images for the right eye and the left eye for every and all instant positions within 3D virtual canvas;

means for complete two-dimensional images of the objects for the right eye and the left eye at any stage of painting as accumulation of all images of the objects made up to that stage; and means for complete three-dimensional images of the objects including its linear and angular position within 3D virtual canvas.

5. A method according to claim 4, wherein the at least one selected portion of said temporary 3D virtual grid is dedicated as a toolbox for arranging and organizing multiple parameters and characteristics of the painting tools, color palette, painting process and its different steps, visual effects, setups, commands, wherein a selectable 3D toolbox is chosen from a group: rolodex, 3D stack of sliding flat windows, rotating in different directions geometrical shapes like cube, cylinder, prism, pyramid, sphere, ellipsoid, the surface of which is used for positioning the icons activating corresponding actions, 3D tree with a trunk, branches, sub-branches and leaves corresponding to desirable toolbox organizational structure.

6. A method according to claim 1, wherein the continuous 3D virtual canvas is presented as a temporary 3D virtual grid created by a system of lines related to a chosen system of coordinates within said 3D virtual canvas, and wherein at least one selected portion of said temporary 3D virtual grid can be deformed, scaled, changed, adjusted, rotated or shifted relative to the user, wherein the temporary 3D virtual grid allows the user to navigate placement and scale the size of objects for 3D sketching within initially empty 3D virtual space and also place strokes to sides, to back, to top or bottom of a painted three-dimensional object, when a front view or an entire sketch of the painted three-dimensional object is already defined and wherein the temporary 3D virtual grid can be turned off and on at any time in a process of painting.

7. A method according to claim 1, wherein the method is used for designing panoramic 3D designs, wherein 3D virtual canvas is surrounding the user and the user can design either by walking with 3D headset viewer within 3D canvas and navigating objects with input control devices ("walking mode") or by sitting in a chair in front of a steady display and virtually rotating a grid of the 3D virtual canvas around him sector by sector while designing portions of the 3D panoramic design ("turntable mode") and localized 3D designs, wherein 3D virtual canvas is localized within certain area and the user can design either by walking with 3D headset viewer around an object within 3D virtual canvas and designing with the input control devices ("walking mode") or by sitting in the chair in front of the steady display and rotating the grid of the 3D virtual canvas around some vertical axis located within the 3D canvas verifying this rotation by the means for three-dimensional digital vision while designing side by side localized 3D object ("turntable mode").

8. A method according to claim 1 further comprising: providing zooming in or out of a selected portion of 3D virtual canvas at any stage of a digital objects navigating process providing higher accuracy of detail objects navigating and better perspective of how it looks like from different distance for a user; freezing a position of an object within interested selected volume of 3D virtual canvas, when the object is moved; providing switching accuracy of the input control tool a higher value by either switching the input control tool or adjusting input control on the input control tool, which provides required accuracy; providing a firm and stable surface for supporting a hand with the input control tool, which provides more accurate motion of the hand and the hand's fingers; providing turning on the input control tool's motion and continue to object navigating within interested volume of three-dimensional virtual space.

9. A method according to claim 1 comprising using multiple input control devices coupled to different parts of the user's body by different kind of coupling for controlling functions of a digital object navigating process chosen from a group consisting of: action, turning on and off, navigating object within virtual space, scrolling, scaling, zooming, shadowing, screening, selecting, moving, rotating, deleting, restoring, saving, opening, closing, searching, setting up, previewing, undoing, clearing, repeating, pasting, finding, replacing, inserting, formatting, grouping, ungrouping, color selection, color mixing, assigning line or stroke width, assigning brush size, assigning swatch size, assigning sponge size, assigning eraser size, assigning a canvas virtual position, assigning depth of a focal plane around an instant virtual position of the object within 3D virtual canvas, creating special effects, and a combination thereof.

10. A method according to claim 1, wherein the method is used for editing, enhancing, filtering and modifying three-dimensional photo images, for development of new 3D games, based on collective collaborative painting, for personalization of existing game characters by adjusting, editing, correcting or complete redrawing or repainting the existing game characters to player's taste within games, said method additionally comprising:

providing a three-dimensional photo image;

using this 3D image, as a basis of system of coordinates, defining the 3D virtual canvas, within which photo image supposed to be edited; painting, drawing, editing, enhancing, filtering or modifying selected areas within 3D virtual canvas with the at least one input control device and verifying the position with the means for three-dimensional digital vision; providing complete modified and edited two-dimensional images of the 3D photo image for the right eye and the left eye; using left and right images for presentation of edited three-dimensional photo image.

11. A system for digital continuous and simultaneous three-dimensional objects navigating, and digital recording of three-dimensional objects images, said system comprising:

a digital electronic display having a physical surface and a geometrical surface and configured for presenting two pictures; one for a right eye and the other for a left eye of a user in front of the digital electronic display;

at least one multi-axis input control device (tool) comprising a system of sensors, which provide an input information about free 3D motion of at least one part of the user's body into the at least one multi-axis input control device (tool) for digital objects navigating;

means for at least one kind of a coupling between at least part of the at least one multi-axis input control device (tool) and the at least one part of the user's body, said coupling chosen from a group consisting of: mechanical coupling, optical coupling, electromagnetic coupling, sound coupling, ultrasound coupling, and a combination of two or more thereof;

means for three-dimensional image presentation comprising a processor;

wherein inputs of the at least one multi-axis input control device (tool) are used by the means for three-dimensional image presentation for objects navigating along and around three axes X, Y and Z within XYZ virtual space, means for creating a continuous 3D virtual canvas comprising the geometrical surface of the digital electronic display and a virtual volume that includes the geometrical surface of the digital electronic display within said 3D virtual canvas by digitally changing a value and sign of horizontal disparity between two images for the right eye and the left eye and their scaling on the digital electronic display corresponding to instant virtual distance between the user's eyes and an instant (3D) image within the virtual 3D canvas;

wherein a resolution $\Delta$ of continuity of changing of the virtual distance Z between the user and the virtual images within 3D virtual canvas is defined by a size p of a pixel on the digital electronic display in horizontal direction and by a distance d between pupils of the user's eyes according to an expression: $\Delta \approx 2p\, Z/d$;

wherein a motion captured by the at least one multi axis input control device (tool) is used by the means for three-dimensional image presentation for making objects navigating, and the motion is provided simultaneously and continuously in all three dimensions by movements of the at least one part of the user's body;

wherein a simultaneousness of appearance of similar scaled images of the objects for the right and the left eye is limited by a smallest time interval equal to an inverted frequency of refreshment of frames on the digital electronic display and wherein a motion of the objects in all three dimensions is provided simultaneously and continuously in all directions within 3D virtual canvas by free moving the at least one part of the user's body;

wherein the means for three-dimensional image presentation provides a description in digital format of images for the right eye and the left eye on the digital electronic display for every and all instant images made within 3D virtual canvas;

wherein the means for three-dimensional image presentation provides complete two-dimensional images of the object for the right eye and the left eye at any stage of image navigating as accumulation of all objects made up to that stage; and wherein the means for three-dimensional image presentation provides complete three-dimensional images of the object including linear and angular position within 3D virtual canvas as accumulation of all objects made to the stage of completion and the means for three-dimensional image presentation provides two-dimensional left and right images to the means for three-dimensional digital vision for presentation of three-dimensional objects.

12. A system according to claim 11, wherein said digital electronic display configured for presenting two pictures for the right eye and the left eye is chosen from a group consisting of: projection screen for digital projection, 3D television (TV), digital autostereoscopic display including lenticular lens or parallax barrier display, computer monitor, display of a mobile device, smart eye glasses or headset with two micro-displays for the right eye and the left eye for a direct projection of right and left images into a retina of an eye.

13. A system according to claim 11 further comprising means for three-dimensional digital vision are chosen from a group consisting of: polarized glasses for viewing only one out of two images by each eye, images are projected on a screen or a monitor with corresponding polarization for each eye; color glasses for viewing two corresponding images; shutter glasses, time-splitting images on two images and synchronously with shutter glasses switching images between left and right eye; autostereoscopic, glasses systems; smart eye glasses or headset with two micro-displays for a right and the left eye for a direct projection of right and left images into a retina of a corresponding eye.

14. A system according to claim 13, wherein the smart eye glasses or the headset with two micro-displays for a right and the left eye for the direct projection of right and left images into the respective retina of the left eye and the right eye comprises a smart phone, which provides two micro-displays for a right and the left eye within common display of the smart phone and which also has two set of photo-cameras on an opposite side to a display side of the smart phone, one set of lenses with different focal lengths within the range from ultra wide-angle lens, to telephoto lens, is for the right eye and another set with similar lenses is for the left eye, said corresponding lenses with the same focal distance are positioned at a certain distances from each other corresponding to the distance of the camera from the objects, which should be presented with the best 3D effect, and wherein switching between the cameras can be provided manually or automatically in the process of zooming and wherein said smart eye glasses or said headset has optical lenses for viewing 3D photo-picture or 3D video including viewing in the process of shooting and recording the 3D photo-picture or 3D video.

15. A system according to claim 14, wherein said system based on a smart phone and independent 3D viewer is configured to provide, after taking 3D stereo photo-picture or 3D video, editing, enhancing, filtering and modifying three-dimensional photo image, and to provide transmitting an edited 3D images via standard channel by the smart phone used within the system, wherein a recipient can immediately watch 3D images using his/her cell phone that doesn't have two photo-cameras but recipient has an independent portable collapsible low cost 3D viewer comprising the following major components; the main body, the lenses plate for right and left eyes, the face unit and two collapsible bellows, wherein the main body of 3D viewer has a shape and size of an average smart phone and a bottom of the main body has a window opened for viewing the images for the right and left eyes, when the smart phone is attached to the viewer, and the inner volume (space) of the body is capable to accept other collapsible and folding parts, and a main collapsible bellows is positioned between the lenses olate and the inner bottom of the main body of the viewer, and a small collapsible bellows is positioned between the lenses olate and the face unit of the viewer, and the face unit of the viewer comprises a frame accommodating the forehead and a nose of the viewer with the window toward the lenses olate and folding sideshades, which can be folded toward the body of the face unit, when it is in the portable mode, and wherein the main bellows can completely collapse and together with lenses olate can be accommodated within the thickness of the main body of the viewer in the portable mode, and the small bellows provides fine focusing of the lenses with respect of the eyes of the user, and also can collapse and all the elements of the viewer will be accommodated within the main body of the viewer, and wherein transition between the operating mode of the viewer and portable mode can be accomplished with a number of mechanical systems of miniature levers including the additional individual adjustment of the distance between the user's eyes and lenses plate and it is also many solutions for attaching and holding the smart phone close to the body of the viewer may be suggested along with the multiple straps for holding the viewer on the head of the user in operating mode and carrying the viewer in a portable mode.

16. A system according to claim 13, wherein the system of smart glasses comprises:

two displays, one for right eye and another for left eye within the front part of the frame;

two sets of photo cameras for making 3D photo and 3D video, each set can include several cameras, combinations of which provides high quality of 3D pictures;

at least two cameras inside the frame and focused on the eyeballs of the user for measuring the position of the pupils of eye balls and calculating the point of eyes' focus for using this information directly for control of the information shown on the dissolves, for example for texting or communicating with disabled people;

two external cameras are embedded into the front frame on micro-suspensions and micro actuators allowing rotating these cameras mimicking within certain angle the eye balls and in control mode repeating the point of focus of the user's eyes;

two lasers can be embedded to the same platform as for rotating cameras and can be used for focusing two lasers on the target of user's interest;

several tactile buttons and finger joysticks are positioned on the side parts of the frame;

two lasers and coupled scanners are located in the inner sides of the side parts of the frame for projecting information onto smaller semitransparent screens within the major displays of the glasses in the Augmented Reality (AR) mode of operation;

must to have for control and communication: microphone, speakerphones, motion sensors, thermometer, altimeter, compass, bio sensors, outside and inside navigators, etc, separately from the frame of glasses there are several wirelessly coupled to the smart eyes tactile and motion input control tools are providing such graphics information to the system, which cannot be delivered by any other means.

17. A system according to claim 16, wherein the input control tool providing input of graphics information to the system based on the combination of tactile, motion and optical sensing and allowing digital painting or drawing on the 2D canvas or 3D virtual canvas without need for additional touch-screen or touch-pad, said input control tool having a pen-like body comprises:

interchangeable head with the end point, which in its turn comprises:

a tactile force sensor made as a monolithic silicon chip integrating the micro-mechanical microstructure, sensitive to the stress electrical components and an electronic processing circuit and possible integrating a motion sensor;

a plastic elastic tip for a double purpose; environmental including over-shock protection of the silicon chip, on one hand, and transfer the tactile touching of the tip to a force transferring element of the chip; and the pen-like body of the control tool also comprises an optical block for tracking the position and movements of the end point through the window in the body of the tool similar to optical or laser mouse, wherein LED or laser diode illuminates the working surface through the window and the image of the surface under the window is perceived by the photo-sensor array inside the optical block and wherein the optical block serves for the wide, less accurate moving of the pen on the working surface area while the end point serves for capturing a precise tactile captured movements for drawing the details of the design; and the pen-like body of the control tool also comprises the other components like block of digital processing, wireless communication circuits and multiple sensors, and power supply and at least one or more additional 3D control finger-joystick, completes this optical-motion-tactile sensing control (tool) device.

18. A system according to claim 16, wherein sensor rich control devices remotely connected with the main system and providing multiple inputs including control of the system and inputting graphics, handwritten and texting information are based on different sensors and actuators, among which tactile and motion sensing are the major and designed around the hands and fingers of the user and chosen from a group; a ring a thimble, a finger sleeve and a glove and wherein:

in rings the 3D tactile or/and motion sensor is embedded in the ring at least in one location such that it can be touched either by external surface or by the other finger and used as a 3D finger joystick or button and wherein short distance wireless communication electronics is integrated with the sensors;

in thimbles, finger sleeves and gloves the tactile and/or motion sensors are embedded in the elastic material located in the areas of finger tips or finger pads and used also as a reversed 3D finger joysticks in 3D virtual space what in multi-fingers applications allows to control multiple parameters at the same time and it also serves as a finger pen similar to a finger on a touch pad only without touch pad or touch screen and also tapping by the tip of the finger provides signals by either tactile sensor or motion sensor what might be helpful with typing or texting;

arrays of tactile sensors and elastic plastic piezoelectric actuators are imbedded in the areas of finger tins or finger pads for having and translating your touching sensations from real world and having and receiving touching sensations from the virtual world and for having a haptic feedback of how firm the user is
touching or pressing on a real object;
array of the tactile and motion sensors on each finger and
on the back of the arm creates a system allowing to
determine the motion of the hand and the motion of
each finger relative to the hand, which in combination
with the tactile sensors on the fingers allow to use this
system for teaching to blind typing or music without a
physical or even visual keyboard;
a source of electrical power for the remote systems of
input control devices is chosen from a group; replace-
able battery, rechargeable battery, harvesting energy
with piezoelectric plastic elements embedded in the
glove and finger material, when electrical charge can be
generated from natural mechanical motion of the fin-
gers and hand, wherein;
in case of independent ring, thimble or finger sleeve
rechargeable batteries can be complemented by a cop-
per coil around the finger for remote charging the
batteries and
in case of finger sleeve or glove piezoelectric plastic
elements embedded in the glove material mostly from
the palm side of the hand and the fingers can charge the
collecting charge capacitor and
in case of glove representing the most complex and
powerful system of input device a larger than in finger
power supply is needed, which can be located in the
wrist bend of the glove and may be combined with
smart watch or other gadget and also combined with the
main processing system and wireless communication
electronics of the longer range and more powerful
solenoid located on the back of the hand provides fast
recharging the battery of the glove and the power
supply from the centralized battery to the finger sensors
likewise the information from the sensors can be pro-
vided through the wire micro-cables located on the
back of the hand;
a source of important health information about the user
can be obtained from the glove system by integrating
several additional sensors like laser diode and photo-
sensor array for oxygen and heart beat rate measure-
ment, simple electrodes on several fingers for EEG
(EKG) and alike and wherein
all these cyber-gadgets for the hand and the fingers can
have multiple external fashion designs like size, shape,
color, details of the design, materials (elastic, stretch-
able, breathable, compressive, healing), artificial nails,
tattoo, embedded or replaceable decorative rings, etc.,
wherein all these fashion attributes can increase com-
mercial value of the products, which will be evolving
in complexity with the progress of technology.

19. A system according to claim 11, wherein sensors for the system of sensors are chosen from a group of sensors consisting of: a one, two or three-axis force sensor a pressure sensor; a one, two or three-axis tactile sensor; a one, two or three-axis linear accelerometer; one or two-axis tilt sensor; a one, two or three-axis gyro sensor; a one, two or three-axis angular accelerometer; a one, two or three-axis magnetometer; a 6D or 9D Inertial Measurement Unit (IMU); an altimeter; an optical sensor; a photo-sensor array; an electromagnetic sensor; an ultrasound sensor; a microphone; bio-electrodes; and combinations thereof, which provide a multi-axis sensor system for determining linear and angular motion parameters of the at least one part of the user's body, which has been moved between recording of two positions of the object navigated by at least one multi-axis input control-device (tool) within 3D virtual painting navigating space (canvas).

20. A system according to claim 11,
wherein the means for three-dimensional image presentation comprising the processor are configured to:
provide receiving inputs from the at least one multi-axis input control device (tool) for three-dimensional image presentation for object navigating along and around three axes X, Y and Z within XYZ virtual space and wherein at least one input is used by the means for three-dimensional image presentation for objects navigating along axis from the user's eyes toward the digital electronic display and beyond by changing a horizontal disparity between images for the right eye and the left eye and by scaling the images, making three-dimensional objects navigating equally continuous in XY plane and XZ and YZ virtual planes; and
provide using a motion captured by the at least one multi-axis input control device (tool) for objects navigating and the motion is provided simultaneously and continuously in all three dimensions by linear and angular movements of the at least one part of the user's body; and
provide the description in digital format of images for the right eye and the left eye for every and all instant virtual positions of the objects within 3D virtual canvas;
provide complete two-dimensional images of objects for the right eye and the left eye at any stage of objects navigating accumulation of all objects made up to that stage; and
provide complete three-dimensional images of objects including the objects linear and angular position within 3D virtual canvas.

* * * * *

UNITED STATES PATENT AND TRADEMARK OFFICE
CERTIFICATE OF CORRECTION

PATENT NO. : 10,922,870 B2  
APPLICATION NO. : 16/730720  
DATED : February 16, 2021  
INVENTOR(S) : Vaganov Page 1 of 1

It is certified that error appears in the above-identified patent and that said Letters Patent is hereby corrected as shown below:

In the Claims  
Claim 3, Column 38, Line 43, delete "navigating" and insert --navigating in--.  
Claim 4, Column 39, Line 8, delete "(XY)" and insert --XY--.  
Claim 4, Column 39, Lines 8-9, delete "(XZ) and (YZ)" and insert --XZ and YZ--.  
Claim 6, Column 39, Line 43, delete "he" and insert --be--.  
Claim 11, Column 41, Line 1, delete "pictures;" and insert --pictures:--.  
Claim 11, Column 41, Line 38, delete "multi axis" and insert --multi-axis--.  
Claim 15, Column 42, Line 58, delete "components;" and insert --components:--.  
Claim 15, Column 43, Line 2, delete "olate" and insert --plate--.  
Claim 15, Column 43, Line 5, delete "olate" and insert --plate--.  
Claim 15, Column 43, Line 8, delete "olate" and insert --plate--.  
Claim 15, Column 43, Line 12, delete "olate" and insert --plate--.  
Claim 16, Column 43, Line 40, delete "dissolves," and insert --displays,--.  
Claim 18, Column 44, Line 44, delete "group; a ring" and insert --group: a ring,--.  
Claim 18, Column 44, Line 64, delete "tins" and insert --tips--.  
Claim 18, Column 45, Line 11, delete "group;" and insert --group:--.  
Claim 18, Column 45, Line 16, delete "wherein;" and insert --wherein:--.  
Claim 20, Column 46, Lines 36-37, delete "navigating" and insert --navigating,--.  
Claim 20, Column 46, Line 46, delete "navigating" and insert --navigating as--.

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*